United States Patent
Turner et al.

(10) Patent No.: US 11,993,457 B2
(45) Date of Patent: May 28, 2024

(54) REFUSE VEHICLE WITH ELECTRIC POWER TAKE-OFF

(71) Applicant: Oshkosh Corporation, Oshkosh, WI (US)

(72) Inventors: Ross Turner, Oshkosh, WI (US); Jerrod Kappers, Oshkosh, WI (US); Quincy Wittman, Oshkosh, WI (US); Logan Gary, Oshkosh, WI (US); Derek Wente, Austin, MN (US); Jason Rice, Oshkosh, WI (US); Jacob Wallin, Oshkosh, WI (US); Emily Davis, Rochester, MN (US); Joshua Rocholl, Rochester, MN (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/967,357

(22) Filed: Oct. 17, 2022

(65) Prior Publication Data

US 2023/0117427 A1 Apr. 20, 2023

Related U.S. Application Data

(60) Provisional application No. 63/256,911, filed on Oct. 18, 2021.

(51) Int. Cl.
*B65F 3/06* (2006.01)
*B60L 1/00* (2006.01)
*B65F 3/02* (2006.01)

(52) U.S. Cl.
CPC .............. *B65F 3/06* (2013.01); *B60L 1/003* (2013.01); *B60L 2200/40* (2013.01); *B65F 2003/025* (2013.01); *B65F 2003/0279* (2013.01)

(58) Field of Classification Search
CPC .............. B65F 3/06; B65F 2003/025; B65F 2003/0279; B65F 2003/0276; B60L 1/003; B60L 2200/40; B60L 2200/36
See application file for complete search history.

(56) References Cited

U.S. PATENT DOCUMENTS

| | | | |
|---|---|---|---|
| 11,136,187 B1 * | 10/2021 | Koga | ................... B65F 3/02 |
| 11,254,498 B1 * | 2/2022 | Koga | ................... B60L 3/0046 |
| 11,858,373 B2 * | 1/2024 | Rocholl | ................... B60L 50/66 |
| 2017/0121108 A1 | 5/2017 | Davis et al. | |
| 2018/0265289 A1 | 9/2018 | Davis et al. | |
| 2019/0091890 A1 | 3/2019 | Rocholl et al. | |
| 2019/0193934 A1 | 6/2019 | Rocholl et al. | |
| 2019/0322321 A1 | 10/2019 | Schwartz et al. | |
| 2020/0262366 A1 | 8/2020 | Wildgrube et al. | |
| 2020/0346547 A1 | 11/2020 | Rocholl et al. | |

(Continued)

*Primary Examiner* — Jared Fureman
*Assistant Examiner* — Michael J Warmflash
(74) *Attorney, Agent, or Firm* — Foley & Lardner LLP

(57) ABSTRACT

A refuse vehicle includes a chassis supporting a plurality of wheels, a battery configured to provide electrical energy to drive at least one of the plurality of wheels, a vehicle body supported by the chassis and defining a receptacle for storing refuse therein, and an electric power take-off module removably coupled to the vehicle body, wherein the electric power take-off module includes an electric power take-off system including a motor configured to receive electrical energy from the battery and provide power to a hydraulic system in response to receiving the electrical energy from the battery.

20 Claims, 20 Drawing Sheets

(56) References Cited

U.S. PATENT DOCUMENTS

| | | | |
|---|---|---|---|
| 2020/0346556 A1 | 11/2020 | Rocholl et al. | |
| 2020/0346557 A1 | 11/2020 | Rocholl et al. | |
| 2020/0346657 A1* | 11/2020 | Clifton | B65F 3/04 |
| 2020/0346854 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346857 A1 | 11/2020 | Rocholl et al. | |
| 2020/0346858 A1 | 11/2020 | Buege et al. | |
| 2020/0346859 A1 | 11/2020 | Buege et al. | |
| 2020/0346860 A1 | 11/2020 | Buege et al. | |
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0347857 A1 | 11/2020 | Clifton et al. | |
| 2020/0348681 A1 | 11/2020 | Clifton et al. | |
| 2020/0348764 A1 | 11/2020 | Clifton et al. | |
| 2020/0398670 A1 | 12/2020 | Rocholl et al. | |
| 2020/0398695 A1 | 12/2020 | Rocholl et al. | |
| 2020/0398697 A1 | 12/2020 | Rocholl et al. | |
| 2020/0398772 A1 | 12/2020 | Wildgrube et al. | |
| 2020/0398857 A1 | 12/2020 | Clifton et al. | |
| 2020/0399057 A1 | 12/2020 | Rocholl et al. | |
| 2020/0399058 A1 | 12/2020 | Rocholl et al. | |
| 2021/0031611 A1 | 2/2021 | Yakes et al. | |
| 2021/0031612 A1 | 2/2021 | Yakes et al. | |
| 2021/0069934 A1 | 3/2021 | Rocholl et al. | |
| 2021/0221216 A1 | 7/2021 | Yakes et al. | |
| 2021/0229755 A1 | 7/2021 | Schwartz et al. | |
| 2021/0229908 A1 | 7/2021 | Rocholl et al. | |
| 2021/0252995 A1 | 8/2021 | Rocholl et al. | |
| 2021/0316740 A1 | 10/2021 | Clifton et al. | |
| 2021/0316741 A1 | 10/2021 | Clifton et al. | |
| 2021/0323436 A1 | 10/2021 | Rocholl et al. | |
| 2021/0323437 A1 | 10/2021 | Rocholl et al. | |
| 2021/0323438 A1 | 10/2021 | Rocholl et al. | |
| 2021/0323763 A1 | 10/2021 | Koga et al. | |
| 2021/0323764 A1 | 10/2021 | Koga et al. | |
| 2021/0323765 A1 | 10/2021 | Koga et al. | |
| 2021/0324880 A1 | 10/2021 | Wente et al. | |
| 2021/0325529 A1 | 10/2021 | Koga et al. | |
| 2021/0325911 A1 | 10/2021 | Koga et al. | |
| 2021/0326550 A1 | 10/2021 | Kappers et al. | |
| 2021/0327164 A1 | 10/2021 | Koga et al. | |
| 2021/0327170 A1 | 10/2021 | Rocholl et al. | |
| 2021/0327237 A1 | 10/2021 | Rocholl et al. | |
| 2021/0331635 A1 | 10/2021 | Wildgrube et al. | |
| 2021/0331636 A1 | 10/2021 | Wildgrube et al. | |
| 2021/0331637 A1 | 10/2021 | Wildgrube et al. | |
| 2021/0339632 A1 | 11/2021 | Rocholl et al. | |
| 2021/0339648 A1 | 11/2021 | Koga et al. | |
| 2021/0339949 A1 | 11/2021 | Rocholl et al. | |
| 2021/0345062 A1 | 11/2021 | Koga et al. | |
| 2021/0373560 A1 | 12/2021 | Koga et al. | |
| 2021/0396251 A1 | 12/2021 | Clifton et al. | |
| 2022/0009338 A1 | 1/2022 | Yakes et al. | |
| 2022/0033181 A1 | 2/2022 | Koga et al. | |
| 2022/0096884 A1 | 3/2022 | Koga et al. | |
| 2022/0097527 A1 | 3/2022 | Koga et al. | |
| 2022/0097555 A1 | 3/2022 | Koga et al. | |
| 2022/0097556 A1 | 3/2022 | Koga et al. | |
| 2022/0097633 A1 | 3/2022 | Koga et al. | |
| 2022/0097961 A1* | 3/2022 | Koga | B65F 3/02 |
| 2022/0097962 A1 | 3/2022 | Koga et al. | |
| 2022/0097963 A1 | 3/2022 | Koga et al. | |
| 2022/0097964 A1 | 3/2022 | Koga et al. | |
| 2022/0099723 A1 | 3/2022 | Koga et al. | |
| 2022/0105827 A1 | 4/2022 | Rocholl et al. | |
| 2022/0106114 A1 | 4/2022 | Buege et al. | |
| 2022/0106115 A1 | 4/2022 | Buege et al. | |
| 2022/0118854 A1* | 4/2022 | Davis | B60W 10/08 |
| 2022/0156474 A1 | 5/2022 | Kappers et al. | |
| 2022/0161854 A1 | 5/2022 | Mortenson et al. | |
| 2022/0161997 A1 | 5/2022 | Mortenson et al. | |
| 2022/0161998 A1* | 5/2022 | Turner | B65F 3/10 |
| 2022/0169444 A1 | 6/2022 | Rocholl et al. | |
| 2022/0185582 A1 | 6/2022 | Koga et al. | |
| 2022/0219896 A1 | 7/2022 | Gary et al. | |
| 2022/0258965 A1 | 8/2022 | Kappers et al. | |
| 2022/0258967 A1 | 8/2022 | Kappers et al. | |
| 2022/0267090 A1 | 8/2022 | Rocholl et al. | |
| 2022/0307312 A1 | 9/2022 | Rocholl et al. | |
| 2022/0340359 A1 | 10/2022 | Rocholl et al. | |
| 2022/0380123 A1 | 12/2022 | Buege et al. | |
| 2022/0382388 A1 | 12/2022 | Clifton et al. | |
| 2022/0415103 A1 | 12/2022 | Rocholl et al. | |
| 2023/0002152 A1 | 1/2023 | Koga et al. | |
| 2023/0023747 A1 | 1/2023 | Clifton et al. | |
| 2023/0117427 A1* | 4/2023 | Turner | B65F 3/06 307/9.1 |
| 2023/0120042 A1* | 4/2023 | Turner | G10K 11/17823 381/71.1 |
| 2023/0278785 A1* | 9/2023 | Maroney | B65F 3/04 414/467 |
| 2023/0356674 A1* | 11/2023 | Wei | B60R 16/0231 |
| 2023/0415556 A1* | 12/2023 | Wolf | B65F 3/02 |
| 2023/0415641 A1* | 12/2023 | Miller | B60L 58/10 |
| 2023/0415742 A1* | 12/2023 | Wolf | B60W 10/08 |
| 2023/0415986 A1* | 12/2023 | Steffens | B65F 3/201 |
| 2024/0001764 A1* | 1/2024 | Koga | B60L 1/003 |
| 2024/0001798 A1* | 1/2024 | Rocholl | B65F 3/00 |

\* cited by examiner

REFUSE VEHICLE WITH ELECTRIC POWER TAKE-OFF

CROSS-REFERENCES TO RELATED APPLICATIONS

This application claims the benefit of priority to U.S. Provisional Patent Application No. 63/256,911, filed on Oct. 18, 2021, which is hereby incorporated by reference herein in its entirety for all purposes.

BACKGROUND

Electric refuse vehicles (i.e., battery-powered refuse vehicles) include one or more energy storage elements (e.g., batteries) that supply energy to an electric motor. The electric motor supplies rotational power to the wheels of the refuse vehicle to drive the refuse vehicle. The energy storage elements can also be used to supply energy to vehicle subsystems, like the lift system or the compactor, in addition to the electric motor that serves as the prime mover.

SUMMARY

One exemplary embodiment relates to a refuse vehicle. The refuse vehicle includes a chassis supporting a plurality of wheels, a battery configured to provide electrical energy to drive at least one of the plurality of wheels, a vehicle body supported by the chassis and defining a receptacle for storing refuse therein, and an electric power take-off module removably coupled to the vehicle body, wherein the electric power take-off module includes an electric power take-off system including a motor configured to receive electrical energy from the battery and provide power to a hydraulic system in response to receiving the electrical energy from the battery.

According to various embodiments, the electric power take-off system further includes an inverter configured to provide the electrical energy to the motor from the battery. According to various embodiments, the electric power take-off system further includes a second battery, such that the electric power take-off system is configured to operate solely off energy from the second battery. According to various embodiments, the motor is a first motor and the electric power take-off system further includes a second motor configured to receive electrical energy from the battery and provide power to the hydraulic system in response to receiving the electrical energy from the battery. According to various embodiments, the electric power take-off system further includes a hydraulic pump configured to receive power from the motor and provide hydraulic pressure to the hydraulic system. According to various embodiments, the refuse vehicle further includes a sensor configured to detect when the electric power take-off module is de-coupled from the body, and a controller in communication with the sensor and configured to de-activate the hydraulic system in response to the sensor detecting the electric power take-off module is de-coupled from the body. According to various embodiments, the electric power take-off module further includes a switch configured to be actuated by an operator of the refuse vehicle and activate the electric power take-off system in response to being actuated by the operator.

Another exemplary embodiment relates to a refuse vehicle. The refuse vehicle includes a chassis supporting a plurality of wheels, a battery configured to provide electrical energy to drive at least one of the plurality of wheels, a vehicle body supported by the chassis and defining a receptacle for storing refuse therein, and an electric power take-off system coupled to the vehicle body, the electric power take-off system including a motor configured to receive electrical energy from the battery and provide power to a hydraulic system in response to receiving the electrical energy from the battery, a sensor configured to detect hydraulic pressure within the hydraulic system, and a controller configured to receive data indicative of the detected hydraulic pressure from the sensor, wherein the controller is further configured to determine if the hydraulic pressure is below a minimum threshold pressure and increase a speed of the motor in response to determining the hydraulic pressure is below the minimum threshold pressure.

According to various embodiments, the refuse vehicle includes a user interface in communication with the controller, wherein the controller is configured to increase the speed of the motor in response to an input made on the user interface. According to various embodiments, the refuse vehicle includes a lifting system powered by the hydraulic system, wherein the controller is configured to increase the speed of the motor in response to activation of the lifting system. According to various embodiments, the refuse vehicle includes an operator detecting sensor in communication with the controller and configured to detect a person proximate the refuse vehicle, wherein the controller is configured to activate the hydraulic system in response to detecting the person proximate the refuse vehicle. According to various embodiments, the electric power take-off system further includes a switch configured to be actuated by an operator of the refuse vehicle and activate the electric power take-off system in response to being actuated by the operator. According to various embodiments, the switch is located proximate the front of the body and is accessible from outside a cabin of the vehicle. According to various embodiments, the switch is located proximate the rear of the body and is accessible from outside a cabin of the vehicle.

Another embodiment relates to a method. The method includes providing power to one or more components a system of a refuse vehicle, the refuse vehicle including a chassis supporting a plurality of wheels, a battery, a vehicle body supported by the chassis and defining a receptacle for storing refuse therein, and an electric power take-off system coupled to the vehicle body, the electric power take-off system including a motor configured to receive electrical energy from the battery and provide power to a hydraulic system in response to receiving the electrical energy from the battery, and a controller communicably coupled to the motor. The method further includes receiving, by the controller, power from the battery, causing, by the controller, the electric power-take off system to enter idle mode, detecting, by a sensor, a hydraulic pressure within the hydraulic system, receiving, by the controller, data indicative of the hydraulic pressure from the sensor, and causing, by the controller, an increase in a speed of the motor in response to determining the hydraulic pressure is below a minimum threshold pressure.

According to various embodiments, the method includes receiving, by the controller, a user input from a user interface, and increasing, by the controller, the speed of the motor in response to receiving the user input. According to various embodiments, the user input includes a request to activate a lifting mechanism. According to various embodiments, the method includes detecting, by the sensor, a second hydraulic pressure within the hydraulic system, receiving, by the controller, data indicative of the second hydraulic pressure from the sensor, and causing, by the controller, an increase in the speed of the motor in response to determining the hydraulic pressure is below a minimum working pressure. According to various embodiments, the method includes receiving, from a switch configured to be actuated by an operator of the refuse vehicle, an indication that the switch has been actuated, and increasing, by the controller, the speed of the motor in response to receiving the indication that the switch has been actuated. According to various embodiments, the method includes the switch is located proximate the front of the body and is accessible from outside a cabin of the vehicle.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
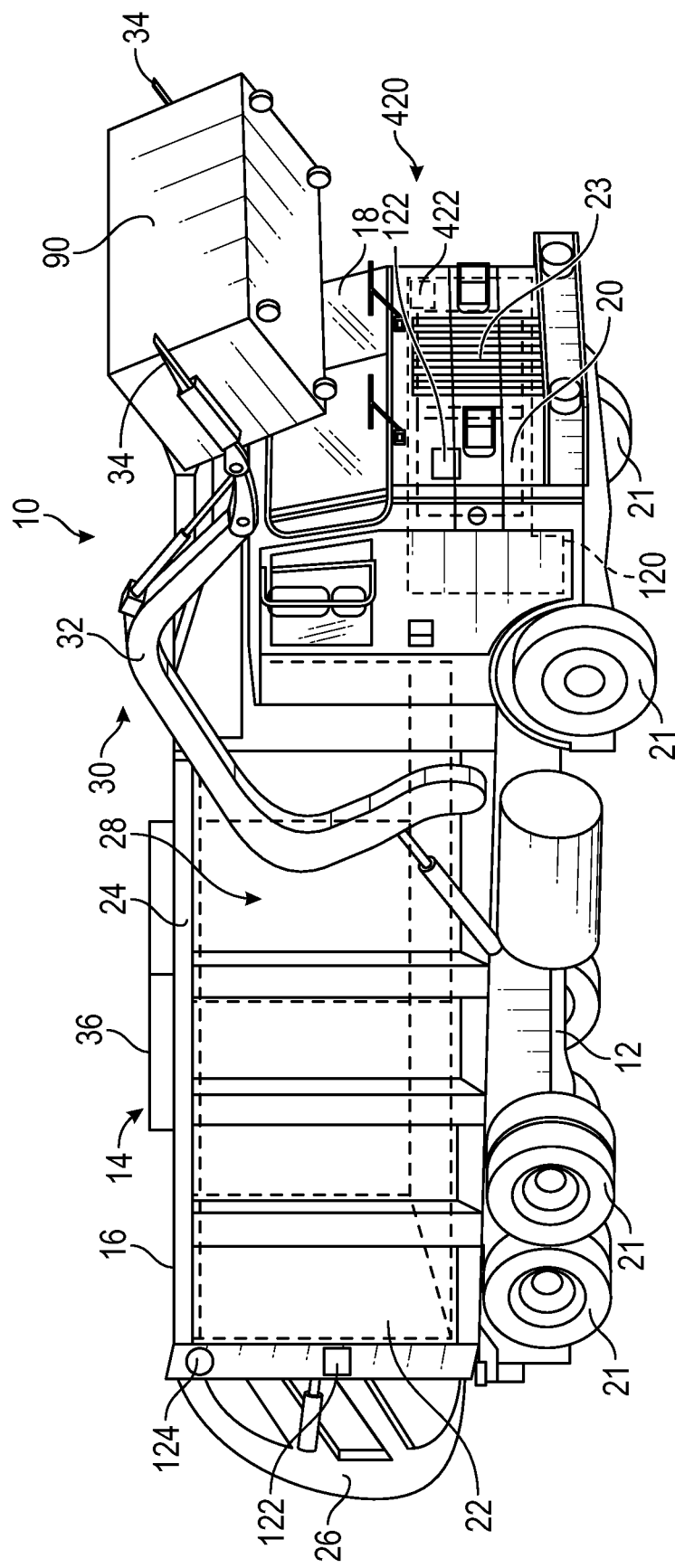
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to electric refuse vehicles. Electric refuse vehicles, or E-refuse vehicles, include an onboard energy storage device, such as a battery, that provides power to a motor that produces rotational power to drive the vehicle. The energy storage device, which is commonly a battery or battery assembly, can also be used to provide power to different subsystems on the E-refuse vehicle. The energy storage device is also configured to provide hydraulic power to different subsystems on the E-refuse vehicle through an electric power take-off (E-PTO) system. The E-PTO system receives electrical power from the energy storage device and provides the electrical power to an electric motor. The electric motor drives a hydraulic pump that provides pressurized hydraulic fluid to different vehicle subsystems, including the compactor and the lifting system.

Refuse Vehicle

Referring to FIGS. 1-6, a vehicle, shown as refuse vehicle 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse vehicle 10 by an operator (e.g., a seat, a steering wheel, hydraulic controls, etc.) as well as components that can execute commands automatically to control different subsystems within the vehicle (e.g., computers, controllers, processing units, etc.). The refuse vehicle 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 includes one or more electric motors coupled to the frame 12. The electric motor(s) may consume electrical power from an on-board energy storage device (e.g., one or more batteries 23, ultra-capacitors, hydraulic storage devices, etc.), from an on-board generator (e.g., an internal combustion engine and alternator), and/or from an external power source (e.g., overhead power lines, power rails, etc.) and provide power to the systems of the refuse vehicle 10. In some examples, the on-board energy storage device is a plurality of rechargeable lithium-ion battery cells.

According to an exemplary embodiment, the refuse vehicle 10 is configured to transport refuse from various waste receptacles within a municipality to a storage or processing facility (e.g., a landfill, an incineration facility, a recycling facility, etc.). As shown in FIGS. 1-4, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-4, the on-board receptacle 16 and collection chamber 28 are each positioned behind the cab 18. In some embodiments, the collection chamber 28 includes a hopper volume 52 and a storage volume. Refuse is initially loaded into the hopper volume 52 and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse vehicle 10). The refuse vehicle 10 can be arranged as a front-loading refuse vehicle (shown in FIGS. 1 and 3), a side-loading refuse vehicle (shown in FIG. 2), or a rear-loading refuse vehicle (shown in FIG. 4), for example.

Figure 3:
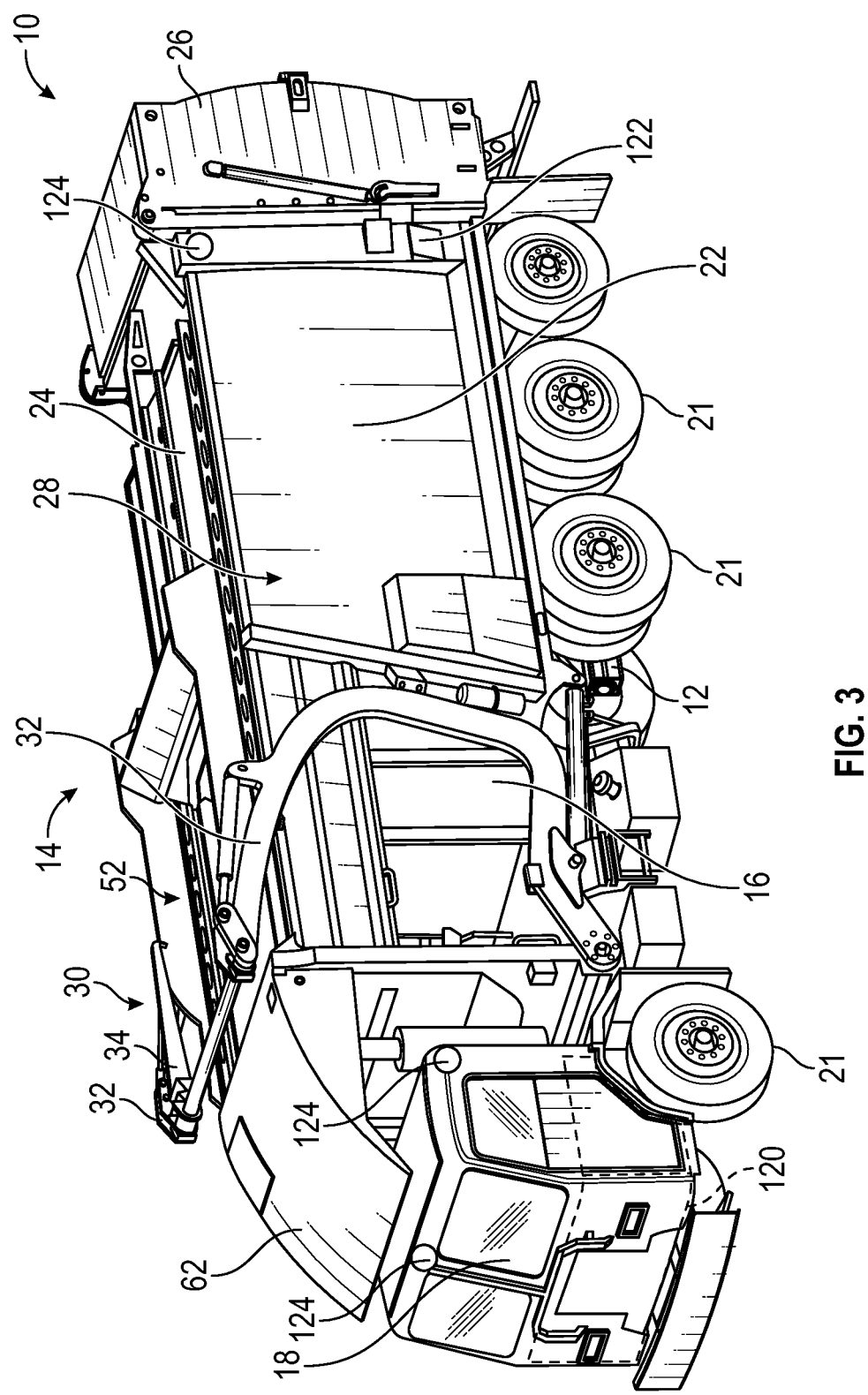
FIG. 3 is a front perspective view of an electric front loading refuse vehicle according to an exemplary embodiment.

Referring again to the exemplary embodiment shown in FIGS. 1 and 3, the refuse vehicle 10 is a front-loading refuse vehicle. As shown in FIG. 1, the refuse vehicle 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse vehicle 10, the forks 34 are positioned to engage the refuse container (e.g., the refuse vehicle 10 is driven into position until the forks 34 protrude through the apertures within the refuse container). As shown in FIG. 1, the arms 32 are rotated to lift the refuse container over the cab 18. Additional actuators (e.g., a hydraulic cylinder) can articulate the forks 34 to tip the refuse out of the container and into the hopper volume of the collection chamber 28 through an opening in the cover 24. The actuators thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Figure 2:
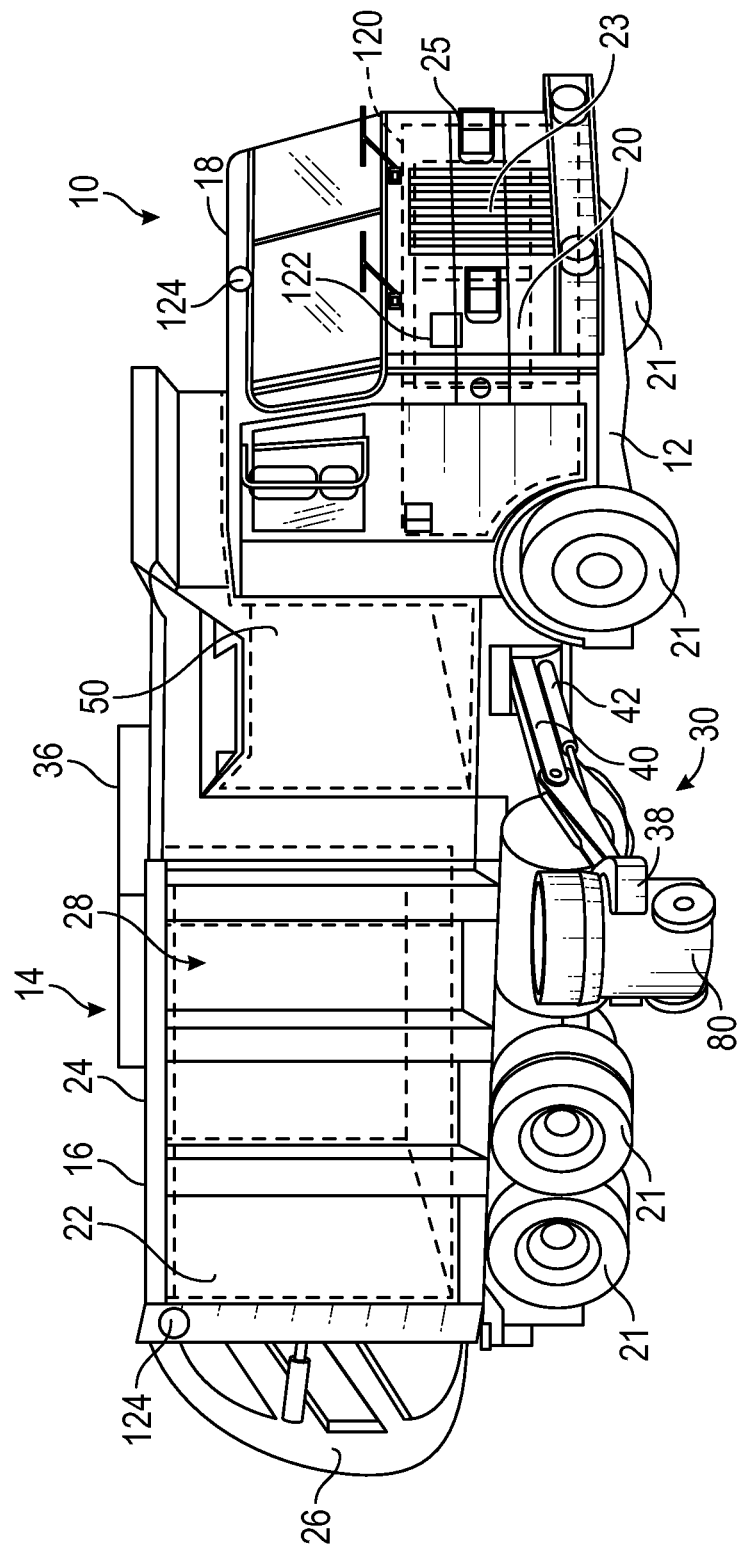
FIG. 2 is a perspective view of a side loading refuse vehicle according to an exemplary embodiment.

Referring to the exemplary embodiment shown in FIG. 2, the refuse vehicle 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container. The arm 40 may be movable within one or more directions (e.g., up and down, left and right, in and out, rotation, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Referring to FIG. 3, the refuse vehicle 10 is a front loading, fully electric E-refuse vehicle. Like the refuse vehicle 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse vehicle 10, the forks 34 are positioned to engage the refuse container (e.g., the refuse vehicle 10 is driven into position until the forks 34 protrude through the apertures within the refuse container). Additional actuators (e.g., hydraulic cylinders, linear actuators, etc.) articulate the forks 34 to tip the refuse out of the container and into the hopper volume of the collection chamber 28 through an opening in the cover 24. The actuators thereafter rotate the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIG. 3, the refuse vehicle 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor 20) rotates a transmission shaft, which in turn rotates the wheels 21 of the vehicle. The batteries 23 can supply electrical power to additional subsystems on the refuse vehicle 10, including additional electric motors, cab controls (e.g., climate controls, steering, lights, etc.), the lifting system 30, the compactor 50, and/or auxiliary systems 60, for example.

According to certain embodiments, the energy storage devices may include various other types of energy storage devices, such as hydraulic storage devices and/or capacitors. For example, the refuse vehicle 10 may include one or more hydraulic storage devices that are configured to store a pressurized fluid. When the hydraulic storage device releases some or all of the pressurized fluid, the fluid flow may be converted to another type of energy (e.g., electrical energy). According to various embodiments, the hydraulic storage devices may be in fluid communication with the hydraulics system 300 discussed further below. Further, the energy storage devices may include one or more capacitors that enable energy clipping. For example, if a motor or hydraulic storage device outputs more energy than is needed by the refuse vehicle, the capacitor may store that energy for use at a later time.

Figure 4:
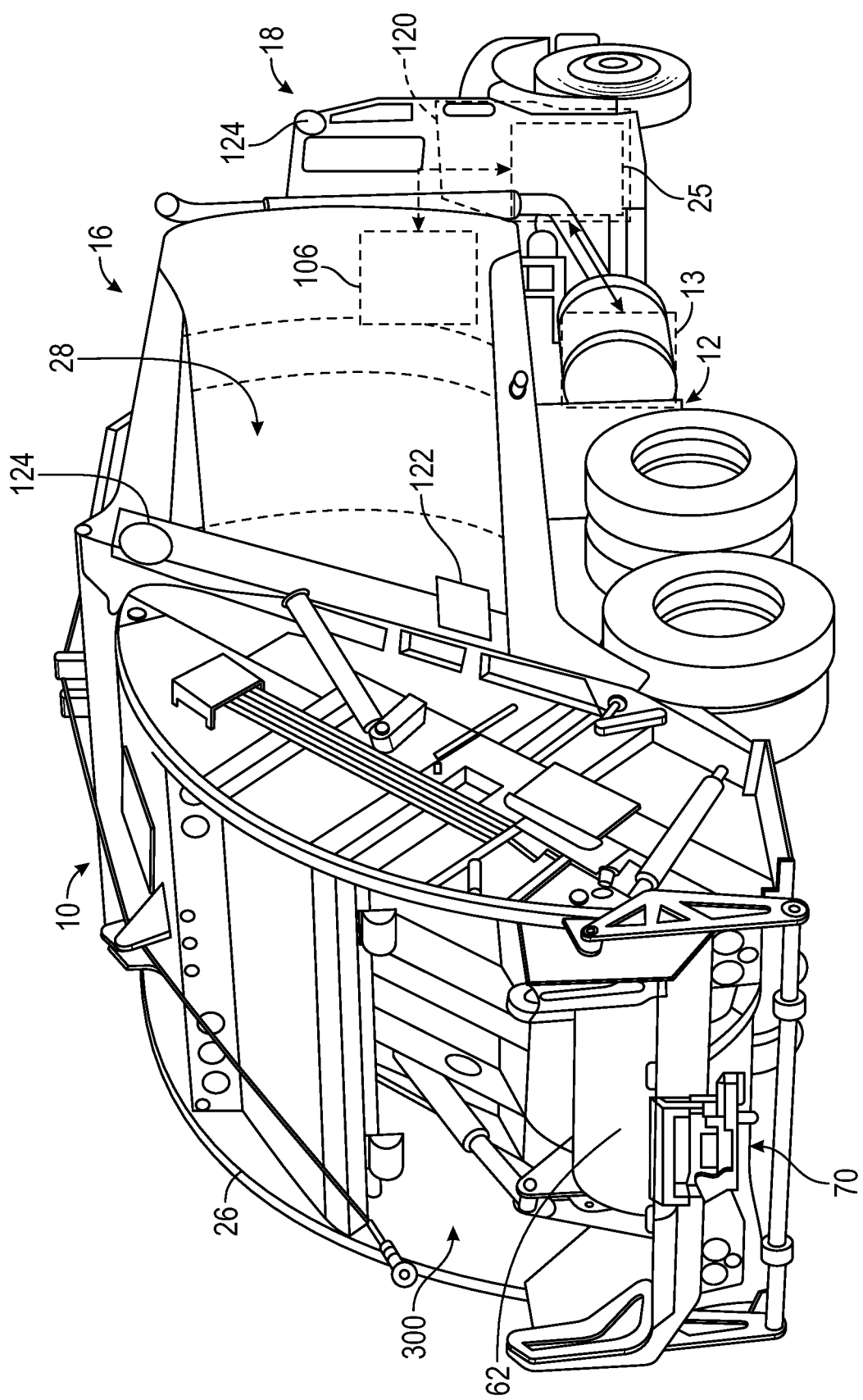
FIG. 4 is a rear perspective view of a rear loading refuse vehicle according to an exemplary embodiment.

Referring to FIG. 4, the refuse vehicle 10 can be a rear-loading refuse vehicle. Like the refuse vehicle 10 shown in FIGS. 1-3, the refuse vehicle 10 includes a frame 12 that supports a body assembly 14 formed of an on-board receptacle 16 and a cab 18. A tailgate 26 is movably positioned at a rear of the on-board receptacle 16 and defines a pathway into the collection chamber 28. In some examples, a refuse can tipper assembly 70 is positioned along the tailgate 26 to help invert refuse cans relative to the ground below so that refuse can be transferred from refuse cans into the tailgate 26. A packer 62 can pull refuse within the tailgate 26 upwardly and inwardly (e.g., forwardly) toward the collection chamber 28 for compaction.

The refuse vehicle 10 can be a hybrid refuse vehicle or an all-electric refuse vehicle, for example, with an electric frame or chassis 12. In hybrid refuse vehicles, the refuse vehicle can include both electric and hydraulic power systems. The frame 12 supports a primary battery 23 that is configured to supply electrical power to each of the prime mover 20, shown as an electric motor, and the various systems on the body assembly 14 of the refuse vehicle 10. A power distribution unit (PDU) 25 is in communication with the battery 23 and is configured to selectively monitor and supply electrical power from the battery 23 to each of the body assembly 14 and the prime mover 20. The PDU 25 can be a controller, processor, central processing unit (CPU), or other type of programmable or non-programmable device that monitors the battery 23 and the systems on the body assembly 14 and frame 12 that request electrical power from the battery 23. The PDU 25 is configured to control the supply of electrical power from the battery 23 to accommodate the power requests of the various systems on the frame 12 and body assembly 14 of the refuse vehicle 10. The PDU 25 monitors the battery 23 and controls contactors within the battery 23 to direct electrical power to the various systems within the refuse vehicle 10. In some examples, the PDU 25 prioritizes electrical power delivery through the refuse vehicle 10. The PDU 25 can ensure that critical functions (e.g., the prime mover 20, etc.) receive electrical power before auxiliary systems, like the E-PTO system 100, climate control systems, or radio, for example.

The PDU 25 can control the supply electrical power from the battery 23 to the body assembly 14. In some examples, a disconnect 200 is positioned between the PDU 25 and the body assembly 14 to selectively disable electrical power transmission from the battery 23 to the body assembly 14. The disconnect 200 provides selective electrical communication between the batteries 23 and the body assembly 14 that can allow the secondary vehicle systems (e.g., the lift system, compactor, etc.) to be decoupled and de-energized from the electrical power source. The disconnect 200 can create an open circuit between the batteries 23 and the body assembly 14, such that no electricity is supplied from the batteries 23 to the various systems on the vehicle 10. The refuse vehicle 10 can then be operated in a lower power consumption mode, given the reduced electrical load required from the batteries 23 to operate the refuse vehicle 10. The disconnect 200 further enables the refuse vehicle 10 to conserve energy when the vehicle subsystems are not needed, and can also be used to lock out the various vehicle subsystems to perform maintenance activities. The disconnect 200 further allows an all-electric vehicle chassis to be retrofit with hydraulic power systems, which can be advantageous for a variety of reasons, as hydraulic power systems may be more responsive and durable than fully electric systems.

The refuse vehicle 10 further includes an E-PTO module 120 that at contains some or all of the E-PTO system 100 that is discussed further below. According to various embodiments, the E-PTO module 120 is removabley coupled to the refuse vehicle 10 such that the E-PTO module 120 may be removed from the refuse vehicle 10. For example, the E-PTO module 120 may be a modular component of the refuse vehicle 10 that can be readily exchanged with another E-PTO module 120. In this sense, the E-PTO module 120 may be removed from the refuse vehicle (e.g., to perform maintenance) and a different E-PTO module 120 may be loaded into the refuse vehicle 10 to reduce downtime of the refuse vehicle 10.

As shown, the E-PTO module 120 is located proximate the front of the refuse vehicle 10, however, according to various embodiments, the E-PTO module 120 may be located elsewhere. For example, the E-PTO module 120 may also be located proximate the rear of the refuse vehicle 10.

According to various embodiments, the E-PTO module 120 includes a layer of sound insulating material (e.g., a layer of acoustic foam (e.g., studio foam), sound insulation (e.g., batts made of mineral wool, rock wool, fiberglass, etc.), acoustic panels, acoustic fabrics, acoustic coatings (e.g., Mass Loaded Vinyl), rubber material, composite material, metal, etc.). For example, some or all of the E-PTO module 120 includes a layer of sound insulating material. The sound insulating material is configured to reduce a perceived audible output from the E-PTO system 100. For example, according to various embodiments, the E-PTO module 120 contains the hydraulic pump 104 and the electric motor 102 of the E-PTO system 100. The hydraulic pump 104 and the electric motor 102 may produce high levels of noise pollution when in use. The sound insulation material may reduce the amount of noise pollution emitted from the E-PTO system 100 by absorbing some of the sound. Further, according to various embodiments, the sound insulating material may be flame resistant, thereby reducing the risk of fire within the E-PTO module 120.

As shown, the refuse vehicle 10 further includes one or more activation switches 122 that are accessible from the exterior of the refuse vehicle 10. For example, the refuse vehicle 10 may include an activation switch 122 proximate the front of the refuse vehicle 10 and/or an activation switch 122 proximate the rear of the refuse vehicle. Each activation switch 122 may enable an operator of the refuse vehicle 10 to input an external input, thereby causing the E-PTO system 100 to enter idle mode (e.g., as a part of process 610, discussed further below) or input a function request, thereby causing the E-PTO system to enter work mode (e.g., as a part of process 620, discussed further below). For example, the operator may trigger the activation switch 122 thereby causing the electric motor 102 and/or the hydraulic pump 104 to be activated. In this sense, the activation switches 122 enables the operator of the refuse vehicle 10 to increase pressure within the hydraulic system from outside of the refuse vehicle 10.

As shown, the refuse vehicle 10 includes one or more operator detectors 124 positioned about the refuse vehicle 10. The operator detectors 124 are configured to detect the presence of an operator outside of the refuse vehicle 10. For example, if an operator exits the cabin of the refuse vehicle 10 and approaches either the front of the rear of the refuse vehicle 10. The operator detectors 124 may include video cameras, motion sensors, proximity sensors, thermal sensors, and/or any other sensor configured to detect the presence of a person. Each operator detector 124 may enable an operator of the refuse vehicle 10 to automatically input an external input by approaching the front and/or the rear of the refuse vehicle 10, thereby causing the E-PTO system 100 to enter idle mode (e.g., as a part of process 610, discussed further below) or input a function request by approaching the front and/or the rear of the refuse vehicle, thereby causing the E-PTO system to enter work mode (e.g., as a part of process 620, discussed further below). For example, the operator may trigger the operator detector 124, thereby causing the electric motor 102 and/or the hydraulic pump 104 to be activated. In this sense, the operator detectors 124 enable the operator of the refuse vehicle 10 to automatically increase pressure within the hydraulic system from outside of the refuse vehicle 10 by approaching the front or rear of the vehicle.

Figure 5:
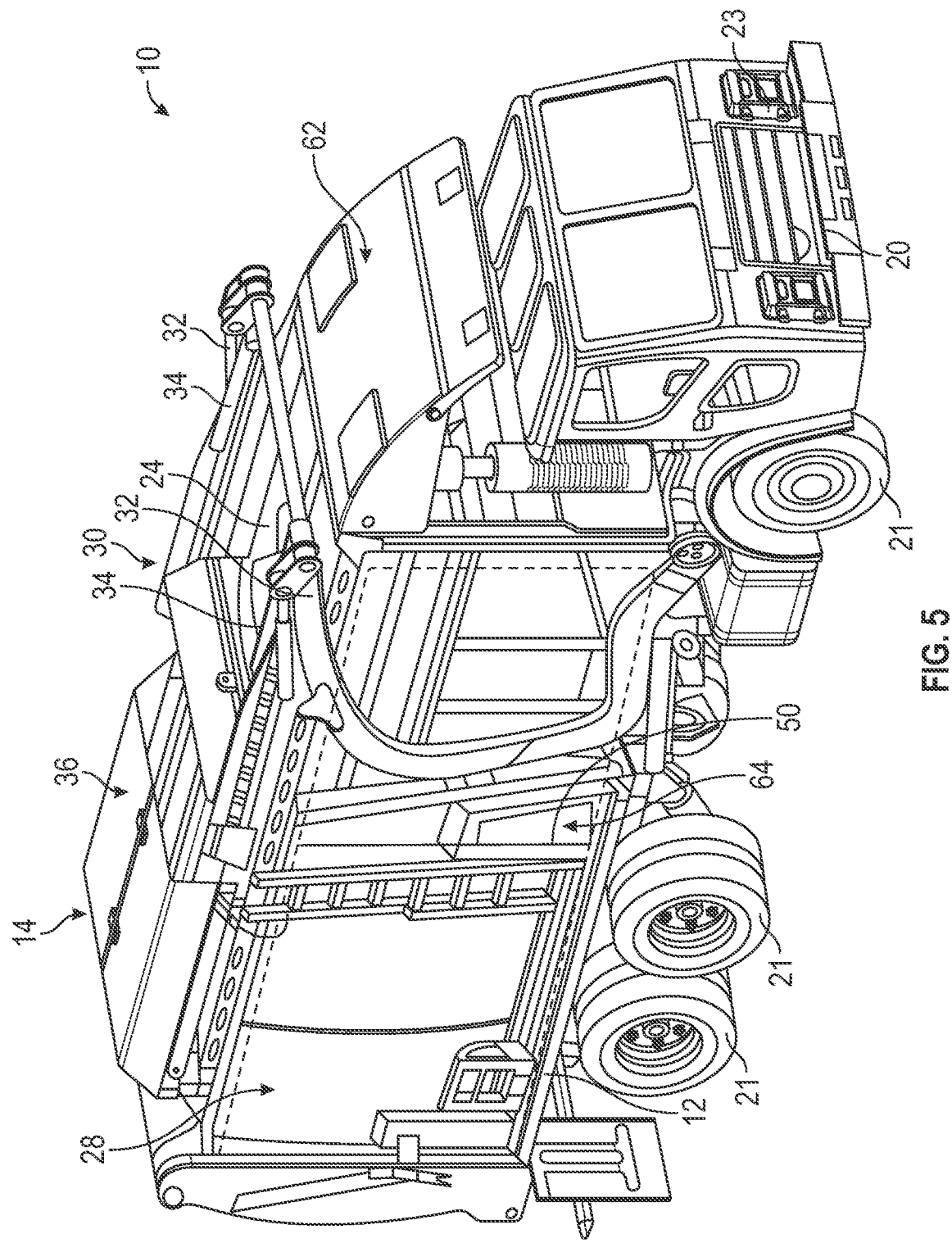
FIG. 5 is a front perspective view of an electric front loading refuse vehicle according to an exemplary embodiment.
Figure 6:
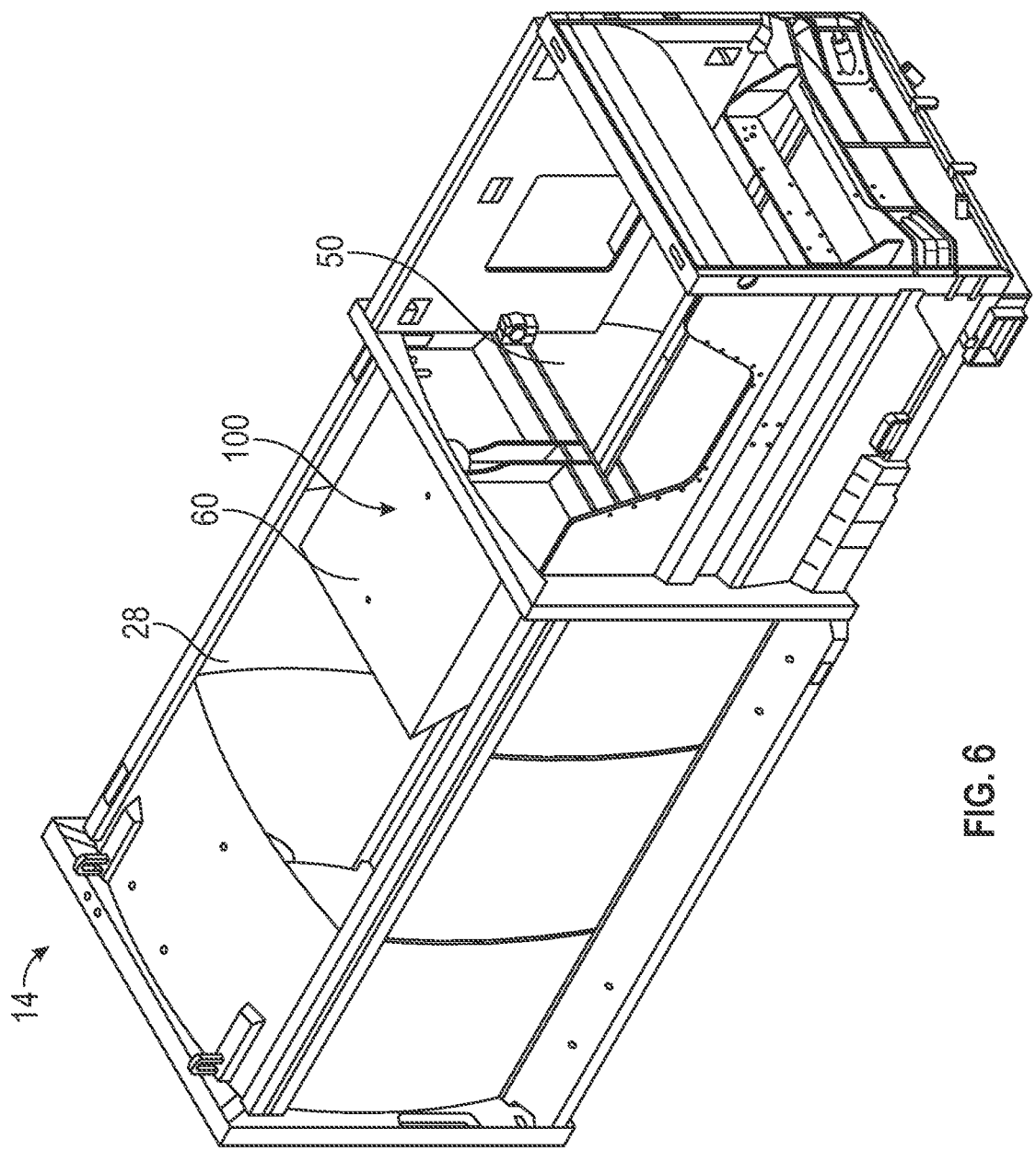
FIG. 6 is a top perspective view of a body assembly of the refuse vehicle of FIG. 3, according to an exemplary embodiment.

Referring to FIGS. 5 and 6, the refuse truck 10 is a front loading E-refuse vehicle. Like the refuse truck 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container 92, etc.). During operation of the refuse truck 10, the forks 34 are positioned to engage the refuse container (e.g., the refuse truck 10 is driven into position until the forks 34 protrude through the apertures within the refuse container). A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIG. 5, the refuse truck 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor) rotates a transmission shaft, which in turn rotates the wheels 21 of the vehicle. The batteries 23 can supply additional subsystems on the refuse truck 10, including additional electric motors, cab controls (e.g., climate controls, steering, lights, etc.), the lifting system 30, and/or the compactor 50, for example.

Figure 7:
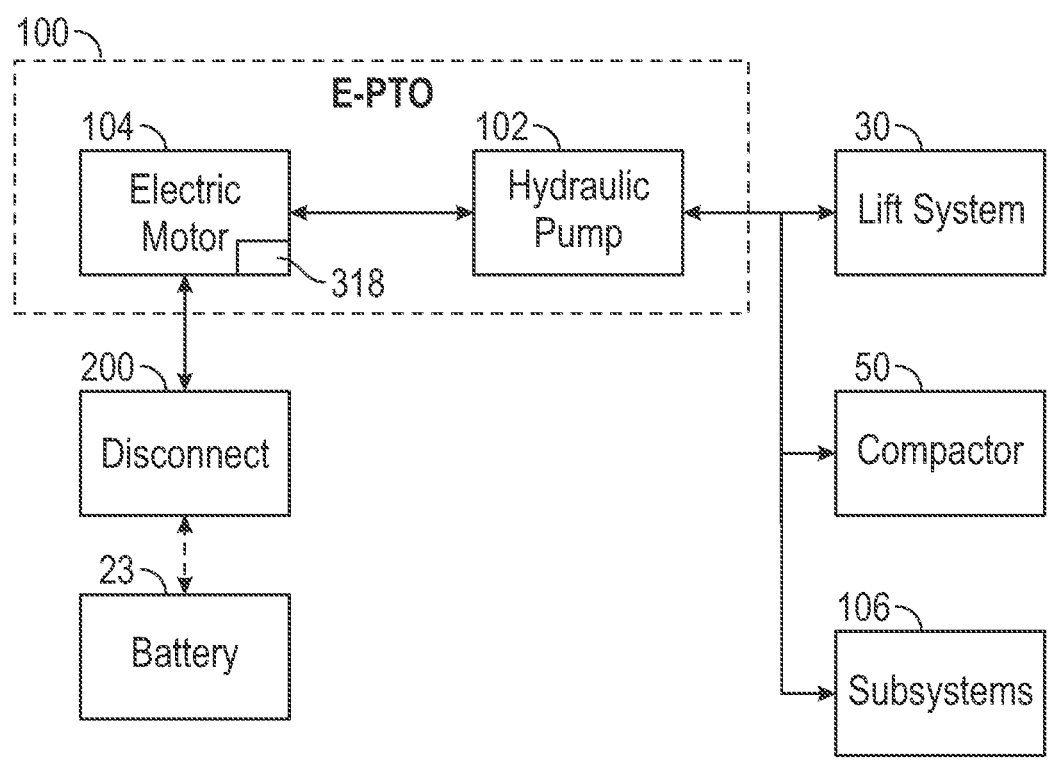
FIG. 7 is a schematic view of a control system of the refuse vehicle of FIG. 3.

The refuse truck 10 can be considered a hybrid refuse vehicle because it includes both electric and hydraulic power systems. As depicted in FIG. 7, the refuse truck 10 includes an E-PTO system 100. The E-PTO system 100 is configured to receive electrical power from the batteries 23 and convert the electrical power to hydraulic power. In some examples, the E-PTO system 100 includes an electric motor driving one or more hydraulic pumps 102. The hydraulic pump 102 pressurizes hydraulic fluid from a hydraulic fluid reservoir onboard the refuse truck 10, which can then be supplied to various hydraulic cylinders and actuators present on the refuse truck 10. For example, the hydraulic pump 102 can provide pressurized hydraulic fluid to each of the hydraulic cylinders within the lift system 30 on the refuse truck. Additionally or alternatively, the hydraulic pump 102 can provide pressurized hydraulic fluid to a hydraulic cylinder controlling the compactor 50. In still further embodiments, the hydraulic pump 102 provides pressurized hydraulic fluid to the hydraulic cylinders that control a position and orientation of the tailgate 26. The E-PTO system 100 can be positioned about the refuse truck 10 in various different places. For example, the E-PTO system 100 may be positioned within a housing 60 above or within the on-board receptacle 16, beneath a canopy 62 extending over a portion of the cab 18, or within a dedicated housing 64 alongside the vehicle body 14. Although the E-PTO system 100 may be in electrical communication with the batteries 23, the E-PTO system 100 can be separate from and spaced apart from the vehicle frame 12.

Disconnect

With continued reference to FIG. 7, the refuse truck 10 includes a disconnect 200 positioned between the batteries 23 and the E-PTO system 100. The disconnect 200 provides selective electrical communication between the batteries 23 and the E-PTO system 100 that can allow the secondary vehicle systems (e.g., the lift system, compactor, etc.) to be decoupled and de-energized from the electrical power source. The disconnect 200 can create an open circuit between the batteries 23 and the E-PTO system 100, such that no electricity is supplied from the batteries 23 to the electric motor 104. Without electrical power from the batteries 23, the electric motor 104 will not drive the hydraulic pump(s) 102. Pressure within the hydraulic system will gradually decrease, such that none of the lifting system 30, compactor 50, or vehicle subsystems 106 relying upon hydraulic power will be functional. The refuse truck 10 can then be operated in a lower power consumption mode, given the reduced electrical load required from the batteries 23 to operate the refuse truck 10. The disconnect 200 further enables the refuse truck 10 to conserve energy when the vehicle subsystems are not needed, and can also be used to lock out the various vehicle subsystems to perform maintenance activities. The disconnect 200 further allows an all-electric vehicle chassis to be retrofit with hydraulic power systems, which can be advantageous for a variety of reasons, as hydraulic power systems may be more responsive and durable than fully electric systems. In some examples, the E-PTO system 100 includes a dedicated secondary battery 108 that is configured to supply electrical power to the E-PTO system 100 if the disconnect 200 is tripped, such that the secondary vehicle systems can remain operational even when the E-PTO system 100 is not receiving electrical power from the batteries 23.

FIGS. 6-7 depict an electric power control box 202 that can function as the disconnect 200. The electric power control box 202 generally includes a housing 204 and a cover or door 206 that together define a waterproof cavity 208. The waterproof cavity 208 receives and supports electrical connections between the E-PTO system 100 and the batteries 23 to create a selective electrical coupling between the two. Fittings 210 are positioned about the perimeter of the housing 204 and define passages through the housing 204 to receive electrical inputs. The fittings 210 can be rigidly coupled (e.g., welded) or removably coupled (e.g., threaded) to the housing 204 so that a water tight seal is formed between the fittings 210 and the housing 204. In some examples, a low voltage connector tube 209 extends through the housing 204 and into the cavity 208 as well. The housing 204 is configured to be mounted to the body 14 of the refuse truck 10. In some examples, the housing 204 is positioned within the cabinet housing 64 formed alongside the body 14. As depicted in FIGS. 6-7, the housing 204 includes a mounting flange 211 extending around at least a portion of the housing 204. The mounting flange 211 includes a plurality of mounting holes 213 that can be used to fasten the housing 204 to the body 14 of the refuse truck 10. In some examples, a vent 215 is formed within an underside of the housing 204 to allow cooling air to enter into the cavity 208.

Figure 8:
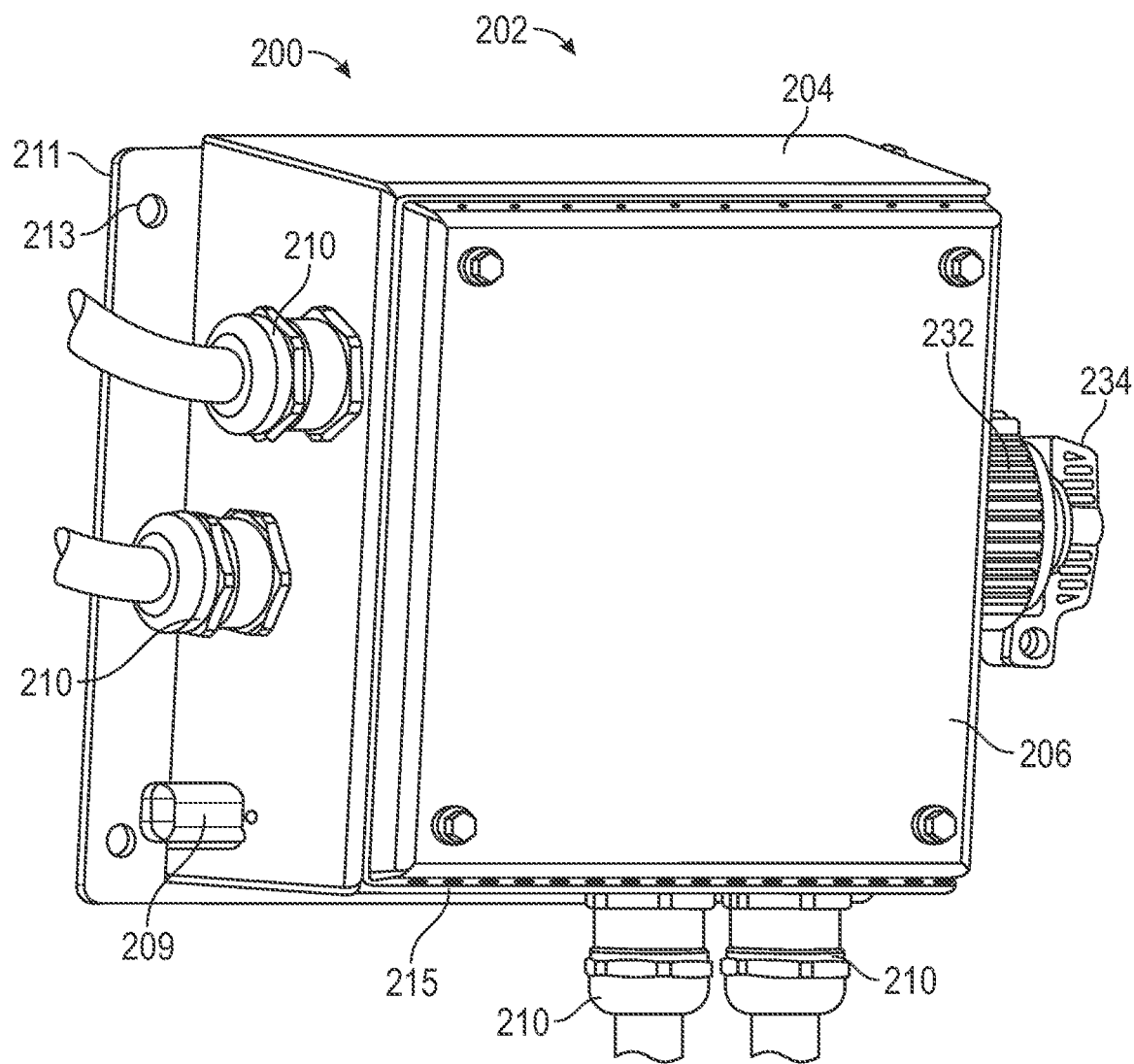
FIG. 8 is a perspective view of an electric power control box included within the control system of FIG. 5 and the refuse vehicle of FIG. 3.

The electric power control box 202 provides a positive terminal connection or bus 212 and a negative terminal connection or bus 214 to create an electrical coupling between the E-PTO system 100 and the batteries 23. As depicted in FIG. 7, the positive terminal bus 212 has a generally cylindrical body 216 and defines two distinct terminals 218 that are separated from one another by a dividing wall 220. In some examples, the terminals 218 are at least partially defined by threaded shanks 222 extending outward from the body 216 to receive and secure cable connectors 224 (e.g., ring terminals, two-pole high voltage connectors with integrated high voltage interlock loop as depicted in FIG. 8, etc.). For example, one of the threaded shanks 222 can receive the connector 224 that is coupled to a high voltage positive shielded cable 226 that is coupled to the batteries 23, while the other terminal 218 can receive the connector 224 that is coupled to a high voltage positive shielded cable 228 that extends to the E-PTO system 100. If the connectors 224 are formed as ring terminals, a nut 230 can be used to secure the connectors 224 in place on each respective terminal 218. An electrical coupling is then established between each cable 226, 228 and the positive terminal bus 212 by joining the conductive connectors 224 to the conductive shanks 222, which extend inward to an internal circuit within the cylindrical body 216, as explained in additional detail below. The dividing wall 220 can help prevent unwanted direct contact between the connectors 224 of the positive shielded cables 226, 228. In some examples, the connector 224 on the cable 228 can be formed so that the ring portion extends perpendicularly away from a longitudinal axis of the cable 228. Accordingly, the cable 228 can be coupled to the terminal 218 without bending or otherwise manipulating a shape of the cable 228.

The positive terminal bus 212 includes an externally accessible switch 232 that allows a user to manually control the electrical connections within the positive terminal bus 212. As depicted in FIG. 7, the cylindrical body 216 of the positive terminal bus 212 extends through and out of the housing 204. A waterproof cap 234 is hingedly coupled to an external end of the body 216 to provide selective access to a switch 232 within the body 216. As explained below, the switch 232 is movable between an open position and a closed position. In the closed position, the terminals 218 are electrically coupled to one another and electrical power transmitted through the cable 226 can be transferred through the positive terminal bus 212 to the cable 228 and to the E-PTO system 100. In the open position, the terminals 218 are electrically decoupled and electrical communication between the cables 226, 228 is blocked.

The negative terminal bus 214, like the positive terminal bus 212, includes a generally cylindrical body 236. The generally cylindrical body 236 is mounted (e.g., using fasteners) to a back wall 238 of the housing 204. In some examples, the cylindrical body 236 is coupled to a ground plate 240 that extends partially along the back wall 238 of the housing 204. The negative terminal bus 214 supports two terminals 242 that are again separated from one another by a dividing wall 245. The terminals 242 are again formed as threaded shanks 244 extending outward from the body 236 to receive and secure cable connectors 246 (e.g., ring terminals, two-pole high voltage connectors with integrated high voltage interlock loop as depicted in FIG. 8, etc.) As depicted in FIG. 7, one of the threaded shanks 244 receives a connector 246 that is coupled to a high voltage negative shielded cable 248 that is coupled to the batteries 23, while the other terminal 242 receives a connector 246 that is coupled to a high voltage negative shielded cable 250 that is coupled to the E-PTO system 100. If the connectors 246 are ring terminals, nuts 252 can be used to secure the connectors 246 in place on each respective terminal 242. With the nuts 252 securing the connectors 246 to the terminals 242, an electrical coupling is established between each cable 248, 250 and the negative terminal bus 214. The divider wall 245 can inhibit unwanted direct contact between the connectors 246, which in turn prevents unwanted direct contact between the cables 248, 250. Alternatively, each of the connectors 224, 246 can be formed as two-pole high voltage connectors with integrated high voltage interlock loops, as depicted in FIG. 8. The connector 224 can be plugged into female terminals 225 formed in the positive terminal bus 212 while the connector 246 can be plugged into female terminals 247 formed in the negative terminal bus 214.

Figure 9:
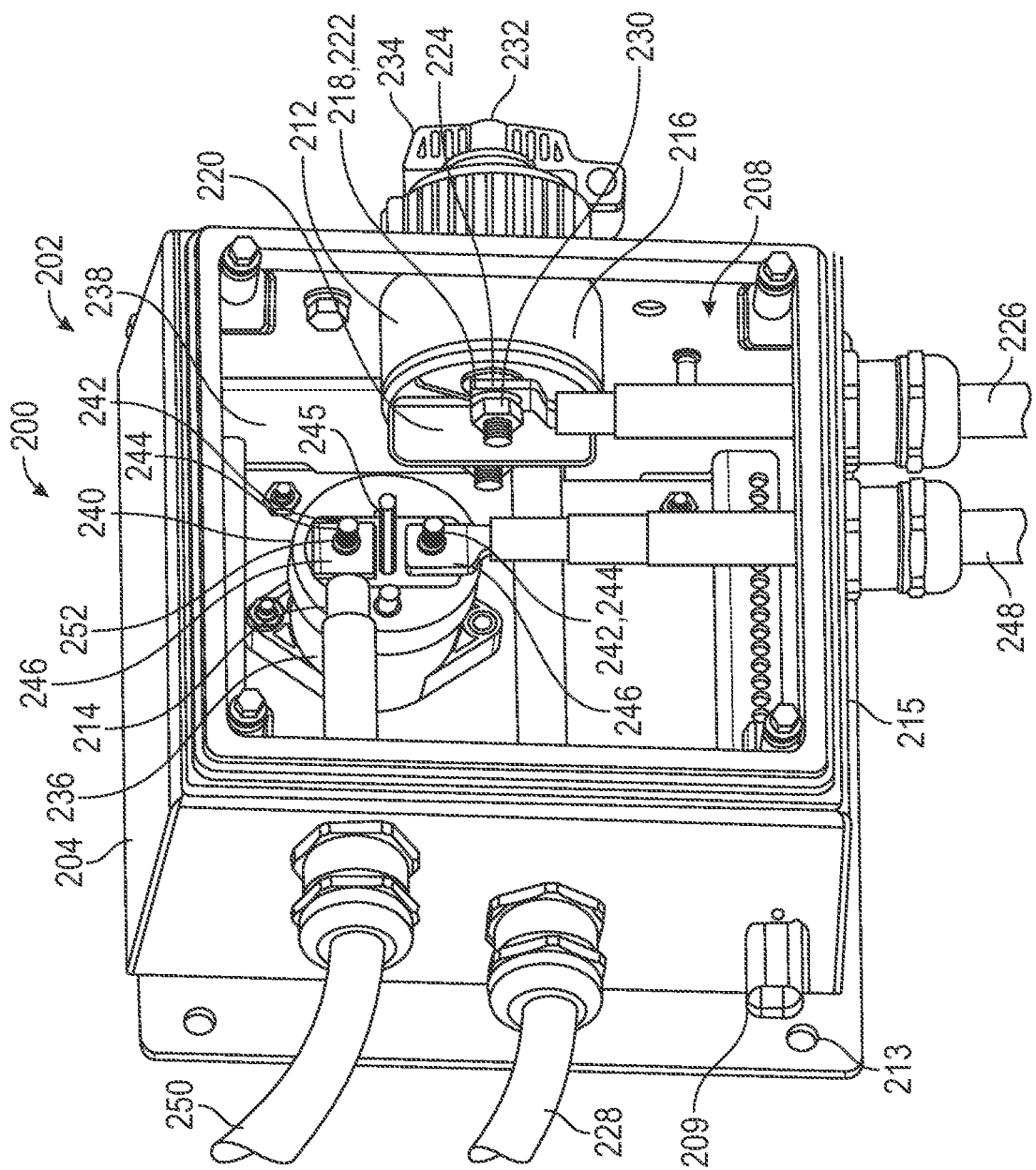
FIG. 9 is a perspective view of the electric power control box of FIG. 6 with a cover of the electric power control box removed.
Figure 10:
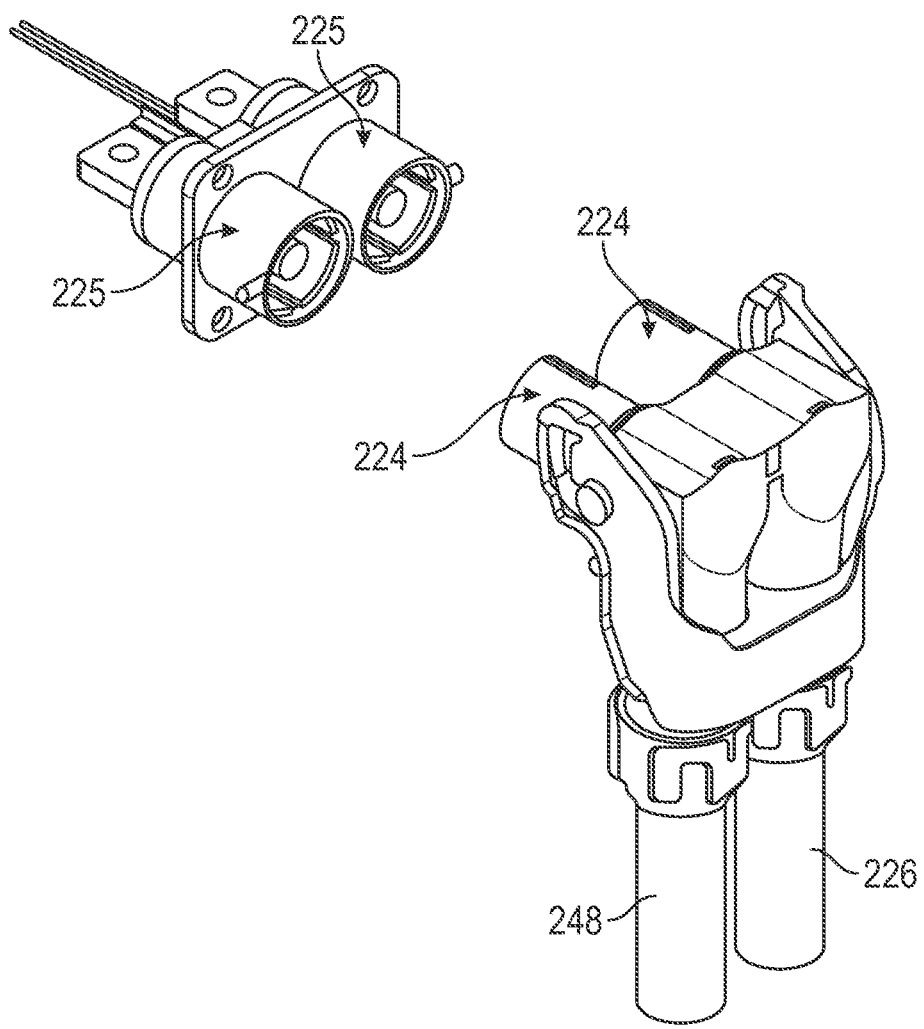
FIG. 10 is a perspective view of a plug that can be used within the electric power control box of FIG. 6.
Figure 11:
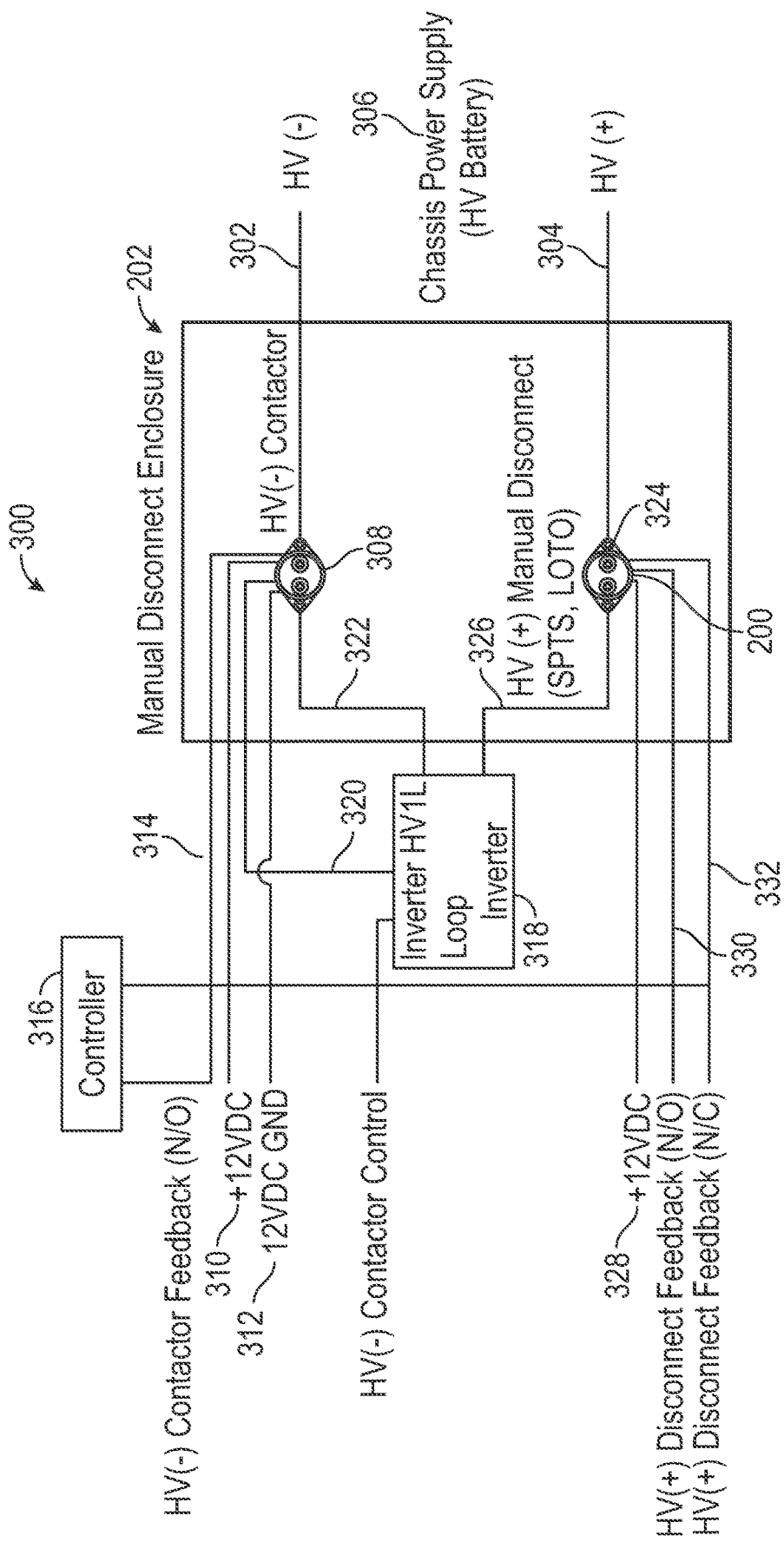
FIG. 11 is a schematic view of a circuit that can be used in and by the electric power control box of FIG. 6.

With additional reference to FIGS. 9-10, the operation of the electric power control box 202 and disconnect 200 is described in additional detail with reference to the circuit 300. As depicted in FIG. 9, the electric power control box 202 includes high voltage inputs 302, 304 coming from the chassis battery power supply 306. The high voltage inputs 302, 304 can be the negative shielded cable 248 and the positive shielded cable 226, for example, that extend away from and supply electrical power from the batteries 23 (which can constitute the chassis battery power supply 306).

The high voltage input 302 is coupled to a negative high voltage contactor 308. In some examples, the negative terminal bus 214 serves as the negative high voltage contactor 308. The negative high voltage contactor 308 is electrically coupled to an auxiliary low voltage source 310 and to ground 312. In some examples, the auxiliary low voltage source 310 is a 12 V battery that is configured to toggle a contactor switch within the negative high voltage contactor 308 between an open position and a closed position. In the open position, the terminals 242 of the negative terminal bus 214 are electrically decoupled and in the closed position, the terminals 242 of the negative terminal bus 214 are electrically coupled to one another through the contactor switch. A negative contactor feedback line 314 coupled to a controller 316 can monitor and/or control the operation of the contactor switch. The negative contactor feedback line 314 can detect a welded contactor at system startup, and is configured to open immediately if a high voltage cable (e.g., high voltage outputs 322, 326) is unplugged from an inverter 318 of the E-PTO system 100. In some examples, the inverter 318 of the E-PTO system 100 is coupled to the negative high voltage contactor 308 using a wire 320. The wire 320 can be used to ground the inverter 318. A high voltage output 322, such as the negative shielded cable 250, is also coupled to the other terminal on the negative high voltage contactor 308. Accordingly, when the contactor switch is closed, electrical power can be transmitted from the high voltage input 302, through the negative high voltage contactor 308, and to the high voltage output 322. The high voltage output 322 can provide direct current (DC) power to the inverter 318, where it is inverted into alternating current (AC) power for use by the electric motor 104 or with additional components on the vehicle (e.g., vehicle lights, climate control systems, sensors, displays, cab controls, or other auxiliary systems within the refuse truck, etc.).

The high voltage input 304 is coupled to a positive high voltage contactor 324 that also serves as a manual disconnect. For example, the positive high voltage contactor 324 can be the positive terminal bus 212 shown and described with respect to FIGS. 6-7. The positive high voltage contactor 324 includes terminals (e.g., terminals 218) that receive the high voltage input 304 and a high voltage output 326. The high voltage input 304 can be the positive shielded cable 226 while the positive high voltage output 326 can be the positive shielded cable 228, for example. The positive high voltage output 326 is coupled to the inverter 318 so that DC electrical power is supplied from the batteries 23, through the positive high voltage contactor 324, to the inverter 318, which then transforms the DC power to AC power for use by the electric motor 104. A second auxiliary power source 328 can also be coupled to the positive high voltage contactor 324. The second auxiliary power source 328 can be a 12 V battery, for example. In some examples, the second auxiliary power source 328 is in communication with the controller 316 and is configured to receive instructions from the controller 316 to control a contactor switch within the positive high voltage contactor 324. The positive high voltage contactor 324 can also include one or more disconnect feedback lines 330, 332 that can monitor the status of the positive high voltage contactor 324 to provide information to one or more of the E-PTO system 100, the batteries 23, or the controller 316, for example. In some examples, the disconnect feedback lines 330, 332 are coupled to the disconnect 200 and are wired to a common power source (e.g., the second auxiliary power source 328). When the disconnect 200 is closed, the first disconnect feedback line 330 will have 12 V while the second disconnect feedback line 332 will have 0 V. When the disconnect 200 is opened, the first disconnect feedback line 330 will have 0 V and the second disconnect feedback line 332 will have 12 V. In some examples, the controller 316 provides a fault signal if both disconnect feedback lines 330, 332 carry the same voltage.

As indicated above, the positive high voltage contactor 324 includes a disconnect 200 that can manually open a contactor switch within the positive high voltage contactor 324 to decouple the terminals 218 and decouple the high voltage input 304 from the high voltage output 326. In some examples, the disconnect 200 is a single pole, single throw (SPST) switch that can be manually moved between an open position and a closed position. In the open position, the terminals 218 are decoupled from one another and electrical power cannot pass between the battery 23 to the E-PTO system 100 through the high voltage input 304 and the high voltage output 326. In the closed position, the terminals 218 are electrically coupled and electrical power from the battery 23 is supplied through the positive high voltage contactor 324 to the inverter 318 of the E-PTO system 100 to drive the electric motor 104. The disconnect 200 can be locked out in the open position, so that the E-PTO system 100 remains decoupled from the battery 23 when maintenance is being performed, for example.

Referring now to FIG. 10, another circuit 401 that can be used to control and operate the disconnect 200 and the electric power control box 202 is depicted. The circuit 401 differs from the circuit 300 in that a pre-charge circuit 402 and pre-charge contactor 404 are included within the electric power control box 202. The pre-charge circuit 402 is in selective electrical communication with the high voltage input 302 and the high voltage output 322 using a switch 406. In some examples, the switch 406 is controlled by the controller 316. The pre-charge circuit 402 further includes a resistor 408 in series with the switch 406. In some examples, the pre-charge contactor 404 is grounded by the ground line 412. The high voltage output 322 is electrically coupled to the pre-charge contactor 404 as well, and is configured to be energized by the high voltage input 302. As explained below, the pre-charge circuit 402 is designed to prevent high inrush currents that could otherwise damage the wiring or electrical connections within the disconnect 200.

Each of the circuits 300, 401 are designed to form a reliable and efficient selective electrical coupling between the battery 23 and the E-PTO system 100. The circuits 300, 401 are further designed to be integrated into refuse trucks 10 having different battery 23 types or systems so that the E-PTO system 100 can be incorporated into the vehicle. The circuits 300, 401 further allow a user to lock out and disable the E-PTO system 100 without affecting the rest of the refuse truck 10 functions, so that the refuse truck 10 can still be driven or otherwise operated independent of the E-PTO system 100 function. This operational mode can be useful when power conservation is necessary, such as when the batteries 23 have limited remaining power.

The controller 316 can initiate electrical power transfer between the batteries 23 and the E-PTO system 100. In some examples, the controller 316 monitors the position of the disconnect 200. For example, the controller 316 can receive information from one or more of the disconnect feedback lines 330, 332 to determine whether the disconnect 200 is in the open or closed position. If the controller 316 determines that the disconnect 200 is open, the controller 316 can issue a command to open the contactor switch within the negative high voltage contactor 308. The auxiliary low voltage source 310 can then toggle the contactor switch open. In some examples, the controller 316 also communicates with the battery 23 and associated circuit to open contactors associated with the battery 23 to further isolate the battery 23 from the E-PTO system 100. Similarly, the controller 316 can control the electric power control box 202 so that the contactor switch within the negative high voltage contactor 308 closes whenever the controller 316 determines that the disconnect 200 is closed.

The controller 316 communicates with the battery 23 (e.g., to a power distribution unit (PDU) of the chassis 12 in communication with the battery 23) to initiate the transmission of electrical power from the battery 23 to and through the electric power control box 202. In some examples, the controller 316 communicates a detected voltage at the inverter 318, which can indicate whether or not the disconnect 200 is open or closed. If the contactor switch within the negative high voltage contactor 308 is open, the controller 316 can communicate with the battery 23 to ensure that the contactor switches associated with the battery 23 are open as well. Accordingly, no high voltage will be provided from the battery 23 to the electric power control box 202. If the controller 316 requests the contactors within the PDU of the battery 23 to open, but confirmation that the contactors are open is not received by the controller 316, the controller 316 will prevent the negative high voltage contactor 308 and associated switch from closing. Closing the negative high voltage contactor 308 before pre-charging the negative high voltage high voltage contactor 308 could couple the battery 23 to the electric power control box 202 in a way that might otherwise cause an inrush current that could weld the contactors or even blow a main fuse within the inverter 318. Accordingly, this condition is preferably avoided by the controller 316 and the electric power control box 202, more generally.

Similarly, the controller 316 communicates with the battery 23 to indicate that the battery 23 can be joined with the E-PTO system 100 through the inverter 318 and the electric power control box 202. The controller 316 monitors the status of the electric power control box 202. Upon detecting that the disconnect 200 has been closed and receiving confirmation that the contactors within the battery 23 (e.g., the PDU) are open, the controller 316 closes the contactor within the negative high voltage contactor 308. The controller 316 then initiates a pre-charging process to provide an initial voltage on each of the high voltage input 302 and high voltage output 322. In some examples, the controller 316 controls the switch 406 to close, thereby closing the pre-charge circuit 402 and providing an initial voltage onto the high voltage input 302 and high voltage output 322. In some examples, the pre-charge circuit operates in conjunction with the auxiliary low voltage source 310, which can pass an initial charge at a lower voltage through to the inverter 318 to charge the capacitive elements within the inverter 318. Once the controller 316 detects that an appropriate pre-charge level has been reached within inverter 318 and along the high voltage input 302 and high voltage output 322, the controller 316 opens the switch 406 and closes the contactor switch within the negative high voltage contactor 308. The controller 316 then sends instructions to the battery 23 or PDU to open the battery contactor switches, thereby providing electrical power from the battery 23 to the E-PTO system. In some examples, the battery 23 and PDU include a pre-charge circuit 401, such that the pre-charging operation can be left to the battery 23.

Figure 12:
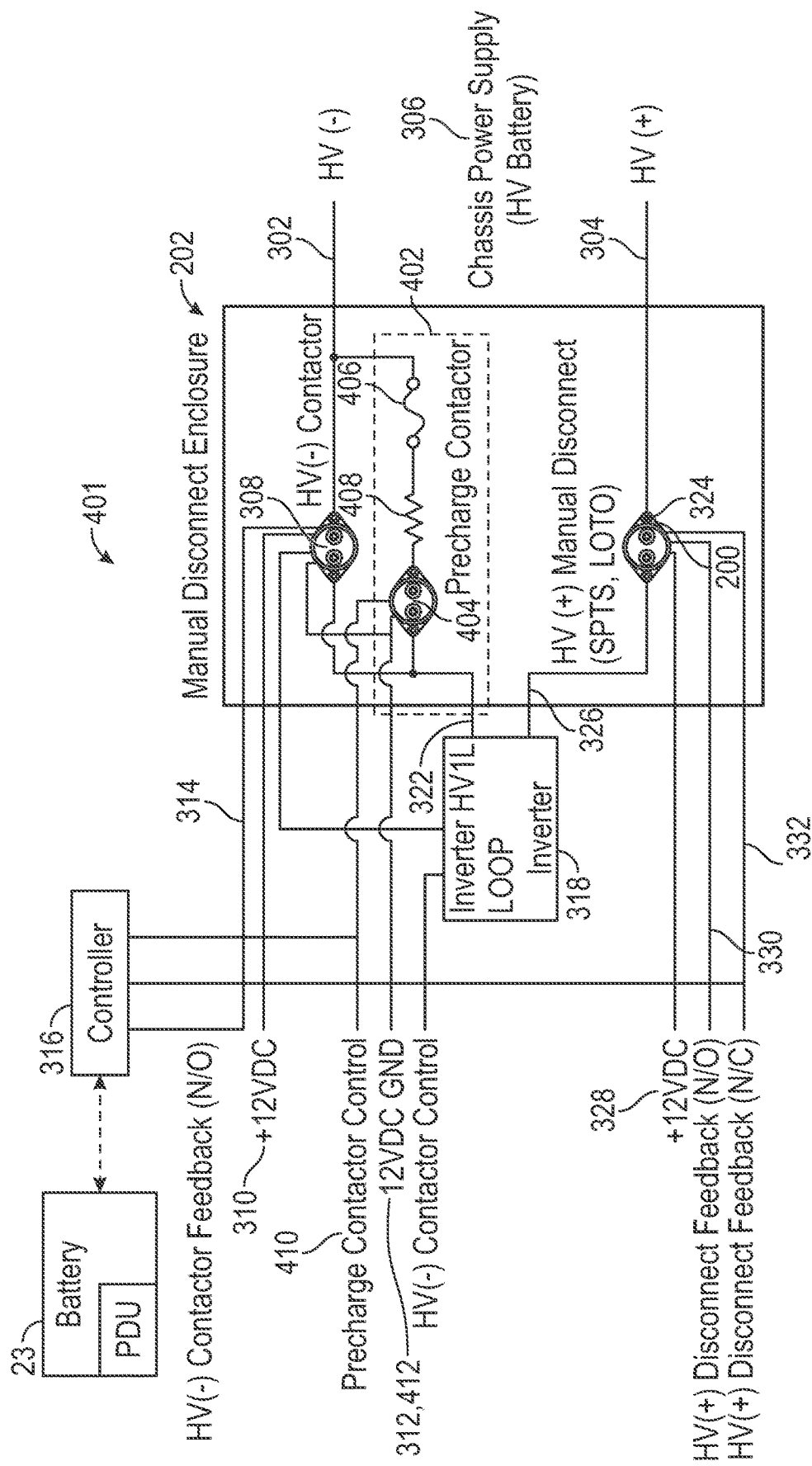
FIG. 12 is a schematic view of an alternative circuit that can be used in and by the electric power control box of FIG. 6.
Figure 13:
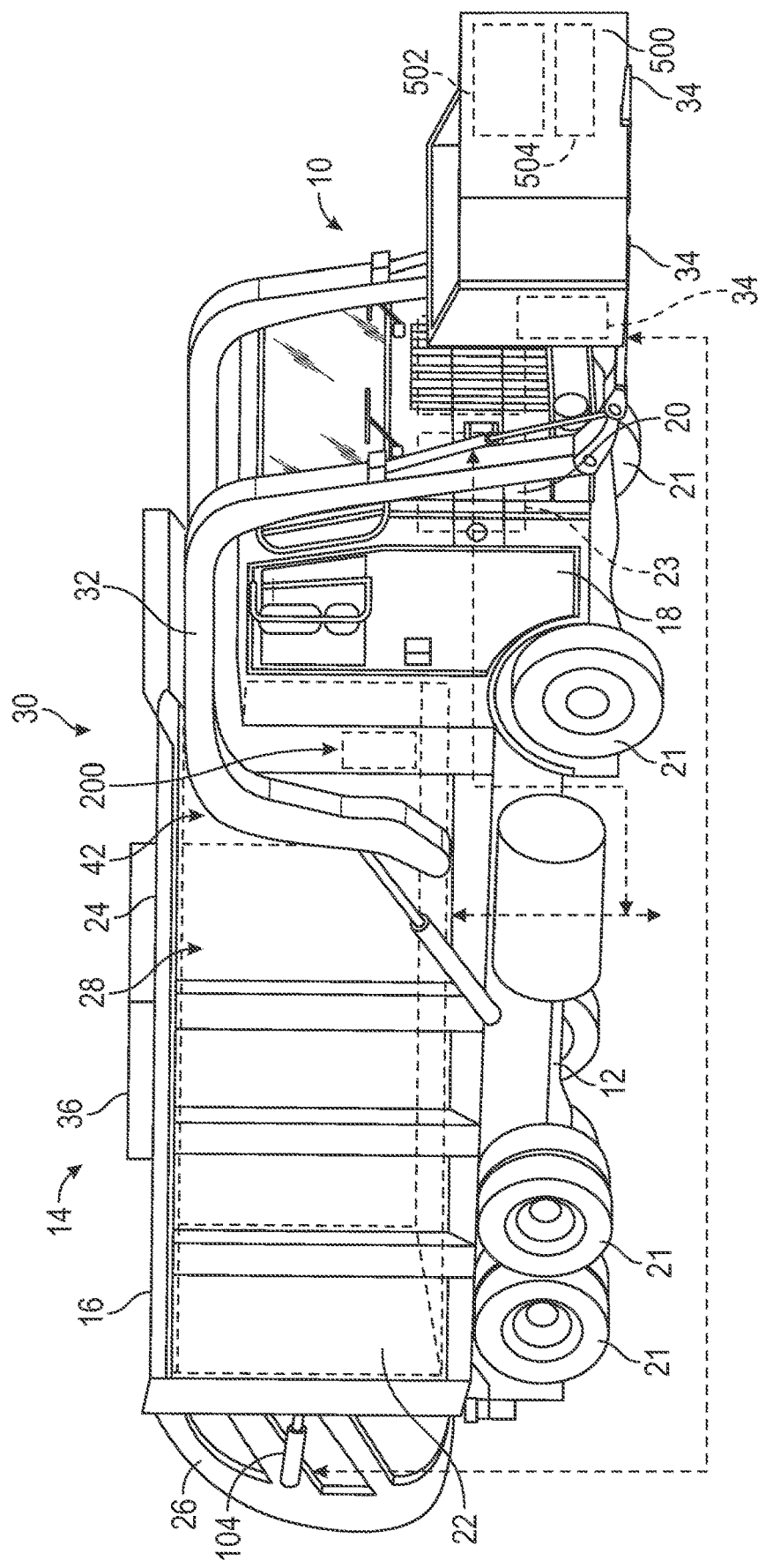
FIG. 13 is a perspective view of the front loading refuse vehicle of FIG. 1 coupled with a carry can device.
Figure 14:
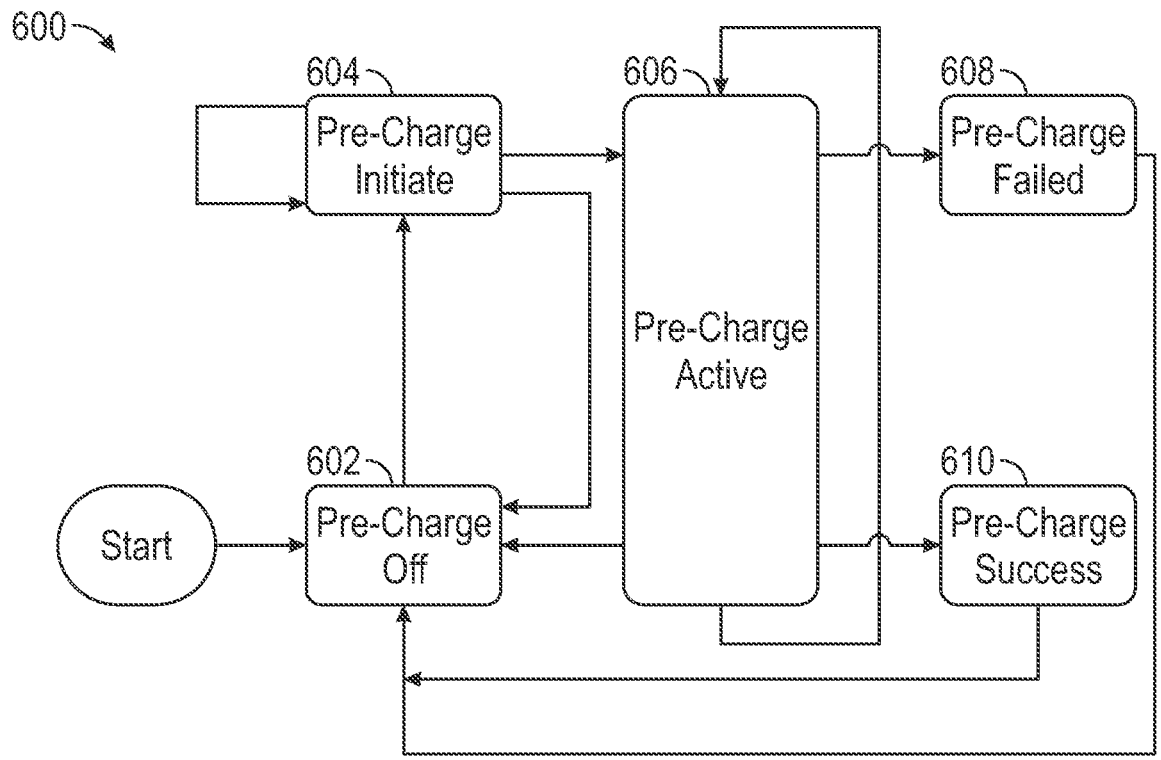
FIG. 14 is a flow chart depicting a method of operating a pre-charge circuit depicted in FIG. 10.
Figure 15:
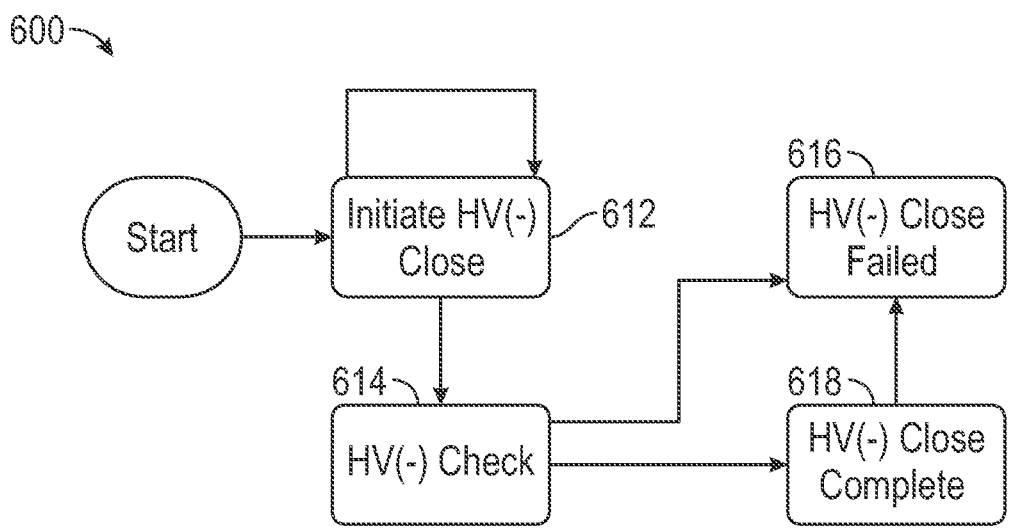
FIG. 15 is a flow chart depicting a method of operating the manual disconnect after performing a pre-charge operation using the method of FIG. 12.

Referring now to FIGS. 12-13, a method 600 of operating the pre-charge circuit 402 within the disconnect 200 is depicted. The method 600 can be performed by the controller 316, for example. The method 600 begins at step 602, where the ignition to the refuse truck 10 is off and the ignition to the refuse truck 10 has been off for a specified time period. In some examples, the specified time period for the refuse truck 10 to be "off" is about thirty seconds or more. Similarly, at step 602, the pre-charge circuit 402 is deactivated, such that no pre-charge is being provided.

At step 604, the ignition to the refuse truck 10 is turned on. Accordingly, at step 604, the ignition is on and the ignition to the refuse truck 10 has no longer been off for a specified time period. The pre-charge circuit 402 is then charged for a set time interval, so as to fully energize the pre-charge circuit 402. In some examples, the time allowed for the pre-charge circuit 402 to energize (i.e., the "pre-charge delay") is approximately 2 seconds. At step 604, the controller 316 continues to evaluate whether the pre-charge delay has elapsed, and remains at step 604 until the full pre-charge delay has occurred or the ignition is turned off. If the ignition is turned off, the method returns to step 602.

If the ignition remains on and the pre-charge delay has elapsed, the controller 316 advances to step 606. If the disconnect 200 is in the closed position and the negative high voltage contactor 308 is open, a pre-charge timer is set to 0. A pre-charge output is turned on and the pre-charge circuit is fully activated. The controller 316 continues to monitor a status of the pre-charge circuit 402 at step 606 to ensure that appropriate electrical properties are observed. If the ignition is turned off, the disconnect 200 is opened during this step, or the pre-charge timer exceeds a maximum allotted time (e.g., exceeds a timeframe of 10 seconds, for example), the controller 316 deactivates the pre-charge circuit and returns to step 602.

If the controller 316 determines that the pre-charge timer exceeds the maximum allotted time or the pre-charge output is turned off at step 606 before completing the pre-charging process, the controller 316 proceeds to step 608, and issues a failure signal. The failure signal can take a variety of forms, and can prevent the battery 23 from being coupled with the E-PTO system 100. In some examples, the controller 316 can issue an alert to a user within the cab 18 that the E-PTO system 100 cannot be coupled with the battery 23. In still other examples, an alarm within the cab 18 is triggered. The controller 316 then returns to step 602.

If the controller 316 continues to observe the pre-charge circuit 402 operating at step 606, the controller 316 will continue to update the pre-charge timer. Once the components within the pre-charge circuit 402 reach a certain charge level, the pre-charge process is considered successful at step 610. For example, in some embodiments, the controller 316 monitors a voltage of the inverter 318. When the inverter 318 reaches a target voltage (e.g., about 550 Volts), and holds that voltage for a specified time period (e.g., 1 second), the pre-charge process is complete, and the E-PTO system 100 is ready to join the battery 23. If, alternatively, the ignition is turned off or the pre-charge output is discontinued at step 610, the method returns to step 602, and the pre-charge circuit is disconnected or otherwise discharged.

If the pre-charging process at step 610 proves successful, the method 600 advances to step 612, shown in FIG. 13. At step 612, the controller 316 begins to initiate the closing process for the negative high voltage contactor 308 to complete the circuit and couple the E-PTO system 100 with the battery 23. As the method advances to step 612, the ignition is on, the access door 206 to the electric power control box 202 is closed, and the disconnect 200 is in the closed position. At step 612, the controller 316 monitors a negative high voltage contactor timer, and counts down incrementally as the voltage within the pre-charge circuit is supplied to the negative high voltage contactor. In some examples, the negative high voltage contactor timer is initially set to 500 milliseconds, for example. Once the negative high voltage contactor timer reaches 0 (meaning pre-charge has been sufficiently supplied), the controller performs a negative high voltage contactor check at step 614.

If, at step 614, the controller 316 determines that the negative high voltage contactor 308 is still open, the method advances to step 616, where the negative high voltage contactor 308 closing process fails. The controller 316 determines the process has failed and can issue an alert or warning that the coupling process has not been completed. In some examples, the negative high voltage contactor 308 output switch is opened as well upon detecting a failure.

If the controller 316 instead determines that the negative high voltage contactor 308 is closed (e.g., by receiving a digital signal, for example), the method advances to step

618. The controller then commands the pre-charge circuit 402 to power down and communication between the battery 23 and E-PTO system 100 is completed. In some examples, the controller 316 continues to monitor the negative high voltage contactor 308 after coupling has been completed, as if the contactor opens, the process will fail and the method will proceed to step 616. Additionally, the method 600 will return to step 602 at any time during steps 612-618 if the access door 206 of the electric power control box 202 is opened, the manual disconnect 200 is moved to the open position, the negative high voltage contactor 308 is opened, or a motor on command is canceled. If such situations are detected, the negative high voltage contactor 308 will be disconnected such that no electrical power will be transmitted from the battery 23 and the negative high voltage contactor 308. In some examples, the controller 316 further monitors a negative high voltage contactor 308 enable signal, which is monitored during steps 612-618 of the method 600.

Using the previously described systems and methods, a refuse truck can be effectively outfitted with an E-PTO system that can convert electrical power to hydraulic power to provide pressurized hydraulic fluid to various subsystems on the vehicle. The E-PTO system includes a disconnect that allows the E-PTO system to be decoupled from the battery of the refuse truck so that the vehicle can be operated in a low power mode that allows the vehicle to drive while the lifting system, compactor, and/or other hydraulic systems are disabled. The disconnect can lock out the E-PTO system so that the E-PTO system is disconnected from any electrical power sources that might otherwise cause the inverter, electrical motor, or hydraulic pump to operate during a maintenance procedure. The disconnect can be a manual switch that can be readily accessed by a user to couple or decouple the E-PTO system from the battery of the vehicle.

FIGS. 6-7 depict an electric power control box 202 that can function as the disconnect 200. The electric power control box 202 generally includes a housing 204 and a cover or door 206 that together define a waterproof cavity 208. The waterproof cavity 208 receives and supports electrical connections between the E-PTO system 100 and the batteries 23 to create a selective electrical coupling between the two. Fittings 210 are positioned about the perimeter of the housing 204 and define passages through the housing 204 to receive electrical inputs. The fittings 210 can be rigidly coupled (e.g., welded) or removably coupled (e.g., threaded) to the housing 204 so that a water tight seal is formed between the fittings 210 and the housing 204. In some examples, a low voltage connector tube 209 extends through the housing 204 and into the cavity 208 as well. The housing 204 is configured to be mounted to the body 14 of the refuse truck 10. In some examples, the housing 204 is positioned within the cabinet housing 64 formed alongside the body 14. As depicted in FIGS. 6-7, the housing 204 includes a mounting flange 211 extending around at least a portion of the housing 204. The mounting flange 211 includes a plurality of mounting holes 213 that can be used to fasten the housing 204 to the body 14 of the refuse truck 10. In some examples, a vent 215 is formed within an underside of the housing 204 to allow cooling air to enter into the cavity 208.

The electric power control box 202 provides a positive terminal connection or bus 212 and a negative terminal connection or bus 214 to create an electrical coupling between the E-PTO system 100 and the batteries 23. As depicted in FIG. 7, the positive terminal bus 212 has a generally cylindrical body 216 and defines two distinct terminals 218 that are separated from one another by a dividing wall 220. In some examples, the terminals 218 are at least partially defined by threaded shanks 222 extending outward from the body 216 to receive and secure cable connectors 224 (e.g., ring terminals, two-pole high voltage connectors with integrated high voltage interlock loop as depicted in FIG. 8, etc.). For example, one of the threaded shanks 222 can receive the connector 224 that is coupled to a high voltage positive shielded cable 226 that is coupled to the batteries 23, while the other terminal 218 can receive the connector 224 that is coupled to a high voltage positive shielded cable 228 that extends to the E-PTO system 100. If the connectors 224 are formed as ring terminals, a nut 230 can be used to secure the connectors 224 in place on each respective terminal 218. An electrical coupling is then established between each cable 226, 228 and the positive terminal bus 212 by joining the conductive connectors 224 to the conductive shanks 222, which extend inward to an internal circuit within the cylindrical body 216, as explained in additional detail below. The dividing wall 220 can help prevent unwanted direct contact between the connectors 224 of the positive shielded cables 226, 228. In some examples, the connector 224 on the cable 228 can be formed so that the ring portion extends perpendicularly away from a longitudinal axis of the cable 228. Accordingly, the cable 228 can be coupled to the terminal 218 without bending or otherwise manipulating a shape of the cable 228.

The positive terminal bus 212 includes an externally accessible switch 232 that allows a user to manually control the electrical connections within the positive terminal bus 212. As depicted in FIG. 7, the cylindrical body 216 of the positive terminal bus 212 extends through and out of the housing 204. A waterproof cap 234 is hingedly coupled to an external end of the body 216 to provide selective access to a switch 232 within the body 216. As explained below, the switch 232 is movable between an open position and a closed position. In the closed position, the terminals 218 are electrically coupled to one another and electrical power transmitted through the cable 226 can be transferred through the positive terminal bus 212 to the cable 228 and to the E-PTO system 100. In the open position, the terminals 218 are electrically decoupled and electrical communication between the cables 226, 228 is blocked.

The negative terminal bus 214, like the positive terminal bus 212, includes a generally cylindrical body 236. The generally cylindrical body 236 is mounted (e.g., using fasteners) to a back wall 238 of the housing 204. In some examples, the cylindrical body 236 is coupled to a ground plate 240 that extends partially along the back wall 238 of the housing 204. The negative terminal bus 214 supports two terminals 242 that are again separated from one another by a dividing wall 245. The terminals 242 are again formed as threaded shanks 244 extending outward from the body 236 to receive and secure cable connectors 246 (e.g., ring terminals, two-pole high voltage connectors with integrated high voltage interlock loop as depicted in FIG. 8, etc.) As depicted in FIG. 7, one of the threaded shanks 244 receives a connector 246 that is coupled to a high voltage negative shielded cable 248 that is coupled to the batteries 23, while the other terminal 242 receives a connector 246 that is coupled to a high voltage negative shielded cable 250 that is coupled to the E-PTO system 100. If the connectors 246 are ring terminals, nuts 252 can be used to secure the connectors 246 in place on each respective terminal 242. With the nuts 252 securing the connectors 246 to the terminals 242, an electrical coupling is established between each cable 248, 250 and the negative terminal bus 214. The divider wall 245 can inhibit unwanted direct contact between the connectors 246, which in turn prevents unwanted direct contact between the cables 248, 250. Alternatively, each of the connectors 224, 246 can be formed as two-pole high voltage connectors with integrated high voltage interlock loops, as depicted in FIG. 8. The connector 224 can be plugged into female terminals 225 formed in the positive terminal bus 212 while the connector 246 can be plugged into female terminals 247 formed in the negative terminal bus 214.

With additional reference to FIGS. 9-10, the operation of the electric power control box 202 and disconnect 200 is described in additional detail with reference to the circuit 300. As depicted in FIG. 9, the electric power control box 202 includes high voltage inputs 302, 304 coming from the chassis battery power supply 306. The high voltage inputs 302, 304 can be the negative shielded cable 248 and the positive shielded cable 226, for example, that extend away from and supply electrical power from the batteries 23 (which can constitute the chassis battery power supply 306).

The high voltage input 302 is coupled to a negative high voltage contactor 308. In some examples, the negative terminal bus 214 serves as the negative high voltage contactor 308. The negative high voltage contactor 308 is electrically coupled to an auxiliary low voltage source 310 and to ground 312. In some examples, the auxiliary low voltage source 310 is a 12 V battery that is configured to toggle a contactor switch within the negative high voltage contactor 308 between an open position and a closed position. In the open position, the terminals 242 of the negative terminal bus 214 are electrically decoupled and in the closed position, the terminals 242 of the negative terminal bus 214 are electrically coupled to one another through the contactor switch. A negative contactor feedback line 314 coupled to a controller 316 can monitor and/or control the operation of the contactor switch. The negative contactor feedback line 314 can detect a welded contactor at system startup, and is configured to open immediately if a high voltage cable (e.g., high voltage outputs 322, 326) is unplugged from an inverter 318 of the E-PTO system 100. In some examples, the inverter 318 of the E-PTO system 100 is coupled to the negative high voltage contactor 308 using a wire 320. The wire 320 can be used to ground the inverter 318. A high voltage output 322, such as the negative shielded cable 250, is also coupled to the other terminal on the negative high voltage contactor 308. Accordingly, when the contactor switch is closed, electrical power can be transmitted from the high voltage input 302, through the negative high voltage contactor 308, and to the high voltage output 322. The high voltage output 322 can provide direct current (DC) power to the inverter 318, where it is inverted into alternating current (AC) power for use by the electric motor 104 or with additional components on the vehicle (e.g., vehicle lights, climate control systems, sensors, displays, cab controls, or other auxiliary systems within the refuse truck, etc.).

The high voltage input 304 is coupled to a positive high voltage contactor 324 that also serves as a manual disconnect. For example, the positive high voltage contactor 324 can be the positive terminal bus 212 shown and described with respect to FIGS. 6-7. The positive high voltage contactor 324 includes terminals (e.g., terminals 218) that receive the high voltage input 304 and a high voltage output 326. The high voltage input 304 can be the positive shielded cable 226 while the positive high voltage output 326 can be the positive shielded cable 228, for example. The positive high voltage output 326 is coupled to the inverter 318 so that DC electrical power is supplied from the batteries 23, through the positive high voltage contactor 324, to the inverter 318, which then transforms the DC power to AC power for use by the electric motor 104. A second auxiliary power source 328 can also be coupled to the positive high voltage contactor 324. The second auxiliary power source 328 can be a 12 V battery, for example. In some examples, the second auxiliary power source 328 is in communication with the controller 316 and is configured to receive instructions from the controller 316 to control a contactor switch within the positive high voltage contactor 324. The positive high voltage contactor 324 can also include one or more disconnect feedback lines 330, 332 that can monitor the status of the positive high voltage contactor 324 to provide information to one or more of the E-PTO system 100, the batteries 23, or the controller 316, for example. In some examples, the disconnect feedback lines 330, 332 are coupled to the disconnect 200 and are wired to a common power source (e.g., the second auxiliary power source 328). When the disconnect 200 is closed, the first disconnect feedback line 330 will have 12 V while the second disconnect feedback line 332 will have 0 V. When the disconnect 200 is opened, the first disconnect feedback line 330 will have 0 V and the second disconnect feedback line 332 will have 12 V. In some examples, the controller 316 provides a fault signal if both disconnect feedback lines 330, 332 carry the same voltage.

As indicated above, the positive high voltage contactor 324 includes a disconnect 200 that can manually open a contactor switch within the positive high voltage contactor 324 to decouple the terminals 218 and decouple the high voltage input 304 from the high voltage output 326. In some examples, the disconnect 200 is a single pole, single throw (SPST) switch that can be manually moved between an open position and a closed position. In the open position, the terminals 218 are decoupled from one another and electrical power cannot pass between the battery 23 to the E-PTO system 100 through the high voltage input 304 and the high voltage output 326. In the closed position, the terminals 218 are electrically coupled and electrical power from the battery 23 is supplied through the positive high voltage contactor 324 to the inverter 318 of the E-PTO system 100 to drive the electric motor 104. The disconnect 200 can be locked out in the open position, so that the E-PTO system 100 remains decoupled from the battery 23 when maintenance is being performed, for example.

Referring now to FIG. 10, another circuit 401 that can be used to control and operate the disconnect 200 and the electric power control box 202 is depicted. The circuit 401 differs from the circuit 300 in that a pre-charge circuit 402 and pre-charge contactor 404 are included within the electric power control box 202. The pre-charge circuit 402 is in selective electrical communication with the high voltage input 302 and the high voltage output 322 using a switch 406. In some examples, the switch 406 is controlled by the controller 316. The pre-charge circuit 402 further includes a resistor 408 in series with the switch 406. In some examples, the pre-charge contactor 404 is grounded by the ground line 412. The high voltage output 322 is electrically coupled to the pre-charge contactor 404 as well, and is configured to be energized by the high voltage input 302. As explained below, the pre-charge circuit 402 is designed to prevent high inrush currents that could otherwise damage the wiring or electrical connections within the disconnect 200.

Each of the circuits 300, 401 are designed to form a reliable and efficient selective electrical coupling between the battery 23 and the E-PTO system 100. The circuits 300, 401 are further designed to be integrated into refuse trucks 10 having different battery 23 types or systems so that the E-PTO system 100 can be incorporated into the vehicle. The circuits 300, 401 further allow a user to lock out and disable the E-PTO system 100 without affecting the rest of the refuse truck 10 functions, so that the refuse truck 10 can still be driven or otherwise operated independent of the E-PTO system 100 function. This operational mode can be useful when power conservation is necessary, such as when the batteries 23 have limited remaining power.

The controller 316 can initiate electrical power transfer between the batteries 23 and the E-PTO system 100. In some examples, the controller 316 monitors the position of the disconnect 200. For example, the controller 316 can receive information from one or more of the disconnect feedback lines 330, 332 to determine whether the disconnect 200 is in the open or closed position. If the controller 316 determines that the disconnect 200 is open, the controller 316 can issue a command to open the contactor switch within the negative high voltage contactor 308. The auxiliary low voltage source 310 can then toggle the contactor switch open. In some examples, the controller 316 also communicates with the battery 23 and associated circuit to open contactors associated with the battery 23 to further isolate the battery 23 from the E-PTO system 100. Similarly, the controller 316 can control the electric power control box 202 so that the contactor switch within the negative high voltage contactor 308 closes whenever the controller 316 determines that the disconnect 200 is closed.

The controller 316 communicates with the battery 23 (e.g., to a power distribution unit (PDU) of the chassis 12 in communication with the battery 23) to initiate the transmission of electrical power from the battery 23 to and through the electric power control box 202. In some examples, the controller 316 communicates a detected voltage at the inverter 318, which can indicate whether or not the disconnect 200 is open or closed. If the contactor switch within the negative high voltage contactor 308 is open, the controller 316 can communicate with the battery 23 to ensure that the contactor switches associated with the battery 23 are open as well. Accordingly, no high voltage will be provided from the battery 23 to the electric power control box 202. If the controller 316 requests the contactors within the PDU of the battery 23 to open, but confirmation that the contactors are open is not received by the controller 316, the controller 316 will prevent the negative high voltage contactor 308 and associated switch from closing. Closing the negative high voltage contactor 308 before pre-charging the negative high voltage high voltage contactor 308 could couple the battery 23 to the electric power control box 202 in a way that might otherwise cause an inrush current that could weld the contactors or even blow a main fuse within the inverter 318. Accordingly, this condition is preferably avoided by the controller 316 and the electric power control box 202, more generally.

Similarly, the controller 316 communicates with the battery 23 to indicate that the battery 23 can be joined with the E-PTO system 100 through the inverter 318 and the electric power control box 202. The controller 316 monitors the status of the electric power control box 202. Upon detecting that the disconnect 200 has been closed and receiving confirmation that the contactors within the battery 23 (e.g., the PDU) are open, the controller 316 closes the contactor within the negative high voltage contactor 308. The controller 316 then initiates a pre-charging process to provide an initial voltage on each of the high voltage input 302 and high voltage output 322. In some examples, the controller 316 controls the switch 406 to close, thereby closing the pre-charge circuit 402 and providing an initial voltage onto the high voltage input 302 and high voltage output 322. In some examples, the pre-charge circuit operates in conjunction with the auxiliary low voltage source 310, which can pass an initial charge at a lower voltage through to the inverter 318 to charge the capacitive elements within the inverter 318. Once the controller 316 detects that an appropriate pre-charge level has been reached within inverter 318 and along the high voltage input 302 and high voltage output 322, the controller 316 opens the switch 406 and closes the contactor switch within the negative high voltage contactor 308. The controller 316 then sends instructions to the battery 23 or PDU to open the battery contactor switches, thereby providing electrical power from the battery 23 to the E-PTO system. In some examples, the battery 23 and PDU include a pre-charge circuit 401, such that the pre-charging operation can be left to the battery 23.

Referring now to FIGS. 12-13, a method 600 of operating the pre-charge circuit 402 within the disconnect 200 is depicted. The method 600 can be performed by the controller 316, for example. The method 600 begins at step 602, where the ignition to the refuse truck 10 is off and the ignition to the refuse truck 10 has been off for a specified time period. In some examples, the specified time period for the refuse truck 10 to be "off" is about thirty seconds or more. Similarly, at step 602, the pre-charge circuit 402 is deactivated, such that no pre-charge is being provided.

At step 604, the ignition to the refuse truck 10 is turned on. Accordingly, at step 604, the ignition is on and the ignition to the refuse truck 10 has no longer been off for a specified time period. The pre-charge circuit 402 is then charged for a set time interval, so as to fully energize the pre-charge circuit 402. In some examples, the time allowed for the pre-charge circuit 402 to energize (i.e., the "pre-charge delay") is approximately 2 seconds. At step 604, the controller 316 continues to evaluate whether the pre-charge delay has elapsed, and remains at step 604 until the full pre-charge delay has occurred or the ignition is turned off. If the ignition is turned off, the method returns to step 602.

If the ignition remains on and the pre-charge delay has elapsed, the controller 316 advances to step 606. If the disconnect 200 is in the closed position and the negative high voltage contactor 308 is open, a pre-charge timer is set to 0. A pre-charge output is turned on and the pre-charge circuit is fully activated. The controller 316 continues to monitor a status of the pre-charge circuit 402 at step 606 to ensure that appropriate electrical properties are observed. If the ignition is turned off, the disconnect 200 is opened during this step, or the pre-charge timer exceeds a maximum allotted time (e.g., exceeds a timeframe of 10 seconds, for example), the controller 316 deactivates the pre-charge circuit and returns to step 602.

If the controller 316 determines that the pre-charge timer exceeds the maximum allotted time or the pre-charge output is turned off at step 606 before completing the pre-charging process, the controller 316 proceeds to step 608, and issues a failure signal. The failure signal can take a variety of forms, and can prevent the battery 23 from being coupled with the E-PTO system 100. In some examples, the controller 316 can issue an alert to a user within the cab 18 that the E-PTO system 100 cannot be coupled with the battery 23. In still other examples, an alarm within the cab 18 is triggered. The controller 316 then returns to step 602.

If the controller 316 continues to observe the pre-charge circuit 402 operating at step 606, the controller 316 will continue to update the pre-charge timer. Once the components within the pre-charge circuit 402 reach a certain charge level, the pre-charge process is considered successful at step 610. For example, in some embodiments, the controller 316 monitors a voltage of the inverter 318. When the inverter 318 reaches a target voltage (e.g., about 550 Volts), and holds that voltage for a specified time period (e.g., 1 second), the pre-charge process is complete, and the E-PTO system 100 is ready to join the battery 23. If, alternatively, the ignition is turned off or the pre-charge output is discontinued at step 610, the method returns to step 602, and the pre-charge circuit is disconnected or otherwise discharged.

If the pre-charging process at step 610 proves successful, the method 600 advances to step 612, shown in FIG. 13. At step 612, the controller 316 begins to initiate the closing process for the negative high voltage contactor 308 to complete the circuit and couple the E-PTO system 100 with the battery 23. As the method advances to step 612, the ignition is on, the access door 206 to the electric power control box 202 is closed, and the disconnect 200 is in the closed position. At step 612, the controller 316 monitors a negative high voltage contactor timer, and counts down incrementally as the voltage within the pre-charge circuit is supplied to the negative high voltage contactor. In some examples, the negative high voltage contactor timer is initially set to 500 milliseconds, for example. Once the negative high voltage contactor timer reaches 0 (meaning pre-charge has been sufficiently supplied), the controller performs a negative high voltage contactor check at step 614.

If, at step 614, the controller 316 determines that the negative high voltage contactor 308 is still open, the method advances to step 616, where the negative high voltage contactor 308 closing process fails. The controller 316 determines the process has failed and can issue an alert or warning that the coupling process has not been completed. In some examples, the negative high voltage contactor 308 output switch is opened as well upon detecting a failure.

If the controller 316 instead determines that the negative high voltage contactor 308 is closed (e.g., by receiving a digital signal, for example), the method advances to step 618. The controller then commands the pre-charge circuit 402 to power down and communication between the battery 23 and E-PTO system 100 is completed. In some examples, the controller 316 continues to monitor the negative high voltage contactor 308 after coupling has been completed, as if the contactor opens, the process will fail and the method will proceed to step 616. Additionally, the method 600 will return to step 602 at any time during steps 612-618 if the access door 206 of the electric power control box 202 is opened, the manual disconnect 200 is moved to the open position, the negative high voltage contactor 308 is opened, or a motor on command is canceled. If such situations are detected, the negative high voltage contactor 308 will be disconnected such that no electrical power will be transmitted from the battery 23 and the negative high voltage contactor 308. In some examples, the controller 316 further monitors a negative high voltage contactor 308 enable signal, which is monitored during steps 612-618 of the method 600.

Using the previously described systems and methods, a refuse truck can be effectively outfitted with an E-PTO system that can convert electrical power to hydraulic power to provide pressurized hydraulic fluid to various subsystems on the vehicle. The E-PTO system includes a disconnect that allows the E-PTO system to be decoupled from the battery of the refuse truck so that the vehicle can be operated in a low power mode that allows the vehicle to drive while the lifting system, compactor, and/or other hydraulic systems are disabled. The disconnect can lock out the E-PTO system so that the E-PTO system is disconnected from any electrical power sources that might otherwise cause the inverter, electrical motor, or hydraulic pump to operate during a maintenance procedure. The disconnect can be a manual switch that can be readily accessed by a user to couple or decouple the E-PTO system from the battery of the vehicle.

E-PTO System

The body assembly 14 generally includes an E-PTO system 100, hydraulics 300, and auxiliary systems 400 that are in communication with a central controller 106. The central controller communicates with the PDU 25 to issue electrical power requests that can then be processed and/or otherwise handled by the PDU 25 to transmit electrical power from the battery 23 through to the body assembly 14 and to the systems to be powered. As depicted in FIG. 5, the controller 106 is in communication with a memory 108 (e.g., a cloud-based memory, an archive, a database, onboard memory, etc.) that can supply a variety of different control parameters and information to execute different vehicle functions. In some examples, the memory 108 is in communication with a network 110 (e.g., the internet, a fleet management system, etc.) that provides information to the memory 108 for use by the refuse vehicle 10. For example, route-based data or past performance data can be provided to the refuse vehicle 10 through the network 110 and/or the memory 108 to the controller 106.

The controller 106 can distribute electrical power received from the battery 23 and PDU 25 to the various different systems on the refuse vehicle 10, including an E-PTO system 100, hydraulics 300, and various auxiliary systems 400. The E-PTO system 100, for example, is configured to receive electrical power from the batteries 23 and convert the electrical power to hydraulic power. In some examples, the E-PTO system 100 includes an electric motor 102 driving a hydraulic pump 104. According to various embodiments, one or more sensors 132 are configured to detect fluid pressure within the hydraulic system 300. According to various embodiments, the E-PTO system 100 includes a transmission 134 positioned inline between the electric motor 102 and the hydraulic pump 104. The controller 106 may control the transmission 134 to optimize performance of the E-PTO system 100. The hydraulic pump 104 pressurizes hydraulic fluid onboard the refuse vehicle 10, which can then be supplied to various hydraulic cylinders and actuators present upon the body assembly 14 of the refuse vehicle 10. For example, the hydraulic pump 104 can provide pressurized hydraulic fluid to each of the hydraulic cylinders within the lift system 30 on the refuse vehicle. Additionally or alternatively, the hydraulic pump 104 can provide pressurized hydraulic fluid to a hydraulic cylinder controlling the compactor 50 or packer 62. In some embodiments, the hydraulic pump 104 also provides pressurized hydraulic fluid to the hydraulic cylinders that control a position and orientation of the tailgate 26, which is movable to empty the vehicle 10 of refuse. The hydraulic pump 104 can be a swashplate-type variable displacement pump, for example, that supplies all the hydraulics 300 upon the refuse vehicle 10. The hydraulics 300 can be in communication with the controller 106, which can communicate with the electric motor 102 and hydraulic pump 104 to deliver the desired hydraulic loads. Simultaneously, the controller 106 can communicate with the PDU 25 to request the necessary battery power load to drive the electric motor 102 to supply pressurized fluid to the hydraulics 300. In some examples, the controller 106 provides electrical power from the battery 23 to an inverter 112, which can convert DC power from the battery 23 (and from the PDU 25) to AC power for use by the electric motor 102. In some examples, the inverter 112 can be used to vary the frequency of the transformed AC power to adjust the performance of the electric motor 102. In some examples, the inverter 112 can be used to convert electrical power from the battery 23 into AC power for use by the electric motor 20 as well. In some examples, each of the chassis 12 and the body 14 include separate inverters 112 that can be used to supply AC electrical power to components on the chassis 12 and body 14, respectively. The frequency output of the inverter 112 can be adjusted by the controller 106 and/or a variable frequency drive.

The controller 106 at least partially controls the pump 102 and electric motor 104 to deliver pressurized hydraulic fluid to accommodate variable pump loads that may be requested by the hydraulics 300 during normal refuse vehicle 10 operation. The controller 106 receives signals from various inputs throughout the refuse vehicle 10 and can subsequently control different components within the body assembly 14 hydraulic circuit to execute different tasks. For example, the controller 106 may receive an input from one or more buttons within the cab 18 of the refuse vehicle 10 that prompt the lifting system 30 to move in order to raise and empty the contents of a waste receptacle into the on-board receptacle 16 of the refuse vehicle 10. Upon receiving an input requesting an adjustment of the pump load (e.g., requested movement of the lifting system 30), the controller 106 can activate or adjust an output of the electric motor 102 and pump 104 to deliver pressurized hydraulic fluid from a hydraulic fluid reservoir to the one or more actuators forming the pump load to carry out the requested operation. As depicted in FIG. 5, the controller 106 can work with the hydraulic pump 104 to supply hydraulic fluid to one or more of the lift system 30, the compactor 50, and the various other subsystems upon the body assembly 14 (e.g., the tailgate 26, the packer 62, etc.).

The controller 106 is also in communication with various auxiliary systems 400 on the vehicle body 14 and/or on the frame 12. For example, the controller 106 may communicate with and/or control the operation of the HVAC system 402, a can alignment system 404, a gate opener assembly 406, a global positioning system (GPS) 408, cab controls 410, the vehicle suspension 412, and other subsystems present upon the refuse vehicle 10. The controller 106 can provide communication between the auxiliary systems 400 and the PDU 25, and can selectively permit the transmission of electrical power from the battery 23 to the auxiliary systems 400 on the refuse vehicle 10. In some examples, the body assembly 14 further supports a secondary battery 114. The secondary battery 114 can be configured to power the controller 106 and/or other subsystems on the body assembly 14, including the E-PTO system 100 and the auxiliary systems 400. In some embodiments, the secondary battery 114 is placed in selective communication with the prime mover 20 to provide a backup ignition or drive source if the primary battery 23 becomes disabled or runs low on power.

As discussed above, some or all of the components of the E-PTO system 100 may be contained within the E-PTO module 120. For example, as shown in FIG. 5, the E-PTO module 120 contains the hydraulic pump 104, the electric motor 102, and the inverter 112. As shown, the refuse vehicle 10 includes an interface 130 that interfaces with the E-PTO module 120. For example, the interface 130 may include one or more hydraulic fluid line connectors configured to couple the hydraulic pump 104 to the hydraulics system 300. Additionally, the interface 130 may include one or more electrical interfaces configured to provide power to and from the E-PTO module 120.

According to various embodiments, the E-PTO module 120 may also include an energy storage device, such that the E-PTO system 100 may operate solely off the energy storage device included in the E-PTO module 120.

According to various embodiments, the E-PTO module 120 may include more than one hydraulic pump 104 and/or more than one electric motor 102. For example, the E-PTO module 120 may include two or more electric motors 102 configured to drive the hydraulic pump 104. According to various embodiments, including additional electric motors 102 and/or hydraulic pumps 104 in the E-PTO module 120 will enable the E-PTO system 100 to provide more power to the hydraulics system 300. Since the E-PTO module 120 can be easily exchanged with another E-PTO module 120, different E-PTO modules 120 may be selected based on the desired use of the refuse vehicle 10. For example, if the refuse vehicle 10 is intended to be used for relatively heavy lifting, an E-PTO module 120 with more than one hydraulic pump 104 and/or electric motor 102 may be installed into the refuse vehicle 10.

Can Alignment Systems

The control schematic and architecture shown in FIG. 5 can be used to execute a variety of different vehicle functions and modes within the refuse vehicle 10. For example, and as demonstrated in FIG. 5, the refuse vehicle 10 can include a can alignment system 404. The can alignment system 404 can include one or more sensors positioned about the body assembly 14, including at or near the lift system 30. The sensors monitor a position of a nearby can (e.g., a toter 80, a residential refuse container, a dumpster 90, etc.) and communicate with the controller 106. The sensors and controller 106 can together identify movements that can be made by one or both of the body assembly 14 and frame 12 to achieve proper alignment with the can so that the can will be successfully engaged by the lift system 30 to execute a waste removal process.

The controller 106 is configured to communicate with both of the lift system 30 and the prime mover 20 to execute the steps necessary to achieve proper alignment relative to the can. By knowing (e.g., through communication with the memory 108 and/or the network 110) the amount of permissible movement of the lift system 30 in each direction (e.g., vertically, horizontally, laterally), the controller 106 can first determine whether the current position of the refuse vehicle 10 relative to the can is within the range of allowable movement of the lift system 30. If the can alignment system 404 determines that the refuse vehicle 10 is positioned relative to the can within the range of permissible lift system 30 movement relative to the refuse vehicle 10, the controller 106 sends a command to the E-PTO system 100 and the lift system 30 to engage the can. The controller 106 adjusts a position of the lift system 30 relative to the body assembly 14, engages the can, and inverts the can so that refuse or other waste within the can will be emptied into the on-board receptacle 16 for transport. The lift system 30 can then lower and disengage the can so that the refuse vehicle 10 can drive to a next location along a route.

If the can alignment system 404 determines that the refuse vehicle 10 is positioned relative to the can outside of the range of permissible lift system 30 movement relative to the refuse vehicle 10, the controller 106 can initiate a command to the frame (e.g., through the PDU 25 and to the prime mover 20) to drive the refuse vehicle 10 to a position within the permissible range. Using the positioning acquired by the sensors within the can alignment system 404, the controller 106 can issue directional data that can then be implemented by the PDU 25, battery 23, and prime mover 20 to move the vehicle to a desired location relative to the can. The controller 106 can communicate both desired direction and magnitude of the adjustment needed so that the distance between the refuse vehicle 10 and the can is reduced to a point where the can is located within the range of permissible lift system 30 movement relative to the refuse vehicle 10. Accordingly, the controller 106 can further control a steering system to help execute the alignment process. The steering system can be considered a component of both the frame 12 and the body assembly 14. This process can be particularly useful on both front-end loading and side-loading refuse vehicles (e.g., the refuse vehicles shown in FIGS. 1-3), as automating a portion of the can engagement and disengagement process can reduce labor costs associated with moving heavy cans into alignment with the refuse vehicle manually.

In some examples, the can alignment system 404 includes one or more lasers that can help a driver and/or the controller 106 execute a waste removal process from a can, such as the dumpster 90. The can alignment system 404 includes lasers that are mounted onto or near the forks 34. The lasers project light forward to provide a visual indication that corresponds with a current position and/or orientation of the forks 34. The visual indication 34 can be used by a worker (e.g., the driver of the refuse vehicle 10) to help guide the refuse vehicle 10 so that the forks 34 are properly positioned relative to the can for engagement.

In some examples, the can alignment system 404 further includes an imaging apparatus and one or more can locating sensors. The can locating sensors can be positioned upon the forks 34 or upon the body assembly 14 (e.g., on the cab 18) to both identify and illuminate cans that are located near the refuse vehicle 10. In some examples, the can locating sensors communicate with additional target lasers on the refuse vehicle 10 to illuminate the can "lift points" that correspond with a desired fork location that will successfully raise the can to execute a waste removal process. The target lasers are rotatably coupled to the body assembly 14 and can move through a wide range of angles relative to the refuse vehicle 10 to illuminate a can within a field of view that extends forward of the refuse vehicle 10 (in the case of a front end-loading refuse vehicle) or laterally outward from the refuse vehicle 10 (in the case of a side-loading refuse vehicle). The imaging apparatus within the can alignment system 404 can then capture an image of the laser light generated by each of the target lasers and the lasers mounted to the forks 34 of the vehicle. The imaging apparatus can then, in communication with the controller 106 and/or the memory 108 and network 110, calculate the distance and necessary correction to locate the forks 34 within the areas defined by the target lasers. The controller 106 can then communicate these "corrections" to the PDU 25, prime mover 20, steering system, and lift system 30 so that the calculated corrective action can be executed. Once again, the controller 106 can prioritize the order of operation such that if movement of the lift system 30 alone will correct the error, the controller 106 commands the lift system 30 alone to address the error. If misalignment outside of the degree of allowable movement of the lift system 30 is detected, the control instructions can be communicated to the PDU 25, prime mover 20, and steering system until the refuse vehicle 10 is determined to be within an allowable range of movement so that the lift system 30 can execute the refuse removal process from the can.

Location-Based Operation

The refuse vehicle 10 is also configured to execute a variety of different location-based and condition-based processes that can link data received or generated by the body assembly 14 to the prime mover 20 and battery 23 to help perform different refuse vehicle 10 functions. For example, the refuse vehicle 10 can include a GPS 408 that is positioned within the cab 18 or elsewhere upon the body assembly 14 to monitor a current location of the refuse vehicle. The GPS 408 communicates with the controller 106 which can, based upon the detected location of the refuse vehicle 10, modify vehicle performance by activating, deactivating, or optimizing different vehicle subsystems. The controller 106 communicates with the memory 108 and/or the network 110 to access information in real-time corresponding to desired performance characteristics associated with a location of the vehicle. Similarly, the refuse vehicle 10 (and GPS 408) can include a series of condition sensors that are configured to detect one or more of weather conditions, traffic conditions, roadway conditions, and/or other collectable data along a route. The refuse vehicle 10 can once again communicate the data from the GPS 408 and associated sensors to the controller 106, which can then execute a series of commands that modify the amount or distribution of electrical power sent from the battery 23 to the body assembly 14 to control the refuse vehicle 10.

For example, the GPS 408 can work with the controller 106 (and memory 108 and/or network 110) to recognize a variety of different geo-fences that are established for the refuse vehicle 10. The geo-fences can correspond to different locations along a route that might require or desire different vehicle performance measures. For example, if the refuse vehicle 10 transitions onto a highway, the associated geo-fence might limit or discontinue power transmission to the E-PTO 100 so that a larger amount of electrical power from the battery 23 is available for use by the prime mover 20 to drive the refuse vehicle 10 at higher speeds. Another geo-fence can correspond to a dump or refuse collection site. The GPS 408 can communicate with the controller 106 and PDU 25 to control operation of the prime mover 20 and the associated steering system to transition the refuse vehicle 10 to an autonomous or semi-autonomous mode of operation. The controller 106 can then provide instructions to the E-PTO system 100, hydraulics 300, and auxiliary systems 400 to execute a refuse vehicle ejection cycle to remove refuse from the on-board receptacle 16. In some examples, the controller 106 also monitors the direction of travel of the refuse vehicle 10 as it passes through a geo-fence. For example, if the controller 106 detects or receives an indication that the refuse vehicle 10 has passed a geo-fence traveling in reverse, the controller 106 can transition the vehicle to semi-autonomous or fully-autonomous mode to complete the load ejection process. The controller 106 can control each of the prime mover 20, steering system, E-PTO 100, and hydraulics 300 to automatically execute the load ejection process. If the controller 106 detects or receives an indication that the refuse vehicle 10 has passed a geo-fence traveling forward, the controller 106 may wait until the controller 106 detects the refuse vehicle 10 traveling in reverse before transitioning the vehicle to semi-autonomous or fully-autonomous mode.

Other parameters of the refuse vehicle 10 may be adjusted based upon geo-fencing as well. For example, detected vehicle location (e.g., by the GPS 408) can be cross-referenced or supplemented with information from the memory 108 and/or the network 110 to provide different performance parameters based upon the location of the truck 10. In some examples, the memory 108 stores optimized or pre-programmed performance parameters related to the prime mover 20 or the vehicle suspension 412 (e.g., the frame 12) that can be adjusted based on the detected location of the refuse vehicle. In some examples, the controller 106 can limit one or more of the prime mover 20 or overall vehicle speed, the available torque to drive the prime mover 20, and/or the permissible acceleration rate of the refuse vehicle 10 based upon the current location of the truck 10 detected by the GPS 408.

In some examples, the GPS 408 and controller 106 work together to vary the operation of the on-board compactor 50 within the vehicle hydraulics 300. If the refuse vehicle 10 is performing a collection route, the collection route information may be stored within the memory 108 or is otherwise accessible through the network 110. The controller 106 can analyze the current position of the refuse vehicle 10 (as provided by the GPS 408) and determine a distance to the next pick-up location along the route. If the determined distance to the next pick-up location exceeds a threshold amount (e.g., 0.5 miles, 1 mile, 2 miles, 5 miles, etc.), the controller 106 can control the E-PTO system 100 to operate the compactor 50. As long as the next pick-up location exceeds the threshold amount, the compactor 50 can remain in the fully-extended position to compact refuse within the on-board receptacle 16. Once the determined distance of the refuse vehicle 10 to the next pick-up location falls below the threshold amount, the compactor 50 can retract so that the on-board receptacle 16 is positioned to receive more refuse. By maintaining the compactor 50 in the fully-extended position longer and smartly controlling the positioning of the compactor 50, the packing density within the on-board receptacle 16 can be improved. Improved packing density within the refuse vehicle allows the refuse vehicle to perform longer routes that include more stops, which can provide additional revenue.

The GPS 408 and data received by the GPS 408 can also be communicated externally from the refuse vehicle 10. For example, the controller 106 can receive positioning data from the refuse vehicle 10 that corresponds to a current location. The controller 106 can communicate the current position (or the current position and a future planned route) for the refuse vehicle 10 to a collection vehicle. The collection vehicle can then travel to meet the refuse vehicle 10, and can then communicate with the controller 106 to execute a transfer of some or all of the refuse within the refuse vehicle into the collection vehicle so that refuse can be hauled to an off-site location. Using an intermediate collection vehicle can help the refuse vehicle 10 save a significant amount of energy by avoiding on-highway trips to collection sites that can take several minutes to perform. By avoiding on-highway trips, the refuse vehicles 10 can be designed with smaller and less-expensive prime mover 20 motors, since high power consuming highway travel speed situations are avoided.

As indicated above, the GPS 408 can also include other types of sensors to associate additional condition-based data with location-based data. For example, the GPS 408 can include weather sensors that monitor the weather conditions outside the refuse vehicle 10. If the weather sensors detect severe weather, the GPS 408 can report severe weather to the controller 106, which can in turn limit or otherwise restrict the functionality of the prime mover 20. Temperatures above or below set temperature thresholds may also impact the performance of the refuse vehicle 10. For example, if the GPS 408 and associated sensors determine that the ambient temperature is below a threshold temperature (e.g., below 0 degrees C.), the controller 106 can limit the functionality of certain auxiliary systems 400, as the expected electrical load of the HVAC 402 is much higher. Similar processes can be carried out if the ambient temperature exceeds a threshold level (e.g., above 30 degrees C.). Accordingly, the refuse vehicle 10 can adjust the vehicle performance and energy consumption based on detected weather conditions.

The GPS 408 can also include road quality sensors. For example, vibrational sensors or imaging devices can be positioned along the body assembly 14 or on the frame 12 to monitor the refuse vehicle 10 as it traverses a route. If one of the sensors detects a pothole or other roadway defect, for example, the GPS 408 can attribute location-based data with the detected pothole. The positioning and severity of the pothole or road defect can be stored within the memory 108 and sent to the network 110. In some examples, the roadway defect data can be used to influence performance characteristics of the refuse vehicle 10 as it performs a route that is known to include roadway defects. For example, the controller 106 can adjust the suspension 412 of the frame 12 to provide additional dampening because rougher roadways are expected. The suspension 412 can also be adjusted so that the body assembly 14 sits higher above the wheels 21 to further limit or prevent any unwanted contact between the body assembly 14 and the ground below. In some examples, the data associated with roadway defects and location can be useful to third parties as well. Accordingly, this data can be stored on the network 110 or within the memory 108 and provided or licensed to cities or municipalities to alert transportation departments of deteriorating roadway conditions.

The GPS 408 and controller 106 can also be used to help the refuse vehicle 10 execute a variety of different route planning and route performance processes. In some examples, refuse collection routes are planned in advance. The refuse collection routes include a series of different stops and travel directions to each location along the route, which can be stored within the memory 108 or network 110. Based upon the number of stops and expected duration of the route, the controller 106 can first calculate the amount or potential need for a range extender (e.g., a fuel-powered turbine generator configured to supply auxiliary electrical power to the prime mover 20). The controller 106 can suggest a recommended amount of auxiliary fuel to be stored on the vehicle. Reducing the amount of fuel stored onboard the vehicle by calculating the potential need for auxiliary power based on route characteristics can further limit the total energy consumption from the battery 23 used to power the refuse vehicle 10. Reviewing and optimizing routes before performance can also allow the use of smaller range extenders.

The stored collection routes can also use the GPS 408 and controller 106 to adjust the vehicle suspension 412 along the route to accommodate different travel conditions. The GPS 408 can use the condition-monitoring sensors as well as historical data from the memory 108 to generate geo-fences to control the suspension 412 of the refuse vehicle 10 and to react to real-time conditions. The suspension 412 can include several axles (e.g., tag axles, tandem axles, auxiliary axles) that are designed to help the refuse vehicle 10 distribute loading during the collection process as more refuse is loaded into the on-board receptacle 16. Based upon stored or detected data received by the GPS 408 and associated sensors, the various axles within the suspension 412 can be controlled. For example, auxiliary axles can be programmed to be automatically lowered (e.g., deployed) at later points in the route where the expected refuse payload is higher. In some examples, axles can be lifted based upon detected vehicle function (e.g., as received from the controller 106). For example, if the refuse vehicle 10 is traveling in reverse, the tag axle can be raised. In some examples, historical data or real-time data can be used to anticipate or detect rough terrain. One or more axles within the vehicle suspension 412 can be raised to prevent damage to the axles. Geo-fencing can extend around the dump or waste collection facility that can influence the number of axles deployed within the suspension 412, or can influence the height of the body assembly 14 relative to the frame 12. For example, when the GPS 408 detects that the refuse vehicle 10 has entered the waste collection facility (e.g., by crossing a geo-fence), the controller 106 can automatically raise one or more of the tag axle, tandem axle, and/or auxiliary axle. In some examples, sensors within the on-board receptacle 16 or upon the frame 12 detect the change in load created by the refuse within the refuse vehicle and automatically deploy one or more of the tag axle or tandem axle. Accordingly, manual interaction from the operator is limited.

The GPS 408 also allows the refuse vehicle 10 to learn routes that help to optimize refuse collection processes within a fleet of refuse vehicles 10. As the refuse vehicle 10 navigates a collection route, the controller 106 and memory 108 can communicate conditions and data related to the route so that this information can be stored for subsequent use. The network 110 can access and manipulate the information within the memory 108 to develop optimized performance parameters and geo-fencing based upon the detected and experienced route conditions. The network 110 can then store or otherwise access the memory 108 so that other refuse vehicles 10 within the same fleet can use the optimized and geo-fenced commercial routes generated by the refuse vehicle 10. Accordingly, the refuse vehicle 10 can operate using routes generated by any refuse vehicle within the fleet when the refuse vehicle has access to the memory 108 and/or the network 110.

According to various embodiments, the refuse vehicle 10 may control the E-PTO system 100 based on the route. For example, the controller 106 may active the E-PTO system 100 based on an anticipated lifting event that typically occurs during a given route. In this sense, the controller 106 may automatically cause the E-PTO system 100 to enter idle mode or work mode in response to a change in the location identified by the GPS.

Cab-Based Controls

In some examples, the refuse vehicle 10 is also configured to learn driver preferences and develop driver profiles as well. Driver preferences can be the product of cab controls 410 or HVAC 402, for example, or may follow driving preferences (e.g., mirror positioning, etc.) In some examples, the refuse vehicle 10 is further configured to generate profiles for each driver that operates equipment in the fleet. The refuse vehicle 10 can increase the amount of automation depending on the experience level of the user. For example, less experienced drivers can be defaulted to more automated processes while more experienced drivers may prefer more semi-autonomous operation. The refuse vehicle 10 adjusts these parameters to ensure that operational characteristics of the refuse vehicle 10 do not vary significantly based on driver experience level. Driver profiles can be stored centrally as well, within the network 110 or within the memory 108 so that several vehicles within the fleet can access the information and adjust vehicle performance accordingly.

Additional auxiliary systems 400 can be in communication with the controller 106, PDU 25, and battery 23 to send and receive data between the body assembly 14 and the frame 12. For example, the cab controls 410 can include a variety of different subsystems that can be actuated or otherwise manipulated from the cab 18, communicated to the controller 106, and then transmitted to the PDU 25 and/or battery 23 or prime mover 20. The cab controls 410 can include positioning or operational controls for operating each of the E-PTO 100 and hydraulics 300. For example, the cab controls 410 can be used to adjust a position of the lift system 30 or a frequency of the compactor 50 stroke. In some examples, the memory 108 and/or the network 110 stores additional parameters that modify or otherwise manipulate the interaction between the auxiliary systems 400 and the battery 23.

In some examples, the auxiliary systems 400 include sensors positioned within the on-board receptacle 16 or on the frame 12. The sensors are configured to measure the mass of the refuse within the on-board receptacle 16 and communicate with the controller 106 to automatically adjust operation of the compactor 50. While conventional compactors 50 operate each time the lift system 30 completes a refuse removal process by transferring refuse from a can into the on-board receptacle 16, the refuse vehicle 10 smartly monitors and waits until a threshold amount of refuse has been added before executing the compactor stroke. Because the compactor 50 can require a significant amount of hydraulic power from the E-PTO 100, limiting the number of compactor strokes can greatly reduce the electrical power draw by the electric motor 102 from the battery 23. Alternatively, sensors within the on-board receptacle 16 or along the body assembly 14 can visually monitor the volume of refuse and execute a compactor stroke when the volume of refuse added to the on-board receptacle exceeds a threshold amount. In still further examples, the interior of the on-board receptacle is configured with pressure sensors that communicate with the controller 106 when the sensors are contacted by an item within the on-board receptacle 16. Positioning the pressure sensors along the interior walls of the on-board receptacle 16 (and above the floor) can help to identify when large volumes of refuse have accumulated within the on-board receptacle, necessitating another compactor stroke.

In some examples, the cab controls 410 further include operator detecting sensors that can selectively disable the operation of the refuse vehicle 10, including the lift system 30. The operator detecting sensors are configured as proximity sensors that detect the presence of a key or tag within a specified target range. The key or tag can be worn or embedded within a vest that is to be worn by the operator of the refuse vehicle 10. The operator detecting sensors can then sense the presence of the operator within the cab 18 of the vehicle, for example, which can then be communicated to the controller 106 that the lift system 30 can be operated. In other examples, the proximity sensors are positioned at or near the forks 34 of the lift system 30, and the lift system 30 is disabled if the sensor detects the key or tag within a predetermined distance from the forks 34. In some examples, the sensor is a camera or other type of live imaging devices that monitors the area near the forks 34 and communicates with the controller 106 to disable operation of the lift system 30 if an operator is within a designated no occupancy zone. Similar sensors and logic can be used for the tailgate 26 operation as well. For example, if the sensors detect that a person is near the tailgate 26, the controller 106 will disable the hydraulic cylinder(s) or actuators that control the position of the tailgate 26 so that an ejection stroke is not performed. By monitoring the position of the driver or operators of the refuse vehicle 10, systems can be automatically disabled until the operator is in a preferred position relative to the refuse vehicle.

The cab controls 410 can also include a gate opener assembly 406. The gate opener assembly 406 is generally configured to interact with, unlock, and open gates that may be positioned to protect commercial or residential property. The gate opener assembly 406 can be at least partially controlled by the hydraulics 300 and the E-PTO 100, and can include one or more actuators (not shown) that extend forward of the cab 18 and the frame 12 to unlock and move gates that otherwise impede forward movement of the refuse vehicle 10 toward cans. In some examples, the gate opener 406 includes both forward and lateral sliding components that can accommodate different gate styles. The forward sliding components can be used to push gates about a rotational hinge joint, while the lateral sliding components can be used to slide gates laterally to permit access to the refuse vehicle 10. The gate opener assembly 406 can include a key or fob that is arranged to interact with a reader on the gate over one of near-field communication (NFC), Bluetooth, Wi-Fi, and/or radio frequency identification tag (RFID) technology, for example. In some examples, the cab controls 410 include a universal key transmitter that can transmit an identification code that can be used to unlock the gate. By including the gate opener assembly 406, iterative trips out of the cab 18 of the refuse vehicle 10 to open, move, close, and lock the gate can be avoided, which can provide significant time and labor cost savings. Using remote locking and unlocking provides additional security from unauthorized dumpster use, as customers no longer need to leave gates open or otherwise accessible for refuse collection processes. In some examples, the lock on the gate can include a reader that is configured to interact with refuse vehicles 10 in the refuse vehicle fleet, and customers who have purchased and installed remote locking/unlocking readers will be charged at a lower rate due to the decreased labor cost associated with performing waste collection on their premises.

In some examples, the cab controls 410 include multiple displays within the cab 18 of the refuse vehicle 10. For example, a primary display can be centered along the dashboard (e.g., aligned with the steering wheel, etc.) and a secondary display can be positioned alongside the driver's seat. The cab controls 410 are configured to control the displays within the cab 18 depending upon the detected operation of the prime mover 20 and based upon information received by one or more of the PDU 25 and the controller 106. For example, during normal forward operation of the refuse vehicle, the primary display may show various vehicle performance characteristics, including vehicle speed, remaining battery life, motor temperature, fluid pressure, and the like. The secondary display may show information about the subsystems on the vehicle, including the hydraulics, such as the lift system 30 or compactor. In some examples, the secondary display provides a visual indication from a camera that is positioned in line with the lift system 30 that can be used by the operator to position the refuse vehicle 10 relative to a can to be picked up. If the cab controls 410 receive an indication that a refuse emptying process is going to be performed, the data presented on the displays may switch. The driver can remain focused with his or her head facing forward so that the travel of the vehicle can be watched at the same time that the camera is displaying the positioning of the lift system 30 relative to the can on the primary display. The secondary display can then present the various vehicle performance characteristics that are presented by the primary display under normal conditions. A similar process can be carried out when the refuse vehicle 10 begins traveling in reverse. The primary display can present the live images provided by the back-up camera, which can allow the driver to better position the vehicle and avoid otherwise awkward body positioning to drive the vehicle rearward. In some examples, the primary screen is incorporated directly into the steering wheel. Optionally, emergency information (e.g., battery life, oil pressure, etc.) is always displayed on the primary display, regardless of vehicle operational mode.

According to various embodiments, the cabin may include a user interface (e.g., displayed on a touch screen display). The user interface is configured to receive operator inputs such that the operator can control one or more components of the refuse vehicle 10, as is discussed further herein.

Power Distribution and Management

The refuse vehicle 10 can also include several power saving or power generation features to help further extend the life of the battery 23 and extend the allowable range of the refuse vehicle 10. For example, the HVAC 402 can be significantly simplified to reduce the number of pumps or compressors within the system. In some examples, the HVAC 402 within the body assembly 14 (and the cab 18, specifically) is in communication with the controller 106, PDU 25, and battery 23. The HVAC 402 can be a single integrated thermal management system that is configured to supply heating, cooling, and air flow to the entire body assembly 14 (e.g., to both the cab 18 and the on-board receptacle 16). In normal or standard operating conditions, the HVAC 402 can require a significant power draw from the battery 23. The power draw necessary to achieve desired climate control conditions is amplified when ambient outdoor temperatures are very high or very low. To avoid excessive power draw from the battery 23, the PDU 25 and the controller 106 can be configured to reduce, limit, or disable the HVAC 402 under certain operating conditions. For example, if the PDU 25 communicates that the remaining battery 23 life is low, the controller 106 can reduce the operation of the HVAC 402 to partial functionality. For example, pumps and compressors within the HVAC 402 may be disconnected from power but the fans can continue operating. If the remaining battery 23 life continues to fall, the PDU 25 and controller 106 can fully disable the HVAC 402 so that the remaining battery life is conserved for use with the prime mover 20.

The controller 106 and PDU 25 are further configured to adjust the power distribution from the battery 23 to the body assembly 14 based upon detected conditions within the battery 23 or upon the refuse vehicle 10, generally. The PDU 25 is configured to prioritize the systems within the refuse vehicle 10 so that electrical power from the battery 23 is distributed to critical systems before auxiliary systems. In some examples, the refuse vehicle 10 is configured to operate in a "limp home" mode. When the remaining battery 23 life falls below a set threshold (e.g., 10 percent charge remaining, 5 percent charge remaining, etc.), the PDU 25 and controller 106 can communicate to block, disable, or limit the operation of the different systems upon the body assembly 14. The HVAC 402 can be limited or temporarily disabled, the E-PTO 100 can be disconnected from electrical power (e.g., the electric motor 102 can be stopped), and the auxiliary systems 400 can be disconnected from the battery 23. In some examples, the refuse vehicle 10 is configured with two tiers of reduced operation. For example, when the remaining charge on the battery 23 falls below a first threshold (e.g., 10 percent), functionality of the E-PTO 100, hydraulics 300, and auxiliary systems 400 are reduced. The frequency of compactor 50 operation is reduced, the lift system 30 can be disabled to avoid adding more refuse into the on-board receptacle 16. The GPS 408 can continue to monitor the location of the refuse vehicle 10 and can communicate with the controller 106 and PDU 25 to allow for limited operation of the compactor 50 upon determining that the refuse vehicle 10 is positioned within a refuse collection site (e.g., a dump) so that an ejection stroke can be performed. Similarly, the controller 106 can operate the E-PTO 100 and hydraulics 300 to raise the tailgate 26 upon determining that an ejection stroke is being performed. If the remaining battery 23 power falls below a second threshold (e.g., 5 percent), the PDU 25 can reduce power supply from the battery 23 to the body assembly 14 so that only the prime mover 20 and the cab controls 410 (e.g., the dashboard and steering) remain operational until the refuse vehicle 10 is reconnected to the power source. The PDU 25 can limit the acceleration curve and/or maximum output of the prime mover 20 to further conserve battery power.

In some examples, the refuse vehicle 10 is configured to include supplemental power supplies and/or energy saving devices. For example, one or more solar panels can be positioned along the body assembly 14. In some embodiments, solar panels extend along a top of the cab 18 and the on-board receptacle 16. The solar panels can capture solar energy, which can be converted into usable battery power that can be stored and/or used by the battery 23. Additionally or alternatively, the refuse vehicle 10 can be outfitted with regenerative brakes. The brakes can harvest rotational energy or heat generated by the brakes while the refuse vehicle 10 drives so that battery power 23 can is conserved. The brakes can resupply the energy captured to the PDU 25 or to the battery 23.

Various modifications can be made to the body assembly 14 to further limit the consumption of electrical power from the battery 23. For example, a variety of different aerodynamic features can be incorporated into the body assembly 14 to reduce vehicle drag during normal travel conditions. In some embodiments, fairings are positioned between the on-board receptacle 16 and the cab 18. The fairings can help reduce drag that might otherwise be caused by low pressure zones behind the cab 18. Additionally, skirts can be incorporated into the frame 12 of the refuse vehicle to reduce air travel beneath the body assembly 14 to again reduce low pressure zones within the refuse vehicle 10 that can produce drag. The skirt can also provide additional protection to the battery 23 from debris or other items that might contact the frame 12 of the refuse vehicle 10. In some examples, the skirt is configured to deploy when the refuse vehicle reaches a threshold speed. For example, the skirt can deploy when the controller 106 detects that the vehicle has reached a speed in excess of 20 miles per hour. The tailgate 26 can also be modified to reduce drag by incorporating a gradual taper or tail-like shape. The tailgate 26 design reduces the size of the low pressure zone formed behind the refuse vehicle 10 as it travels.

The lift system 30 can also be selectively positioned to reduce drag and battery power consumption by the refuse vehicle. The forks 34 of the lift system 30 can be moved between several positions to help improve the aerodynamics of the refuse vehicle 10. For example, the forks 34 can be positioned in a first location near the frame 12 of the vehicle in a rest position prior to engaging a can. The forks 34 can transition to a second, raised position to execute the refuse collection process to empty refuse into the on-board receptacle 16. The forks 34 can also be positioned in a third, intermediate position for traveling. The third, intermediate position can be between the first position and the second position and can arrange the forks 34 to maximize the aerodynamic effect of the forks 34 (e.g., to reduce drag). In the third position, the forks 34 are directed approximately parallel to the ground below. Optionally, the forks 34 can be provided with an aerodynamic sheath that can receive the forks 34 when not in use to further improve the aerodynamics of the vehicle.

In some examples, the body assembly 14 is reduced in size to further reduce the amount of energy consumption needed to operate the refuse vehicle 10. In some examples, the height of the lift system 30 or the range of permissible travel of the lift system 30 is reduced. Accordingly, the hydraulics 300 operating the lift system 30 can be reduced in size and complexity, and less power is needed to transition the lift system 30 between the lowered and raised positions to execute a waste removal process. In some examples, the size of the cab 18 is reduced so that only a single occupant can reside within the cab 18. Reducing the size of the cab 18 reduces the weight of the body assembly 14 and significantly reduces the power consumption of the HVAC system 402, as the area for climate control is reduced. In some examples, the entire body assembly 14 is formed from a single, unitary structure. The cab 18 and on-board receptacle 16 can be made from a continuous body, and the sub-frame and ladder frame traditionally used to mount the body assembly 14 is removed. The removal of more body assembly 14 components further reduces the mass of the refuse vehicle 10, and allows for additional useful weight to be added to the frame 12, like additional batteries 23.

Referring now to FIGS. 6, a method of throttle advance 700 is shown, according to an example embodiment. The method of throttle advance 700 may be implemented by the E-PTO system 100 to maintain sufficient hydraulic pressure within the hydraulic system 300. According to various embodiments, the E-PTO system 100 may gradually build-up hydraulic pressure such that the hydraulic system 300 may use the hydraulic pressure to perform certain tasks. The method of throttle advance 700 may reduce the wait time needed to build up sufficient hydraulic pressure by increasing hydraulic pressure in anticipation of an upcoming need for additional hydraulic pressure. It should be appreciated that the order of the steps may differ from what is outlined. Also two or more steps may be performed concurrently or with partial concurrence. Such variation will depend on the software and hardware systems chosen and on designer choice. All such variations are within the scope of the disclosure.

The method of throttle advance 700 may begin at process 702. At process 702, the refuse vehicle 10 is started. For example, an operator of the refuse vehicle 10 may cause the refuse vehicle 10 to start or the refuse vehicle 10 may be started remotely. After the refuse vehicle 10 is started, the controller 106 is activated as a part of process 704. For example, the controller 106 may be automatically activated upon starting of the vehicle. Once the controller is activated, the E-PTO system 100 may enter standby mode as a part of process 706. In standby mode, the motor 102 and/or the hydraulic pump 104 may be completely shut off. Alternatively, the motor 102 and/or the hydraulic pump 104 may operate at a relatively low speed (e.g., as compared to E-PTO idle mode and E-PTO work mode discussed below.

At process 708, the controller 106 determines if the E-PTO system 100 should be engaged. For example, the controller 107 may determine that the E-PTO system 100 will not be used in the near future. For example, the controller 106 may utilize route-based data or past performance data to determine that the E-PTO system 100 is not needed until the refuse vehicle 10 arrives to a certain location. If the controller 106 determines that the E-PTO system 100 does not need to be engaged, the controller 106 will cause the E-PTO system 100 to remain in standby mode. Alternatively, if the controller 106 determines that the E-PTO system 100 should be engaged, the controller 106 may cause the E-PTO system 100 to entire idle mode. For example, if the controller 106 determines that the E-PTO system 100 may be needed in the near future, the controller 106 may cause the E-PTO system 100 to enter idle mode. For example, the controller 106 may utilize route-based data or past performance data to determine that the E-PTO system 100 is or will be needed relatively soon. Further, the controller 106 may receive an external input (e.g., an operator input on the user interface, triggering of the operator detector 124, actuation of the activation switch, etc.) and cause the E-PTO system 100 to enter idle mode in response to the external input.

At process 710, the controller causes the E-PTO system 100 to enter idle mode. In idle mode, the hydraulic pump 104 and/or the electric motor 102 may be active. For example, the electric motor 102 may be operating at a speed that is higher than when the E-PTO system 100 is in standby mode and lower than when the E-PTO system 100 is in work mode. Further, the hydraulic pump 104 may provide higher hydraulic pressure to the hydraulics system 300 than when the E-PTO system 100 is in standby mode and lower than when the E-PTO system 100 is in work mode.

At process 712, the E-PTO system 100 is checked for compliance. For example, one or more of the sensors 132 configured to measure hydraulic pressure within the E-PTO system 100 may provide pressure data to the controller 106. If the fluid pressure is above or below a critical pressure, the controller may determine there is a system error, and the controller may cause the E-PTO system 100 to return to standby mode. According to various embodiments, the E-PTO system 100 may be configured to provide a predetermined hydraulic pressure in idle mode. According to various embodiments, the controller 106 may increase the speed of the electric motor 102 until the desired hydraulic pressure is achieved as a part of process 714. The method 700 may then proceed to process 716. Alternatively, if the hydraulic pressure is already at the predetermined value, the method 700 may proceed from process 712 to process 718.

At process 716, the controller 106 determines if there is an external input. For example, an operator of the refuse vehicle 10 may request an increase or decrease in hydraulic pressure using the user interface. Other examples of external inputs are provided throughout. If and external input is received, the method 700 returns to process 714, and the controller will adjust the hydraulic pressure accordingly (e.g., by adjusting the speed of the electric motor 102). If there is no external input received, the method 700 proceeds to process 718.

At process 718, the controller 106 determines if a function is requested. For example, an operator may input a function request to use a lifting mechanism or open the gate. Alternatively or additionally, the activation switch 122 may be activated by an operator, which may qualify as a function request. Further, the operator detectors 124 may detect an operator proximate the front or the rear, which may qualify as a function request. If no function request is received by the controller 106, the method 700 may return back to process 710. However, if a function request is received by the controller 106, then the controller 107 may cause the E-PTO system 100 to enter work mode as a part of process 720.

At process 720, the controller 106 causes the E-PTO system 100 to enter work mode. In work mode, the hydraulic pump 104 and/or the electric motor 102 may be active. For example, the electric motor 102 may be operating at a speed that is higher than when the E-PTO system 100 is in standby mode and higher than when the E-PTO system 100 is in idle mode. Further, the hydraulic pump 104 may provide higher hydraulic pressure to the hydraulics system 300 than when the E-PTO system 100 is in standby mode and higher than when the E-PTO system 100 is in idle mode. For example, in work mode, the E-PTO system 100 may provide high enough fluid pressure to perform the function requested at process 718.

According to various embodiments, the controller 106 may be configured check system compliance as a part of process 722. For example, one or more of the sensors 132 configured to measure hydraulic pressure within the E-PTO system 100 may provide pressure data to the controller 106. If the fluid pressure is above or below a critical pressure, the controller may determine there is a system error, and the controller may cause the E-PTO system 100 to return to standby mode. According to various embodiments, the E-PTO system 100 may be configured to provide a predetermined hydraulic pressure in idle mode. According to various embodiments, the controller 106 may increase the speed of the electric motor 102 until the desired hydraulic pressure is achieved as a part of process 714 until the desired hydraulic pressure is achieved.

E-PTO Arrangements

With reference to FIGS. 18-21, additional alternative arrangements for the refuse vehicle 10 are provided. As depicted in each example, the refuse vehicle 10 can include multiple E-PTOs 100a, 100b, 100n such that the truck includes several distinct hydraulic circuits that are independently operable to control one of the lift system 30, compactor 50, and/or subsystems 106. For example, a distinct and separate E-PTO 100a can be provided for the lift system 30, while an independently operable E-PTO 100b is provided for the compactor 50. Separate hydraulic fluid reservoirs can be provided for each separate hydraulic circuit. The additional E-PTOs can help provide a more controllable and easier-to-maintain refuse vehicle 10.

Figure 18:
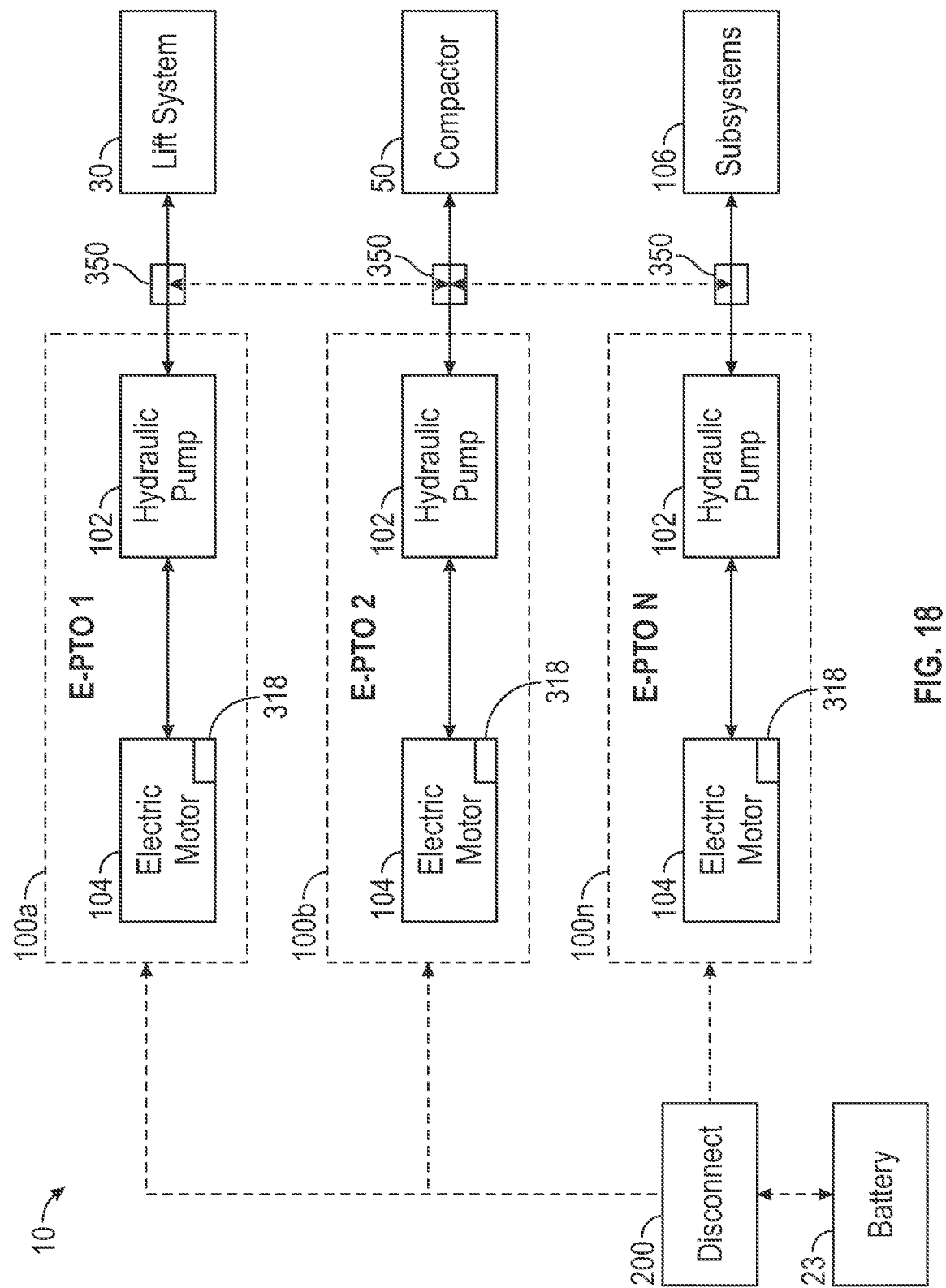
FIG. 18 is a schematic view of another control system that can be incorporated into any of the refuse vehicles of FIGS. 1-3.

Referring to FIG. 18, a schematic of an alternative refuse vehicle 10 is provided. The refuse vehicle 10 generally includes a charge storing device, shown as battery assembly 23, which is configured to provide power to the prime mover 20 to drive the refuse vehicle. The battery assembly 23 is further configured to provide power to one or more E-PTOs 100a, 100b, 100n. The E-PTOs 100a, 100b, 100n, as discussed above, each include an electric motor 104 that is configured to drive one or more hydraulic pumps 102 to provide pressurized hydraulic fluid to different systems on the refuse vehicle 10.

The electric motors 104 present within each E-PTO 100a, 100b, 100n are configured to draw electricity from the battery assembly 23. As depicted in FIG. 18, each E-PTO 100a, 100b, 100n can include an inverter 318 to convert DC electrical power received from the battery assembly 23 into AC electric power for use by the electric motor 104. The electric motor 104 can be an AC induction or permanent magnet-style AC motor that can be controlled using a variable frequency drive (VFD). In some examples, the VFD is included within the inverter 318. The VFD can be used to control a speed of the electric motor 104, which in turn controls an output of the hydraulic pump 102 that is coupled with the electric motor 104.

As depicted, the first E-PTO 100*a* is configured to supply pressurized hydraulic fluid to control the lift system 30. Accordingly, the electric motor 104 and hydraulic pump 102 can each be better optimized to meet the hydraulic power requirements of the lift system, as less overall hydraulic power is needed (in comparison to a single hydraulic pump providing hydraulic power to the entire refuse vehicle 10). The cost and complexity of electric motors 104 and hydraulic pumps 102 increases significantly as the size of these components increases, such that providing a hydraulically-independent E-PTO 100*a* specifically for the lift system 30 can result in significant cost savings for the refuse truck 10. In some examples, multiple hydraulic pumps 102 can be driven by a common electric motor 104 via a dual shaft or transmission arrangement.

Similarly, the second E-PTO 100*b* is configured to supply pressurized hydraulic fluid to control the operation of the compactor 50 onboard the refuse vehicle 10. As depicted in FIG. 18, the second E-PTO 100*b* includes its own dedicated electric motor 104 and hydraulic pump 102 that are configured to receive electric power from the battery assembly 23 and convert the received electric power into hydraulic power for use within the compactor 50. In some examples, the first E-PTO 100*a* and second E-PTO 100*b* operate fluidly independent of one another, such that a malfunction or deactivation within the electric motor 104 within the second E-PTO 100*b* will not impact or otherwise affect the operation of the electric motor 104 within the first E-PTO 100*a*. In other examples, the first E-PTO 100*a* and second E-PTO 100*b* can be selectively fluidly independent of one another. For example, valving (e.g., one or more solenoid valves 350) within the refuse vehicle 10 can selectively couple the hydraulic pump 102 of the second E-PTO 100*b* into fluid communication with the hydraulic circuit associated with the lift system 30. Accordingly, if the electric motor 104 or hydraulic pump 102 of the first E-PTO 100*a* experience issues, the second E-PTO 100*b* can be fluidly coupled with the lift system 30, such that operation of the lift system 30 can continue. In some examples, the second E-PTO 100*b* can be configured to supply hydraulic power to each of the lift system 30 and the compactor 50 simultaneously. In other embodiments, the second E-PTO 100*b* may first be fluidly decoupled from the compactor 50 before coupling the second E-PTO 100*b* with the lift system 30. As explained in additional detail below, each of the E-PTOs 100*a*, 100*b*, 100*n* may be selectively fluidly coupled with any of the lift system 30, compactor 50, or subsystems 106 in some embodiments, depending on the arrangement and positioning of the valves 350.

In some examples, additional E-PTOs 100*n* can be included within the system to provide hydraulic power to additional subsystems 106 within the refuse vehicle 10. For example, and as explained above, the additional subsystems 106 can include hydraulics used to operate the tailgate 26, hydraulics used to operate a roof panel, hydraulics used to operate the top door 36, hydraulics used for power steering or other vehicle controls, or other hydraulically-powered systems on a refuse vehicle 10. The various different subsystems 106 can be supplied with hydraulic power from the electric motor 104 and hydraulic pump 102 of one or more E-PTOs 100*n*. The electric motor 104 is once again supplied with electrical power from the battery assembly 23, which can be first routed through the inverter 318 and/or VFD within the inverter 318 to convert the electrical power stored within the battery assembly 23 into AC electrical power for use within the electric motor 104.

Each of the E-PTOs 100*a*, 100*b*, 100*n* can be configured to convert electrical power received from the battery assembly 23 into hydraulic power that can be used to operate the various hydraulic cylinders and other hydraulics present aboard the refuse vehicle 10. Because each of these E-PTOs 100*a*, 100*b*, 100*n* operates using electrical power received from the battery assembly 23, a single disconnect 200 can be used to selectively electrically connect each of the E-PTOs 100*a*, 100*b*, 100*n* to the battery assembly 23 and to a power source on the vehicle frame 12. As explained above, the disconnect 200 can be operated manually to decouple each of the E-PTOs 100*a*, 100*b*, 100*n* from the battery assembly 23. The inclusion of a disconnect 200, as discussed above, can be helpful in maintenance situations where lockout/tag out procedures are being used. Similarly, the inclusion of a disconnect 200 can be helpful in reducing the power consumption of the body assembly 14 when the battery assembly 23 is operating in a low or reduced power state.

Figure 19:
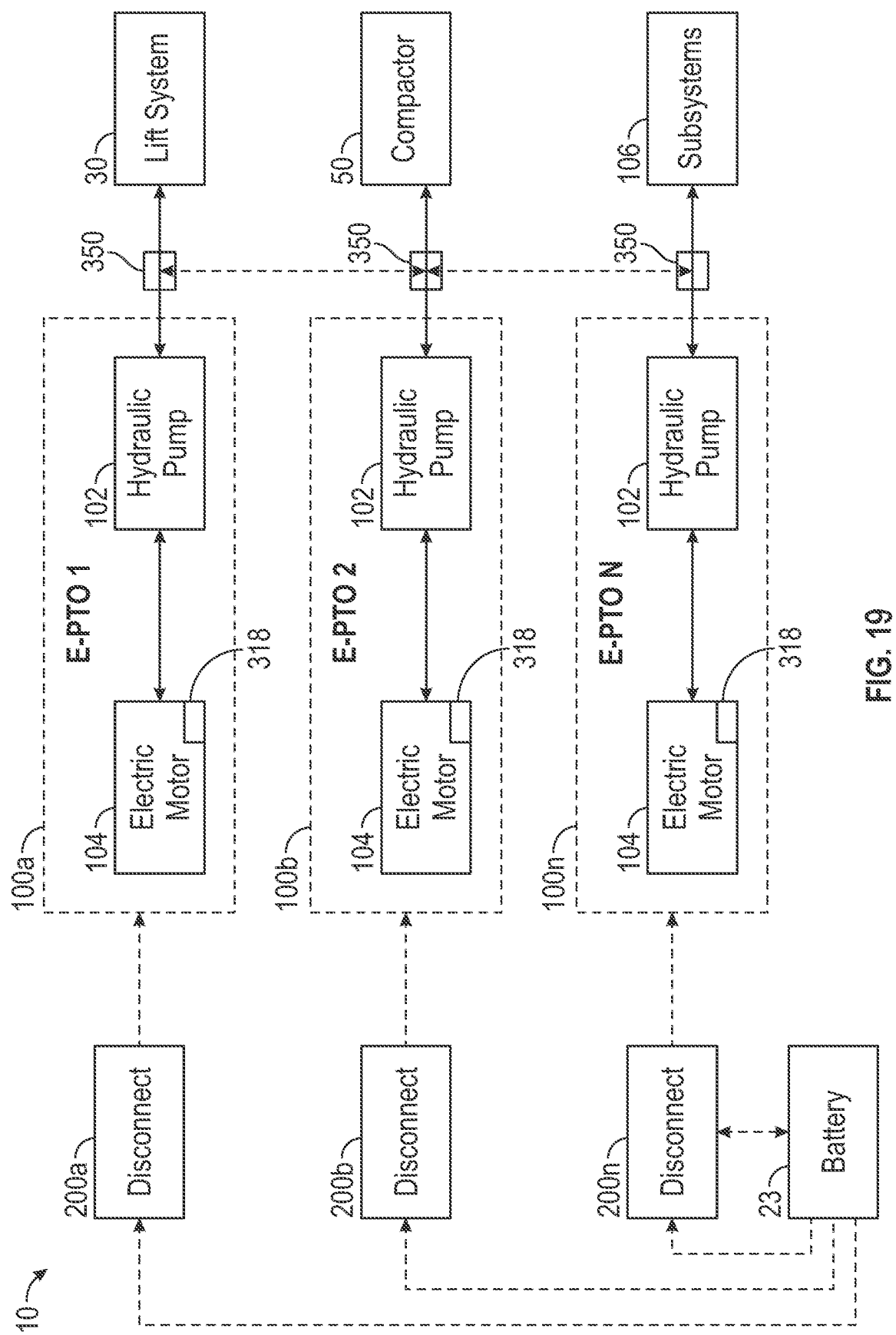
FIG. 19 is a schematic view of another control system that can be incorporated into any of the refuse vehicles of FIGS. 1-3.

Referring to FIG. 19, another arrangement for the refuse vehicle 10 is provided. The refuse vehicle 10 is arranged similar to the refuse vehicle 10 depicted in FIG. 18, but includes a separate and dedicated disconnect 200*a*, 200*b*, 200*n* for each E-PTO 100*a*, 100*b*, 100*n*. The disconnects 200*a*, 200*b*, 200*n* can be associated with the E-PTOs 100*a*, 100*b*, 100*n* such that individual hydraulic systems aboard the refuse vehicle 10 can be selectively decoupled from the battery assembly 23 for maintenance or lower power operation. For example, if the battery assembly 23 is in a lower power setting, an operator could use the disconnect 200*b* to electrically decouple the second E-PTO 100*b* from the battery assembly 23, so as to cease operation of the compactor 50. This may be advantageous in lower power situations, as the compactor 50 can often require the greatest forces to operate, which in turn creates the largest electrical power draw from the battery assembly 23. Using the disconnect 200*b* to decouple the second E-PTO 100*b* from the battery assembly 23 can help to save energy in situations where a final set of stops are being performed before completing the route, where operation of the compactor 50 is not critical. The inclusion of multiple disconnects 200*a*, 200*b*, 200*n* can also facilitate maintenance procedures, as less equipment needs to be taken offline to service specific components.

Including multiple E-PTOs 100*a*, 100*b*, 100*n* on a single refuse vehicle 10 can provide a number of advantages, as explained above. For example, providing each hydraulic component with its own dedicated electric motor 104 and hydraulic pump 102 can allow the use of smaller and less expensive motors and pumps, which can reduce the overall cost of the refuse vehicle 10, while also making the refuse vehicle 10 easier to maintain. Further, the use of independent hydraulic circuits can allow for more precise control of the hydraulic pump 102, as fewer components are being provided with pressurized hydraulic fluid from the same source.

As explained above, the multiple E-PTOs 100*a*, 100*b*, 100*n* can be arranged to operate completely independent of one another or can be selectively fluidly coupled together using the valves 350. In some examples, the valves 350 are solenoid-operated valves that are in communication with the controller 316. The controller 316 can then monitor operation of the various E-PTOs 100*a*, 100*b*, 100*n* and can selectively create fluid communication between different hydraulic circuits on the refuse vehicle 10 in response to detecting certain events occurring within the refuse vehicle 10. For example, if the controller 316 receives an indication that the electric motor 104 within the second E-PTO 100*b* is malfunctioning or damaged, the controller 316 can open one or more of the valves 350 to provide pressurized hydraulic fluid to the compactor 50 from the first E-PTO 100a or an additional E-PTO 100n. Because multi-position valves 350 are provided between each of the E-PTOs 100a, 100b, 100n and their associated loads, the refuse vehicle 10 can react to failure conditions occurring on the refuse vehicle 10 in real-time to maintain the performance of the refuse vehicle 10. In normal operation, however, each of the E-PTOs 100a, 100b, 100n operate independently. Additionally, the inclusion of separate and distinct disconnects 200a, 200b, 200n for each E-PTO 100a, 100b, 100n allows for subsets of electrical equipment to be decoupled from the main battery assembly 23 without sacrificing the overall functionality of the refuse vehicle 10. This functionality can allow the overall refuse vehicle 10 to react and adapt to malfunctions within equipment in near-real time. In some examples, the controller 316 is configured to communicate an alarm and instructions to an operator to manually adjust a position of the disconnect 200 in response to detecting a failure within one of the E-PTOs 100a, 100b, 100n. Accordingly, damaged equipment can be readily taken offline and further damage to the equipment can be avoided, reducing the number of costly repairs.

Although the description of the E-PTO system and disconnect have been described within the context of a front end loading refuse truck, the same or similar systems can also be included in both side loading and rear end loading refuse trucks without significant modification. Accordingly, the disclosure should be considered to encompass the E-PTO system and disconnect in isolation and incorporated into any type or variation of refuse vehicle.

Additionally, the manual disconnect 200 discussed herein can be incorporated to selectively permit or block power transfer between systems other than the battery 23 and the E-PTO system 100. For example, and as discussed, a disconnect 200 can be incorporated into a front-end loader (FEL) carry can 500. In some examples, the carry can 500 is configured to draw electrical power from the battery 23 using a wired connection or other coupling that creates electrical communication between the battery 23 and the carry can 500. The electricity supplied from the battery 23 to the carry can 500 can be used to operate the various lifting systems and other subsystems that may be present on the carry can 500. The disconnect 200 can selectively control and influence electrical communication that may otherwise occur through the forks 34 and the carry can 500 or through other wired connections that may normally couple the carry can 500 with the battery 23. The disconnect 200 may be positioned on either of the refuse truck 10 or on the carry can 500 in a location that permits manual actuation. In some examples, the carry can 500 includes its own onboard energy storage device 502 (e.g., a battery 502) that can be used to operate the carry can 500 when the carry can is disconnected from the battery 23 using the disconnect 200. Accordingly, the carry can 500 can continue to operate for a period of time even when no power from the primary battery 23 is being provided. In still other examples, the carry can 500 includes a controller 504 that is configured to detect a status of the two or more power sources coupled with the carry can 500 and power the carry can based upon which power supplies are currently providing power or currently able to provide power to the carry can 500. If electrical power from the battery 23 is available (e.g., the disconnect 200 is not tripped, the battery 23 has available power, etc.) the controller 504 will power the carry can 500 using electrical power from the battery 23. If the disconnect 200 is tripped and the connection between the battery 23 and the carry can 500 is disrupted (or if the battery 23 is in a lower power condition, etc.), the controller 504 will request power from the onboard energy storage device 502. In some examples, the disconnect 200 and/or controller 504 can supply electrical power from the onboard power supply 502 to the refuse vehicle 10 and/or the E-PTO system 100 if the battery 23 experiences unexpected failure or is in a low power condition. The disconnect 200 can selectively permit the transfer of electrical power from the carry can 500 to one or both of the battery 23 and the E-PTO system 100 to help drive the vehicle 10.

Figure 20:
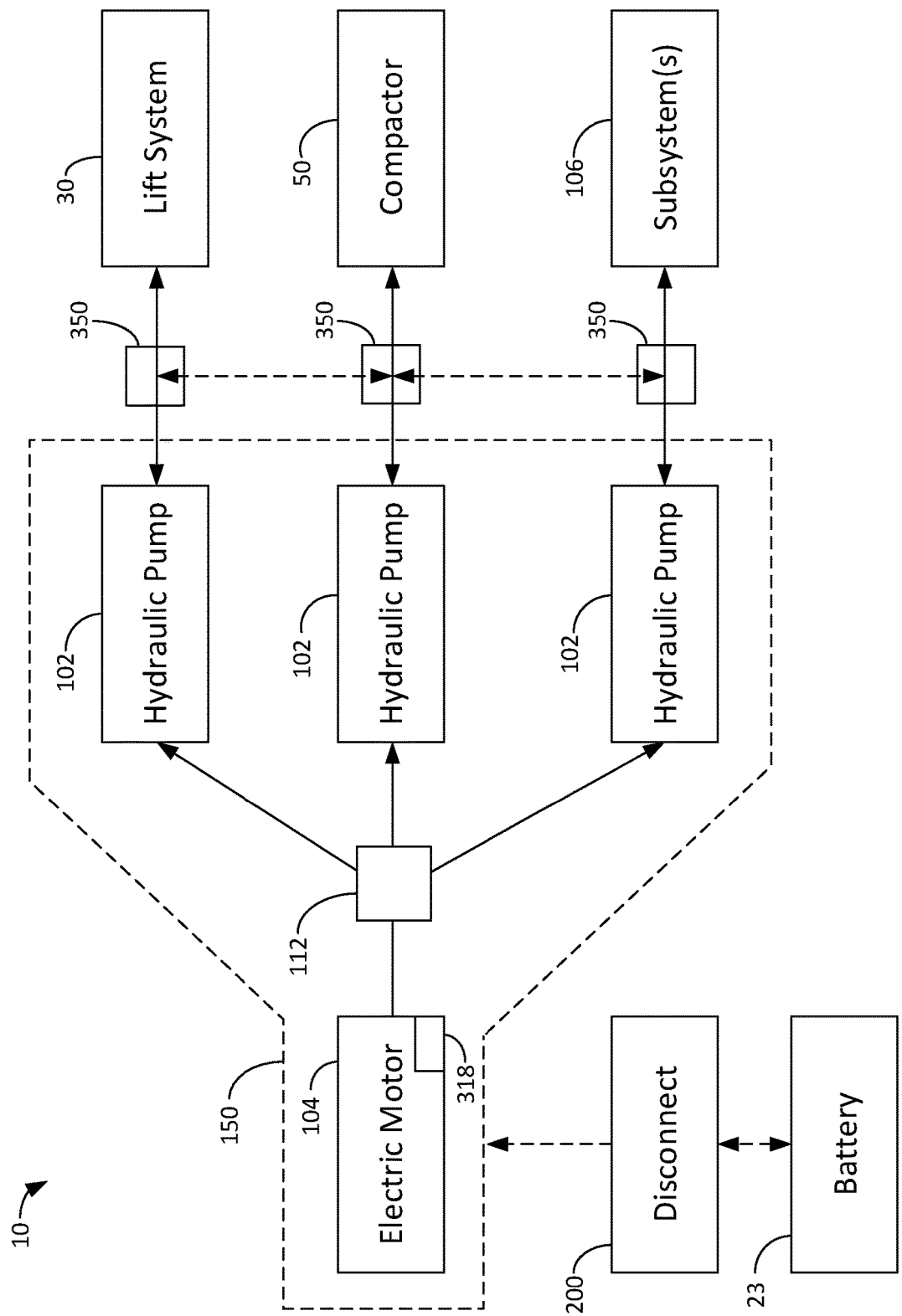
FIG. 20 is a schematic view of another control system that can be incorporated into any of the refuse vehicles of FIGS. 1-3.

Referring to FIG. 20, a schematic of an alternative refuse vehicle 10 is provided. The refuse vehicle 10 generally includes a charge storing device, shown as battery assembly 23, which may be configured to provide power to the prime mover 20 to drive the refuse vehicle. Alternatively, the battery assembly 23 may be dedicated to one or more hydraulic systems a different battery may be configured to provide power to the prime mover 20. The battery assembly 23 is configured to provide power to the E-PTO system 150. The E-PTO system 150 may share one or more features with any of the other E-PTOs discussed herein (e.g., E-PTO 100 100a, 100b, 100n etc.). The E-PTO system 150 includes an electric motor 104 that is configured to drive one or more hydraulic pumps 102 to provide pressurized hydraulic fluid to different systems on the refuse vehicle 10.

Figure 16:
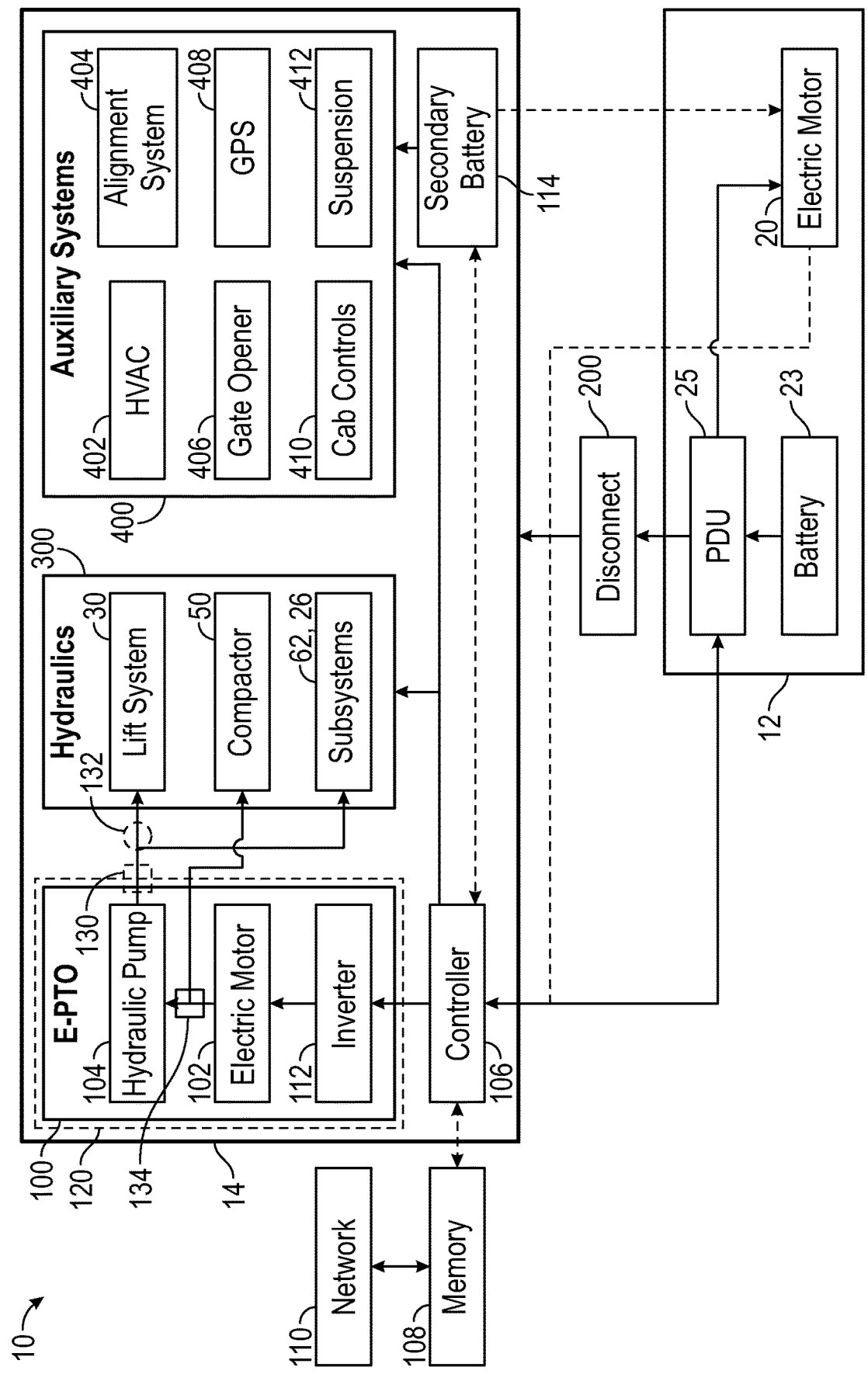
FIG. 16 is a schematic view of a control system that can be incorporated into the refuse vehicle of any of FIGS. 1-7.
Figure 17:
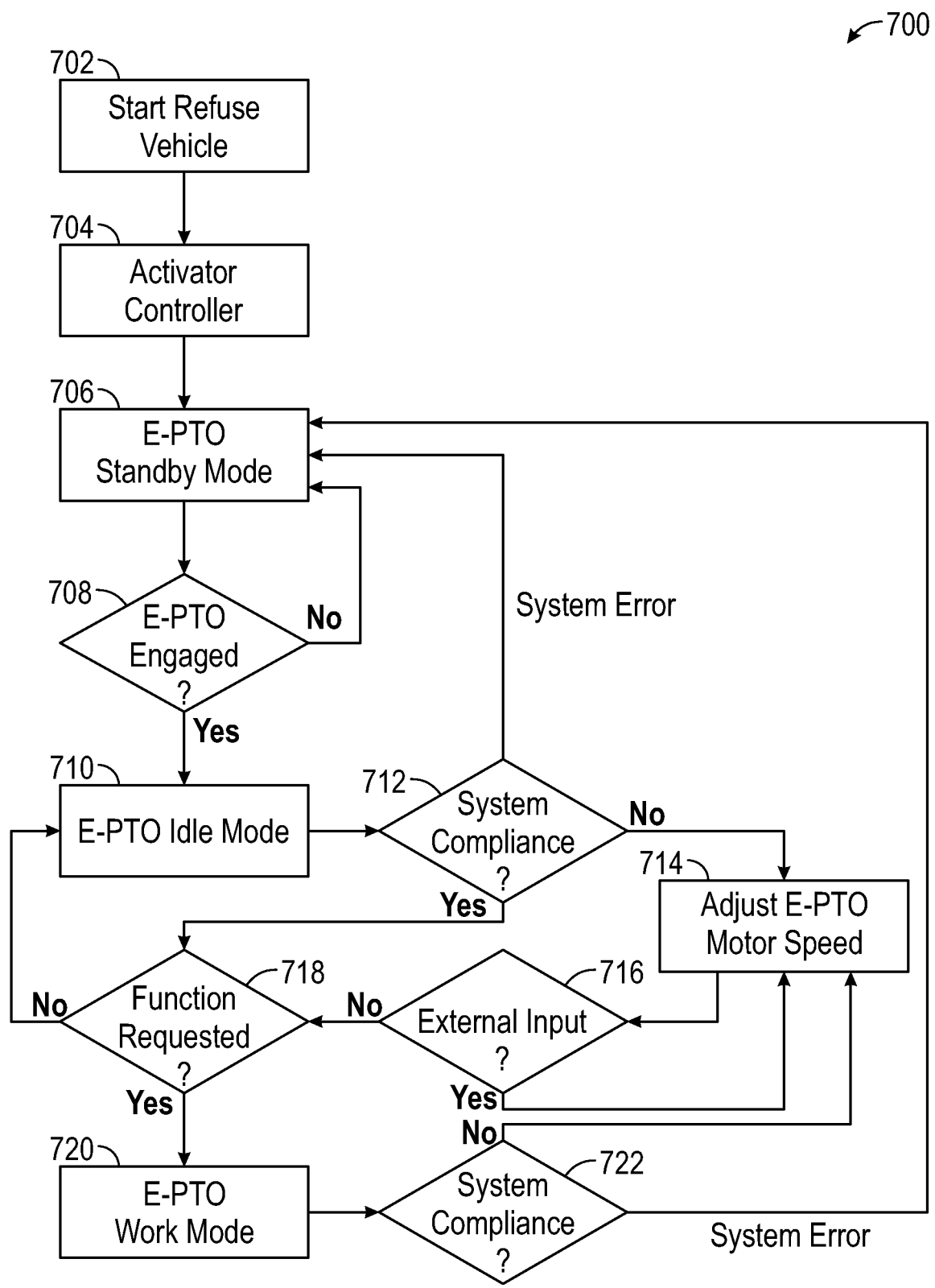
FIG. 17 is a block diagram of a method of electric power take off throttle advance, according to an example embodiment.

The electric motor 104 is configured to draw electricity (e.g., electrical power) from the battery assembly 23 and convert the electricity to mechanical power. As depicted in FIG. 16, the E-PTO system 150 includes an inverter 318 to convert DC electrical power received from the battery assembly 23 into AC electric power for use by the electric motor 104. The electric motor 104 can be an AC induction or permanent magnet-style AC motor that can be controlled using a variable frequency drive (VFD). In some examples, the VFD is included within the inverter 318. The VFD can then be used to control a speed of the electric motor 104, which in turn controls an output speed of one or more of the hydraulic pump 102 that are coupled with the electric motor 104.

As shown in FIG. 20, the electric motor 104 is coupled to a transmission arrangement 112 that is configured to transfer an output from the electric motor 104 to one or more of the hydraulic pumps 102. The transmission arrangement 112 may enable the electric motor 104 to individually power each of the hydraulic pumps 102. For example, each hydraulic pump 102 may provide hydraulic power (e.g., pressure, energy, etc.) to a different system of the refuse vehicle 10. In this sense, the electric motor 104 may provide power to just one hydraulic pump 102 (e.g., via the transmission arrangement 112) without powering the other two hydraulic pumps 102. For example, an operator of the refuse vehicle 10 may engage the lift system 30 without engaging the compactor 50 or the subsystems 106. In this example embodiment, the transmission arrangement 112 may engage the electric motor 104 with the respective hydraulic pump 102 while disengaging the electric motor 104 with the hydraulic pumps 102 that are not directly coupled to the compactor 50.

According to various embodiments, the transmission arrangement 112 may be configured to transfer an output from the electric motor 104 to two or more hydraulic pumps 102 simultaneously. For example, the transmission arrangement 112 may transfer mechanical power to all three hydraulic pumps 102. According to various embodiments, the amount of power transferred to the three hydraulic pumps 102 is the same. According to other embodiments, the amount of power transferred to the three hydraulic pumps 102 may be different. For example, the transmission arrangement 112 may transfer a first proportion of the output from the electric motor 104 to a first hydraulic pump 102, a second proportion of the output to a second hydraulic pump 102, and a third proportion to a third hydraulic pump 102. According to various embodiments, the first proportion, the second proportion, and the third proportion may be fixed proportions. For example, 60% of the output may be transferred to the hydraulic pump 102 associated with the lift system 30, 30% of the output may be transferred to the hydraulic pump 102 associated with the compactor 50, and the remaining 10% of the output may be transferred to the hydraulic pump 102 associated with the subsystems 106. Alternatively, the transmission arrangement 112 may be able to alter the first proportion, the second proportion, and the third proportion based on demand requirement from the lift system 30, the compactor 50, and/or the subsystems 106. Further, according to various embodiments, the transmission arrangement 112 may provide a minimum threshold output to each hydraulic pump 102. For example, the lift system 30, the compactor 50, and/or the subsystems 106 may be include hydraulics that configured to idle at a minimum pressure. In this example, the transmission arrangement 112 may be configured to transfer a sufficient output to each of the hydraulic pumps 102 to maintain the desired idle pressure. The transmission arrangement 112 may further be configured to increase the first proportion output while maintaining a minimum threshold output for the second proportion and the third proportion.

As depicted, the first hydraulic pump 102 is configured to supply pressurized hydraulic fluid to control the lift system 30. Accordingly, the electric motor 104, the transmission arrangement 112, and the first hydraulic pump 102 can each be better optimized to meet the hydraulic power requirements of the lift system, as less overall hydraulic power is needed (in comparison to a single hydraulic pump providing hydraulic power to the entire refuse vehicle 10). The cost and complexity of hydraulic pumps 102 increases significantly as the size of these components increases, such that providing a hydraulically-independent hydraulic pump 102 specifically for the lift system 30 can result in significant cost savings for the refuse truck 10.

Utilizing a single electric motor 104 to drive multiple hydraulic pumps, rather than each hydraulic pump 102 having a dedicated motor, may reduce manufacturing costs, reduce the weight of the vehicle, and improve the overall efficiency of the refuse vehicle 10. For example, having two independent electric motors 104 may cost more than a single independent electric motor 104 that is able to produce a similar output. Similarly, having two independent electric motors 104 may weigh more than a single independent electric motor 104 that is able to produce a similar output. Further, the refuse vehicle 10 may include a first inverter 318 configured to convert direct current electrical power received from the energy storage device 23 into alternating current to drive the motor 104. By utilizing a single motor 104, the E-PTO system may only require a single inverter 318, thereby reducing manufacturing costs.

Similarly, the second hydraulic pump 102 is configured to supply pressurized hydraulic fluid to control the operation of the compactor 50 onboard the refuse vehicle 10. As depicted in FIG. 16, the second hydraulic pump 102 is configured to receive mechanical power from the transmission arrangement 112 and convert the received mechanical power into hydraulic power for use within the compactor 50. In some examples, the first hydraulic pump 102 and second hydraulic pump 102 operate fluidly independent of one another, such that a malfunction or deactivation within the first hydraulic pump will not impact or otherwise impact the operation of the second hydraulic pump 102.

In other examples, the first hydraulic pump 102 and second hydraulic pump 102 can be selectively fluidly independent of one another. For example, valving (e.g., one or more solenoid valves 350) within the refuse vehicle 10 can selectively couple the second hydraulic pump 102 into fluid communication with the hydraulic circuit associated with the lift system 30. Accordingly, if the first hydraulic pump 102 experience deteriorated performance or other undesired issues, the second hydraulic pump 102 can be fluidly coupled with the lift system 30, such that operation of the lift system 30 can continue. In some examples, the second hydraulic pump 102 can be configured to supply hydraulic power to each of the lift system 30 and the compactor 50 simultaneously. In other embodiments, the second hydraulic pump 102 may first be fluidly decoupled from the compactor 50 before coupling the hydraulic circuit associated with the lift system 30. As explained in additional detail below, each of the hydraulic pumps 102 may be selectively fluidly coupled with any of the lift system 30, compactor 50, or subsystems 106 in some embodiments, depending on the arrangement and positioning of the valves 350.

In some examples, additional hydraulic pumps 102 (e.g., a third hydraulic pump, a fourth hydraulic pump, etc.) can be included within the system to provide hydraulic power to additional subsystems 106 within the refuse vehicle 10. For example, and as explained above, the additional subsystems 106 can include hydraulics used to operate the tailgate 26, hydraulics used to operate a roof panel, hydraulics used to operate the top door 36, hydraulics used for power steering or other vehicle controls, or other hydraulically-powered systems on a refuse vehicle 10. The various different subsystems 106 can be supplied with hydraulic power from the electric motor 104 and the third hydraulic pump 102. The electric motor 104 is once again supplied with electrical power from the battery assembly 23, which can be first routed through the inverter 318 and/or VFD within the inverter 318 to convert the electrical power stored within the battery assembly 23 into AC electrical power for use within the electric motor 104.

Each of the hydraulic pump 102 can be configured to convert electrical power received from the transmission arrangement 112 into hydraulic power that can be used to operate the various hydraulic cylinders and other hydraulics present aboard the refuse vehicle 10. Because each of these hydraulic pump 102 operates using mechanical power received from the transmission arrangement 112, which receives power from a single electric motor 104, a single disconnect 200 can be used to selectively electrically connect each of the hydraulic pumps 102 to the battery assembly 23. The inclusion of a disconnect 200, as discussed above, can be helpful in maintenance situations where lockout/tag out procedures are being used. Similarly, the inclusion of a disconnect 200 can be helpful in reducing the power consumption of the body assembly 14 when the battery assembly 23 is operating in a low or reduced power state.

Figure 21:
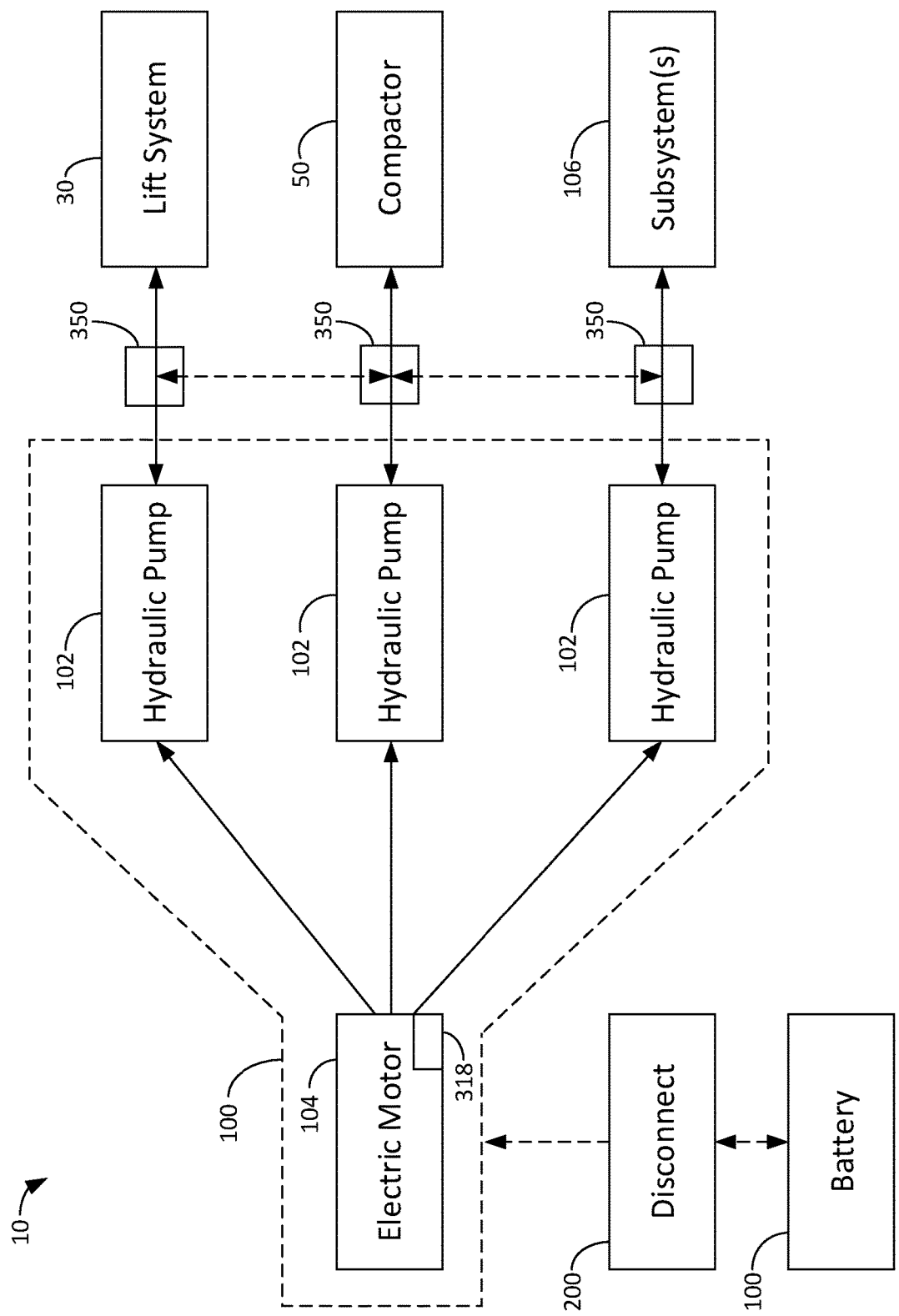
FIG. 21 is a schematic view of another control system that can be incorporated into any of the refuse vehicles of FIGS. 1-3.

Referring to FIG. 21, a schematic of an alternative refuse vehicle 10 is provided. The refuse vehicle 10 generally includes a charge storing device, shown as battery assembly 23, which may be configured to provide power to the prime mover 20 to drive the refuse vehicle. Alternatively, the battery assembly 23 may be dedicated to one or more hydraulic systems a different battery may be configured to provide power to the prime mover 20. The battery assembly 23 is configured to provide power to the E-PTO system 170.

The E-PTO system 170 may share one or more features with any of the other E-PTOs discussed herein (e.g., E-PTO 100 100a, 100b, 100n, 150, etc.). The E-PTO system 170 includes an electric motor 104 that is configured to drive one or more hydraulic pumps 102 to provide pressurized hydraulic fluid to different systems on the refuse vehicle 10.

The electric motor 104 is configured to draw electricity (e.g., electrical power) from the battery assembly 23 and convert the electricity to mechanical power. As depicted, the E-PTO system 150 includes an inverter 318 to convert DC electrical power received from the battery assembly 23 into AC electric power for use by the electric motor 104. The electric motor 104 can be an AC induction or permanent magnet-style AC motor that can be controlled using a variable frequency drive (VFD). In some examples, the VFD is included within the inverter 318. The VFD can then be used to control a speed of the electric motor 104, which in turn controls an output speed of one or more of the hydraulic pump 102 that are coupled with the electric motor 104.

As shown in FIG. 21, the electric motor 104 is independently coupled to each of the one or more of the hydraulic pumps 102 (e.g., via a plurality of output shafts). The electric motor 104 may be configured to individually power each of the hydraulic pumps 102. For example, each hydraulic pump 102 may provide hydraulic power (e.g., pressure, energy, etc.) to a different system of the refuse vehicle 10. In this sense, the electric motor 104 may provide power to just one hydraulic pump 102 (e.g., via the transmission arrangement 112) without powering the other two hydraulic pumps 102. For example, an operator of the refuse vehicle 10 may engage the lift system 30 without engaging the compactor 50 or the subsystems 106. In this example embodiment, the electric motor 104 may provide power to the respective hydraulic pump 102 associated with the lifting system while disengaging the hydraulic pumps 102 that are not directly coupled to the compactor 50.

According to various embodiments, the one or more output shafts are configured to output power from the electric motor 104 to two or more hydraulic pumps 102 simultaneously. For example, the one or more output shafts may transfer mechanical power to all three hydraulic pumps 102 (e.g., via three separate output shafts). According to various embodiments, the amount of power transferred to the three hydraulic pumps 102 is the same. According to other embodiments, the amount of power transferred to the three hydraulic pumps 102 may be different. For example, one or more output shafts may transfer a first proportion of the output from the electric motor 104 to a first hydraulic pump 102, a second proportion of the output to a second hydraulic pump 102, and a third proportion to a third hydraulic pump 102. According to various embodiments, the first proportion, the second proportion, and the third proportion may be fixed proportions. For example, 60% of the output may be transferred to the hydraulic pump 102 associated with the lift system 30, 30% of the output may be transferred to the hydraulic pump 102 associated with the compactor 50, and the remaining 10% of the output may be transferred to the hydraulic pump 102 associated with the subsystems 106. Alternatively, the one or more output shafts may be able to alter the first proportion, the second proportion, and the third proportion based on demand requirement from the lift system 30, the compactor 50, and/or the subsystems 106 (e.g., by altering a speed of the electric motor 104). Further, according to various embodiments, the one or more output shafts may provide a minimum threshold output to each hydraulic pump 102. For example, the lift system 30, the compactor 50, and/or the subsystems 106 may be include hydraulics that configured to idle at a minimum pressure. In this example, the one or more output shafts may be configured to transfer a sufficient output to each of the hydraulic pumps 102 to maintain the desired idle pressure. The one or more output shafts may further be configured to increase the first proportion output while maintaining a minimum threshold output for the second proportion and the third proportion.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:
   a chassis supporting a plurality of wheels;
   a battery configured to provide electrical energy to drive at least one of the plurality of wheels;
   a vehicle body supported by the chassis and defining a receptacle for storing refuse therein; and
   an electric power take-off module removabley coupled to the vehicle body, wherein the electric power take-off module includes an electric power take-off system including:
      a motor configured to receive electrical energy from the battery and provide power to a hydraulic system in response to receiving the electrical energy from the battery.

2. The refuse vehicle of claim 1, wherein the electric power take-off system further includes an inverter configured to provide the electrical energy to the motor from the battery.

3. The refuse vehicle of claim 1, wherein the electric power take-off system further includes a second battery, such that the electric power take-off system is configured to operate solely off energy from the second battery.

4. The refuse vehicle of claim 1, wherein the motor is a first motor and the electric power take-off system further includes a second motor configured to receive electrical energy from the battery and provide power to the hydraulic system in response to receiving the electrical energy from the battery.

5. The refuse vehicle of claim 1, wherein the electric power take-off system further includes a hydraulic pump configured to receive power from the motor and provide hydraulic pressure to the hydraulic system.

6. The refuse vehicle of claim 1, further comprising a sensor configured to detect when the electric power take-off module is de-coupled from the body; and
   a controller in communication with the sensor and configured to de-activate the hydraulic system in response to the sensor detecting the electric power take-off module is de-coupled from the body.

7. The refuse vehicle of claim 1, wherein the electric power take-off module further includes a switch configured to be actuated by an operator of the refuse vehicle and activate the electric power take-off system in response to being actuated by the operator.

8. A refuse vehicle comprising:
   a chassis supporting a plurality of wheels;
   a battery configured to provide electrical energy to drive at least one of the plurality of wheels;
   a vehicle body supported by the chassis and defining a receptacle for storing refuse therein; and
   an electric power take-off system coupled to the vehicle body, the electric power take-off system including:
      a motor configured to receive electrical energy from the battery and provide power to a hydraulic system in response to receiving the electrical energy from the battery,
      a sensor configured to detect hydraulic pressure within the hydraulic system; and
      a controller configured to receive data indicative of the detected hydraulic pressure from the sensor, wherein the controller is further configured to determine if the hydraulic pressure is below a minimum threshold pressure and increase a speed of the motor in response to determining the hydraulic pressure is below the minimum threshold pressure.

9. The refuse vehicle of claim 8, further comprising a user interface in communication with the controller, wherein the controller is configured to increase the speed of the motor in response to an input made on the user interface.

10. The refuse vehicle of claim 8, further comprising a lifting system powered by the hydraulic system, wherein the controller is configured to increase the speed of the motor in response to activation of the lifting system.

11. The refuse vehicle of claim 8, further comprising an operator detecting sensor in communication with the controller and configured to detect a person proximate the refuse vehicle, wherein the controller is configured to activate the hydraulic system in response to detecting the person proximate the refuse vehicle.

12. The refuse vehicle of claim 8, wherein the electric power take-off system further includes a switch configured to be actuated by an operator of the refuse vehicle and activate the electric power take-off system in response to being actuated by the operator.

13. The refuse vehicle of claim 12, wherein the switch is located proximate the front of the body and is accessible from outside a cabin of the vehicle.

14. The refuse vehicle of claim 12, wherein the switch is located proximate the rear of the body and is accessible from outside a cabin of the vehicle.

15. A method comprising:
   providing power to one or more components a system of a refuse vehicle, the refuse vehicle comprising:
      a chassis supporting a plurality of wheels;
      a battery;
      a vehicle body supported by the chassis and defining a receptacle for storing refuse therein; and
      an electric power take-off system coupled to the vehicle body, the electric power take-off system including:
         a motor configured to receive electrical energy from the battery and provide power to a hydraulic system in response to receiving the electrical energy from the battery, and
         a controller communicably coupled to the motor;
   receiving, by the controller, power from the battery;
   causing, by the controller, the electric power-take off system to enter idle mode,
   detecting, by a sensor, a hydraulic pressure within the hydraulic system,
   receiving, by the controller, data indicative of the hydraulic pressure from the sensor; and
   causing, by the controller, an increase in a speed of the motor in response to determining the hydraulic pressure is below a minimum threshold pressure.

16. The method of claim 15, further comprising:
   receiving, by the controller, a user input from a user interface, and
   increasing, by the controller, the speed of the motor in response to receiving the user input.

17. The method of claim 16, wherein the user input includes a request to activate a lifting mechanism.

18. The method of claim 17, further comprising:
   detecting, by the sensor, a second hydraulic pressure within the hydraulic system,
   receiving, by the controller, data indicative of the second hydraulic pressure from the sensor; and
   causing, by the controller, an increase in the speed of the motor in response to determining the hydraulic pressure is below a minimum working pressure.

19. The method of claim 15, further comprising:
   receiving, from a switch configured to be actuated by an operator of the refuse vehicle, an indication that the switch has been actuated; and
   increasing, by the controller, the speed of the motor in response to receiving the indication that the switch has been actuated.

20. The method of claim 19, wherein the switch is located proximate the front of the body and is accessible from outside a cabin of the vehicle.

* * * * *